United States Patent
Davis et al.

(10) Patent No.: US 12,541,476 B2
(45) Date of Patent: Feb. 3, 2026

(54) CHIPLET ARCHITECTURE FOR LATE BIND SKU FUNGIBILITY

(71) Applicant: Intel Corporation, Santa Clara, CA (US)

(72) Inventors: Mark C. Davis, Portland, OR (US); Hong Jiang, Los Altos, CA (US); Satish Damaraju, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 17/702,271

(22) Filed: Mar. 23, 2022

(65) Prior Publication Data

US 2023/0305978 A1    Sep. 28, 2023

(51) Int. Cl.
    *G06F 13/40*    (2006.01)

(52) U.S. Cl.
    CPC ...... *G06F 13/4022* (2013.01); *G06F 13/4009* (2013.01); *G06F 13/4068* (2013.01)

(58) Field of Classification Search
    CPC ............. G06F 13/4022; G06F 13/4009; G06F 13/4068
    See application file for complete search history.

(56) References Cited

U.S. PATENT DOCUMENTS

| | | | |
|---|---|---|---|
| 11,694,940 B1 | 7/2023 | Mathuriya et al. | |
| 2004/0117680 A1* | 6/2004 | Naffziger | G06F 1/324 713/322 |
| 2005/0235230 A1* | 10/2005 | Bohn | G05B 19/4183 716/54 |
| 2007/0074011 A1 | 3/2007 | Borkar et al. | |
| 2008/0066955 A1* | 3/2008 | Nodo | H05K 3/3442 174/261 |
| 2011/0010709 A1 | 1/2011 | Anand et al. | |
| 2011/0014802 A1* | 1/2011 | Demuynck | H05K 7/1023 439/68 |
| 2017/0062294 A1* | 3/2017 | Nasrullah | H01L 22/34 |
| 2018/0102251 A1 | 4/2018 | Delacruz et al. | |
| 2018/0159259 A1* | 6/2018 | Milo | H01L 23/32 |
| 2019/0042351 A1 | 2/2019 | Connor et al. | |

(Continued)

OTHER PUBLICATIONS

Notice of Publication for CN202310193661.X, mailed Oct. 12, 2023, 4 pages.

(Continued)

*Primary Examiner* — Henry Tsai
*Assistant Examiner* — Harry Z Wang
(74) *Attorney, Agent, or Firm* — Jaffery Watson Hamilton DeSanctis LLP

(57) ABSTRACT

Described herein is a modular parallel processor comprising an active base die including hardware logic, interconnect logic, and a plurality of chiplet slots and a plurality of chiplets vertically stacked on the active base die and coupled with the plurality of chiplet slots of the active base die. The plurality of chiplets is interchangeable during assembly of the modular parallel processor and include a group of hardware logic chiplets having a plurality of different functional units and a group of memory chiplets having a plurality of different memory devices. The hardware logic chiplets and the memory chiplets interconnect via the interconnect logic within the active base die.

20 Claims, 44 Drawing Sheets

(56) References Cited

U.S. PATENT DOCUMENTS

| | | |
|---|---|---|
| 2020/0105653 A1 | 4/2020 | Elsherbini et al. |
| 2020/0294180 A1 | 9/2020 | Koker et al. |
| 2020/0409700 A1* | 12/2020 | Sripada ................. G06F 9/3016 |
| 2021/0249952 A1 | 8/2021 | Roth et al. |
| 2022/0052023 A1* | 2/2022 | Fu .......................... H01L 25/50 |
| 2022/0070115 A1* | 3/2022 | Brewer ................ H04L 49/109 |
| 2022/0102276 A1* | 3/2022 | Agarwal ................. H01L 24/25 |
| 2022/0138387 A1* | 5/2022 | Narayanun ........... G06F 30/394 |
| | | 716/103 |
| 2023/0009881 A1 | 1/2023 | Chapman et al. |
| 2023/0195664 A1 | 6/2023 | Keely et al. |
| 2023/0305993 A1 | 9/2023 | Davis et al. |

OTHER PUBLICATIONS

Office Action for U.S. Appl. No. 17/702,235 mailed Jun. 6, 2025, 18 pages.

* cited by examiner

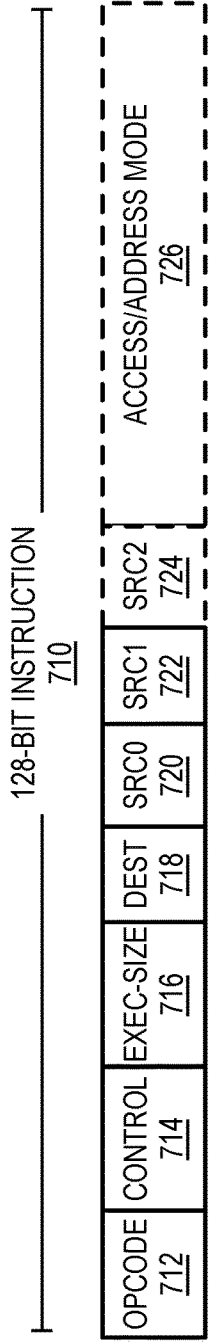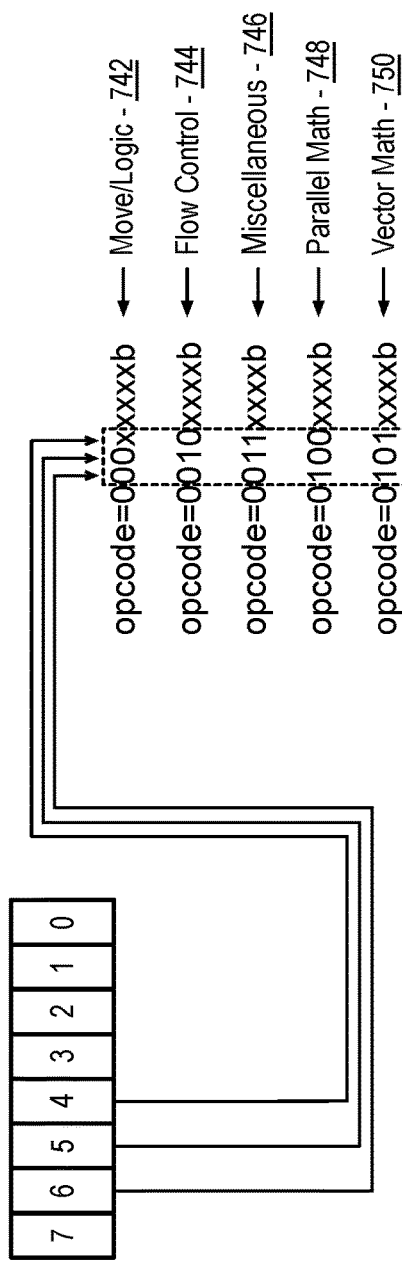
FIG. 7

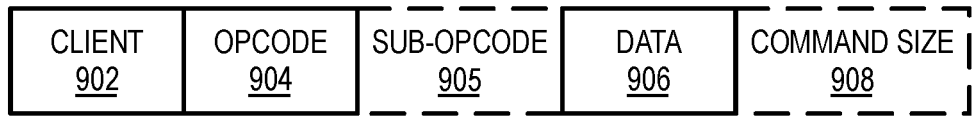
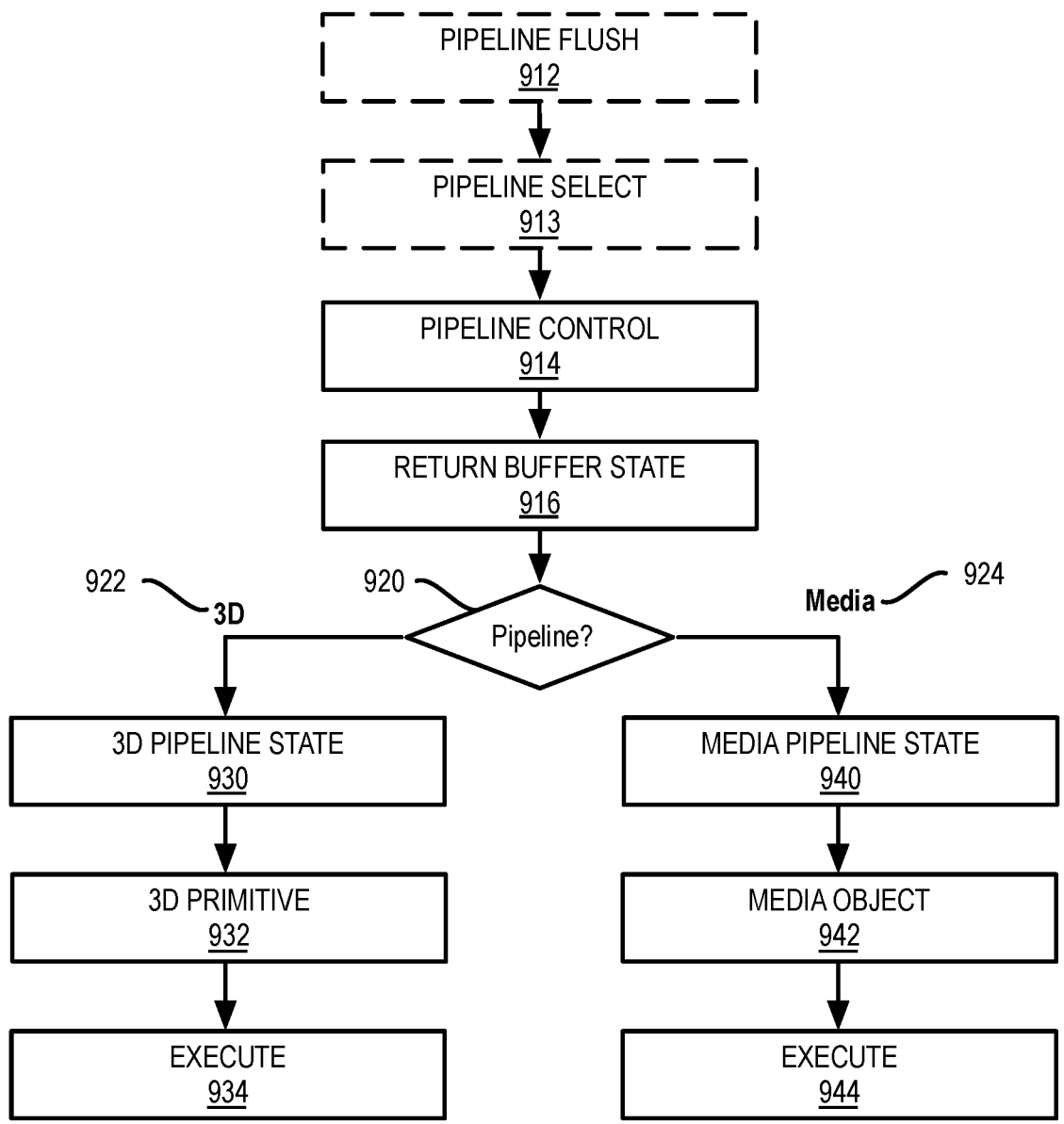

CHIPLET ARCHITECTURE FOR LATE BIND SKU FUNGIBILITY

FIELD

Embodiments described herein generally relate to computing systems. More particularly, embodiments relate to the design and manufacturing of general-purpose graphics and parallel processing units.

BACKGROUND OF THE DISCLOSURE

Building graphics and parallel processors using large silicon dies provides a variety of manufacturing challenges. Manufacturing yields for large dies are reduced and the process technology requirements for different components may diverge. Additionally, key components should be interconnected by high speed, high bandwidth, low latency interfaces to maintain high processing performance. In addition to yield concerns, the design costs associated with the creation of custom customer or application specific designs may increase the difficulty of manufacturing graphics and parallel processors that address key market segments.

BRIEF DESCRIPTION OF THE DRAWINGS

The present invention is illustrated by way of example and not limitation in the figures of the accompanying drawings in which like references indicate similar elements, and in which:

FIG. 7 is a block diagram illustrating a graphics processor instruction formats according to some embodiments;

FIG. 9A-9B illustrate a graphics processor command format and command sequence, according to some embodiments;

DETAILED DESCRIPTION

Described herein is a chiplet architecture that enables late bind SKU fungibility that allows IP for a product to be determined later in the design process, enabling a more fungible and nimble product architecture. The chiplet architecture can employ an array of functionality and physically homogenous or heterogeneous chiplets to implement a variety processing designs, from a general-purpose processor (e.g., central processing units (CPU)), graphics processing unit (GPU), parallel compute accelerator, and/or general-purpose graphics processing unit (GPGPU).

Also described is a chunking architecture in which multiple heterogenous or homogenous chiplets are grouped into a chunk of physically contiguous chiplets. The chunking architecture enables homogenous chiplets with different execution core counts to be grouped into chunks of chiplets, where each chunk of chiplets has a uniform number of execution cores. The chunking architecture also enables heterogenous chiplets with different power requirements to be grouped into chunks that have uniform or pre-determined power delivery requirements. Power delivery can then be configured on a per-chunk instead of a per-chiplet basis.

The processes depicted in the figures that follow can be performed by processing logic that comprises hardware (e.g., circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

System Overview

Figure 1:
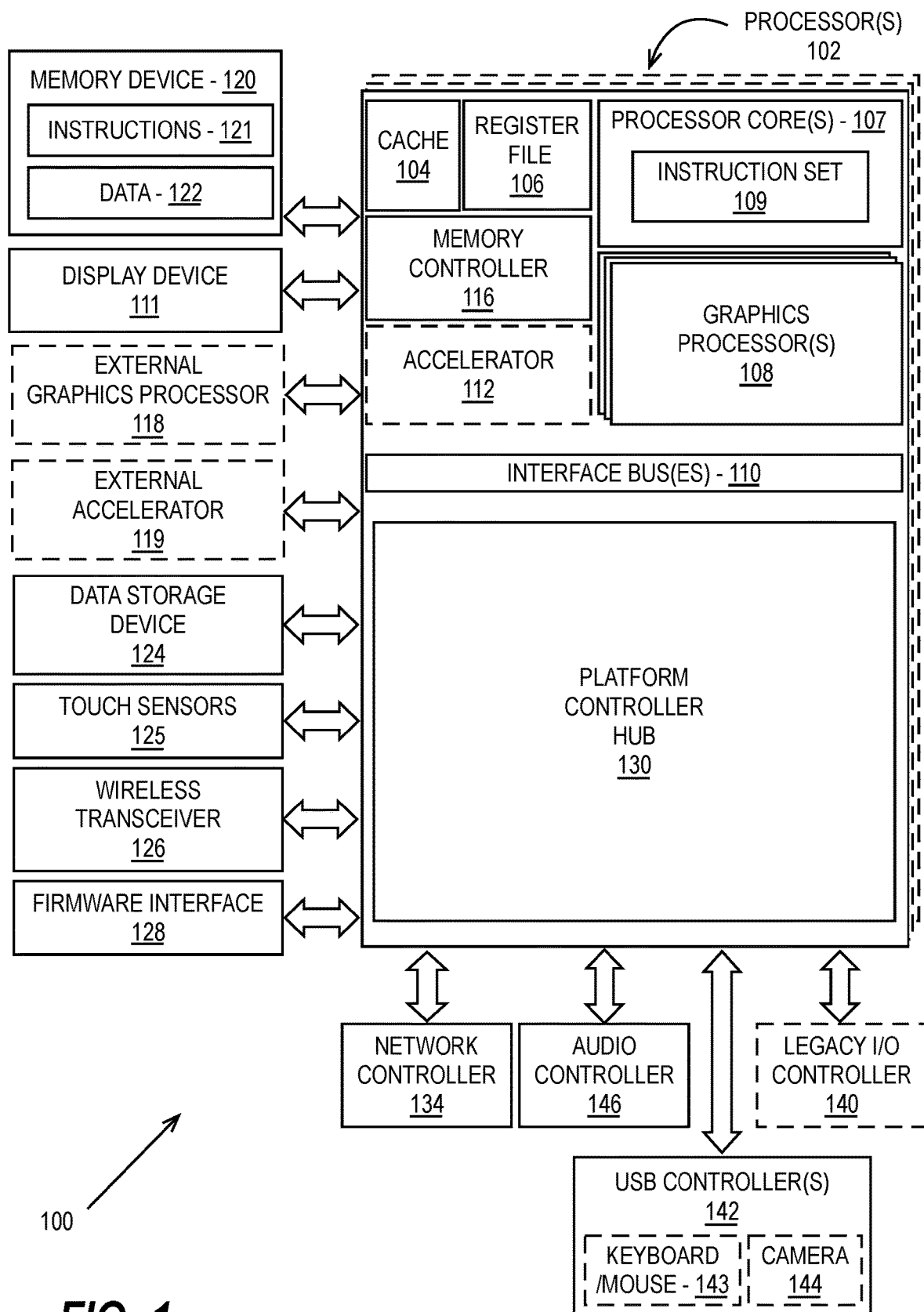
FIG. 1 is a block diagram of a processing system, according to an embodiment.

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane, or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include a memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. The memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high-definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102 and reside in a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIG. 2A-2D illustrate computing systems and graphics processors provided by embodiments described herein. The elements of FIG. 2A-2D having the same reference numbers (or names) as the elements of any other figure herein can operate or function in any manner similar to that described elsewhere herein, but are not limited to such.

Figure 2A:
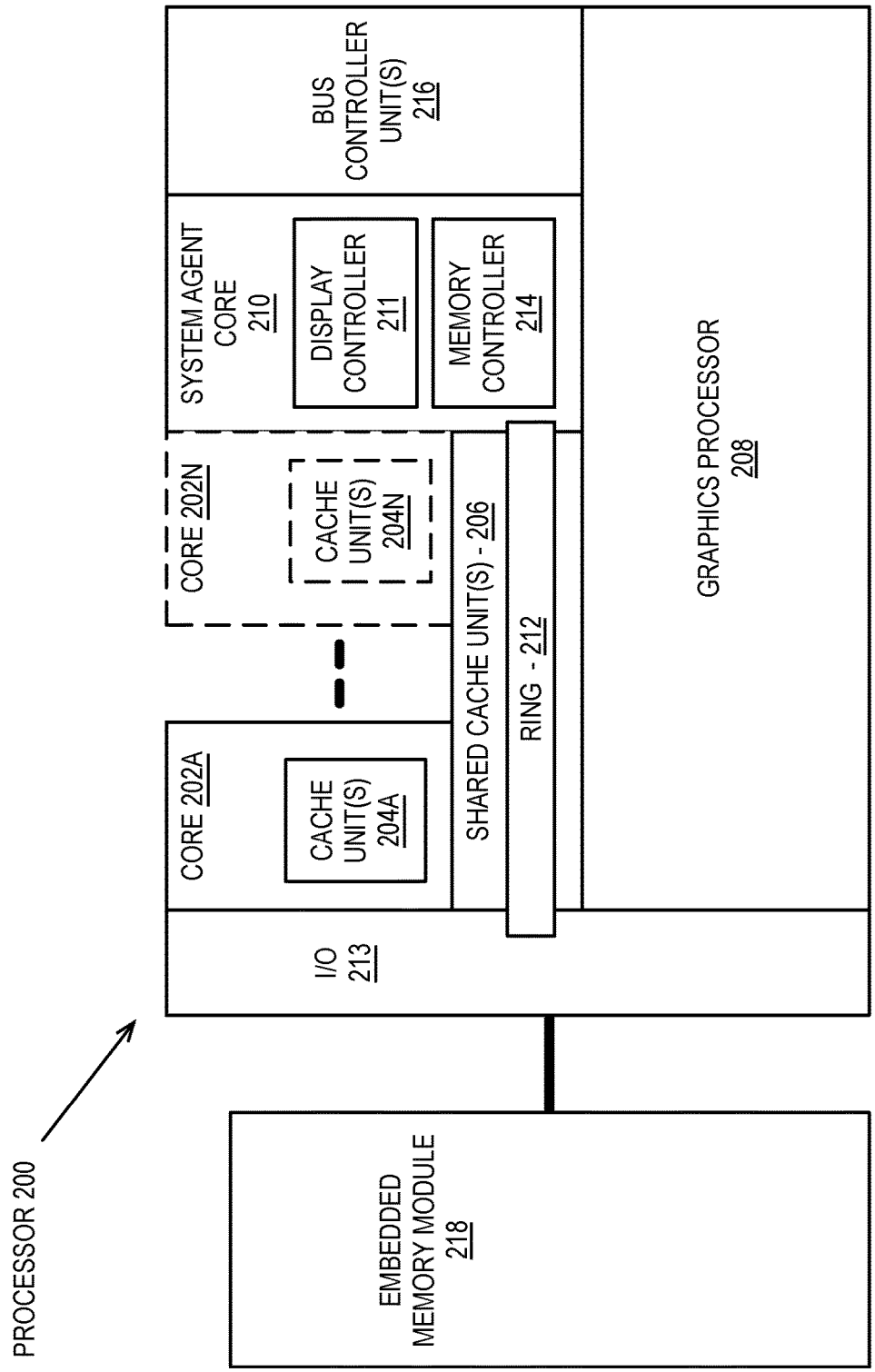
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect or may be integrated within the graphics processor 208.

In some embodiments, a ring-based interconnect 212 is used to couple the internal components of the processor 200. However, an alternative interconnect unit may be used, such as a point-to-point interconnect, a switched interconnect, a mesh interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module or a high-bandwidth memory (HBM) module. In some embodiments, each of the processor cores 202A-202N and graphics processor 208 can use the embedded memory module 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
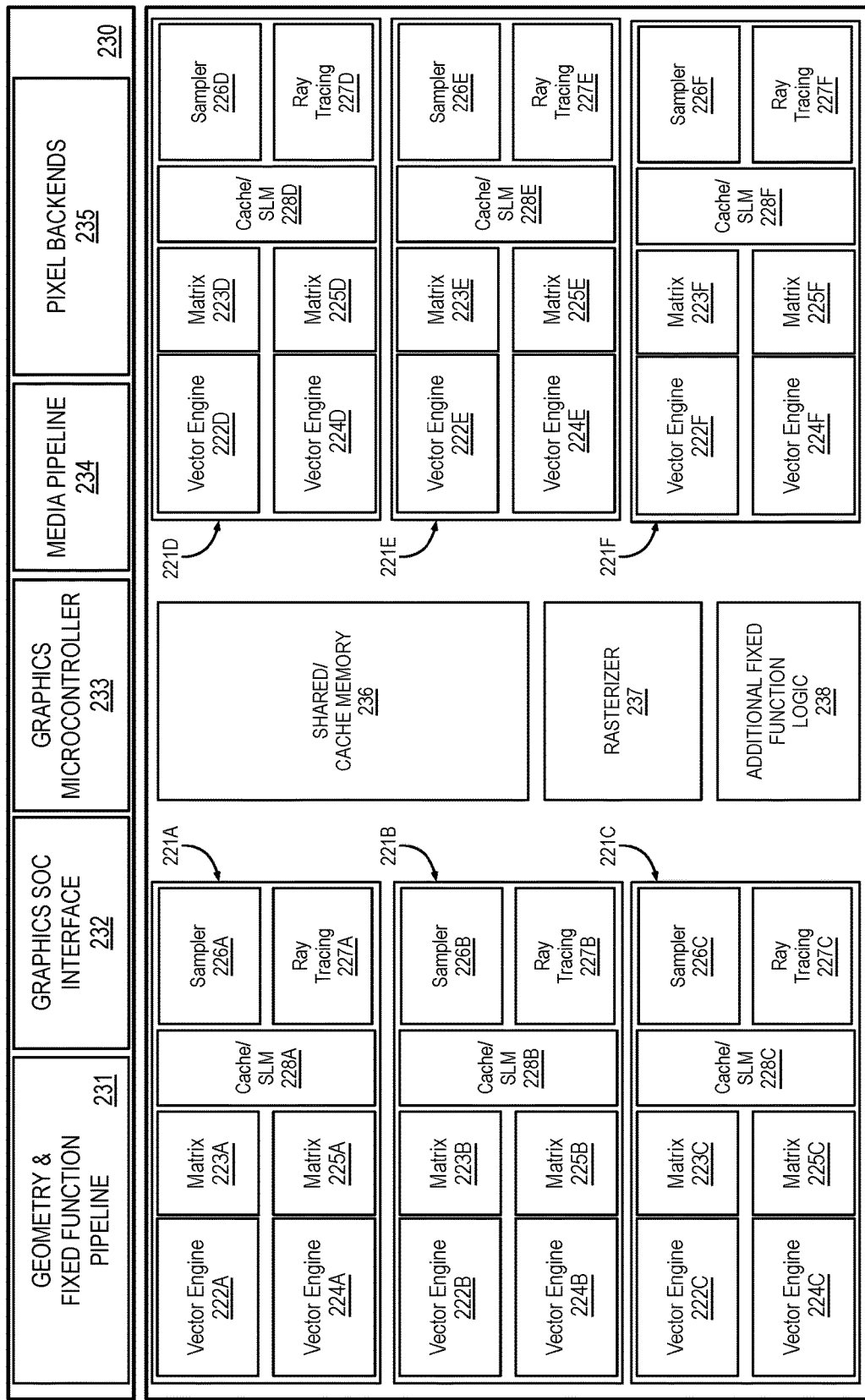

FIG. 2B is a block diagram of hardware logic of a graphics processor core block 219, according to some embodiments described herein. In some embodiments, elements of FIG. 2B having the same reference numbers (or names) as the elements of any other figure herein may operate or function in a manner similar to that described elsewhere herein. The graphics processor core block 219 is exemplary of one partition of a graphics processor. The graphics processor core block 219 can be included within the integrated graphics processor 208 of FIG. 2A or a discrete graphics processor, parallel processor, and/or compute accelerator. A graphics processor as described herein may include multiple graphics core blocks based on target power and performance envelopes. Each graphics processor core block 219 can include a function block 230 coupled with multiple graphics cores 221A-221F that include modular blocks of fixed function logic and general-purpose programmable logic. The graphics processor core block 219 also includes shared/cache memory 236 that is accessible by all graphics cores 221A-221F, rasterizer logic 237, and additional fixed function logic 238.

In some embodiments, the function block 230 includes a geometry/fixed function pipeline 231 that can be shared by all graphics cores in the graphics processor core block 219. In various embodiments, the geometry/fixed function pipeline 231 includes a 3D geometry pipeline a video front-end unit, a thread spawner and global thread dispatcher, and a unified return buffer manager, which manages unified return buffers. In one embodiment the function block 230 also includes a graphics SoC interface 232, a graphics microcontroller 233, and a media pipeline 234. The graphics SoC interface 232 provides an interface between the graphics processor core block 219 and other core blocks within a graphics processor or compute accelerator SoC. The graphics microcontroller 233 is a programmable sub-processor that is configurable to manage various functions of the graphics processor core block 219, including thread dispatch, scheduling, and pre-emption. The media pipeline 234 includes logic to facilitate the decoding, encoding, pre-processing, and/or post-processing of multimedia data, including image and video data. The media pipeline 234 implement media operations via requests to compute or sampling logic within the graphics cores 221-221F. One or more pixel backends 235 can also be included within the function block 230. The pixel backends 235 include a cache memory to store pixel color values and can perform blend operations and lossless color compression of rendered pixel data.

In one embodiment the graphics SoC interface 232 enables the graphics processor core block 219 to communicate with general-purpose application processor cores (e.g., CPUs) and/or other components within an SoC or a system host CPU that is coupled with the SoC via a peripheral interface. The graphics SoC interface 232 also enables communication with off-chip memory hierarchy elements such as a shared last level cache memory, system RAM, and/or embedded on-chip or on-package DRAM. The graphics SoC interface 232 can also enable communication with fixed function devices within the SoC, such as camera imaging pipelines, and enables the use of and/or implements global memory atomics that may be shared between the graphics processor core block 219 and CPUs within the SoC. The graphics SoC interface 232 can also implement power management controls for the graphics processor core block 219 and enable an interface between a clock domain of the graphics processor core block 219 and other clock domains within the SoC. In one embodiment the graphics SoC interface 232 enables receipt of command buffers from a command streamer and global thread dispatcher that are configured to provide commands and instructions to each of one or more graphics cores within a graphics processor. The commands and instructions can be dispatched to the media pipeline 234 when media operations are to be performed, the geometry and fixed function pipeline 231 when graphics processing operations are to be performed. When compute operations are to be performed, compute dispatch logic can dispatch the commands to the graphics cores 221A-221F, bypassing the geometry and media pipelines.

The graphics microcontroller 233 can be configured to perform various scheduling and management tasks for the graphics processor core block 219. In one embodiment the graphics microcontroller 233 can perform graphics and/or compute workload scheduling on the various vector engines 222A-222F, 224A-224F and matrix engines 223A-223F, 225A-225F within the graphics cores 221A-221F. In this scheduling model, host software executing on a CPU core of an SoC including the graphics processor core block 219 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core block 219, providing the graphics processor core block 219 with the ability to save and restore registers within the graphics processor core block 219 across low-power state transitions independently from the operating system and/or graphics driver software on the system.

The graphics processor core block 219 may have greater than or fewer than the illustrated graphics cores 221A-221F, up to N modular graphics cores. For each set of N graphics cores, the graphics processor core block 219 can also include shared/cache memory 236, which can be configured as shared memory or cache memory, rasterizer logic 237, and additional fixed function logic 238 to accelerate various graphics and compute processing operations.

Within each graphics cores 221A-221F is set of execution resources that may be used to perform graphics, media, and compute operations in response to requests by graphics pipeline, media pipeline, or shader programs. The graphics cores 221A-221F include multiple vector engines 222A-222F, 224A-224F, matrix acceleration units 223A-223F, 225A-225D, cache/shared local memory (SLM), a sampler 226A-226F, and a ray tracing unit 227A-227F.

The vector engines 222A-222F, 224A-224F are general-purpose graphics processing units capable of performing floating-point and integer/fixed-point logic operations in service of a graphics, media, or compute operation, including graphics, media, or compute/GPGPU programs. The vector engines 222A-222F, 224A-224F can operate at variable vector widths using SIMD, SIMT, or SIMT+SIMD execution modes. The matrix acceleration units 223A-223F, 225A-225D include matrix-matrix and matrix-vector acceleration logic that improves performance on matrix operations, particularly low and mixed precision (e.g., INT8, FP16, BF16) matrix operations used for machine learning. In one embodiment, each of the matrix acceleration units 223A-223F, 225A-225D includes one or more systolic arrays of processing elements that can perform concurrent matrix multiply or dot product operations on matrix elements.

The sampler 226A-22F can read media or texture data into memory and can sample data differently based on a configured sampler state and the texture/media format that is being read. Threads executing on the vector engines 222A-222F, 224A-224F or matrix acceleration units 223A-223F, 225A-225D can make use of the cache/SLM 228A-228F within each execution core. The cache/SLM 228A-228F can be configured as cache memory or as a pool of shared memory that is local to each of the respective graphics cores 221A-221F. The ray tracing units 227A-227F within the graphics cores 221A-221F include ray traversal/intersection circuitry for performing ray traversal using bounding volume hierarchies (BVHs) and identifying intersections between rays and primitives enclosed within the BVH volumes. In one embodiment the ray tracing units 227A-227F include circuitry for performing depth testing and culling (e.g., using a depth buffer or similar arrangement). In one implementation, the ray tracing units 227A-227F perform traversal and intersection operations in concert with image denoising, at least a portion of which may be performed using an associated matrix acceleration unit 223A-223F, 225A-225D.

Figure 2C:
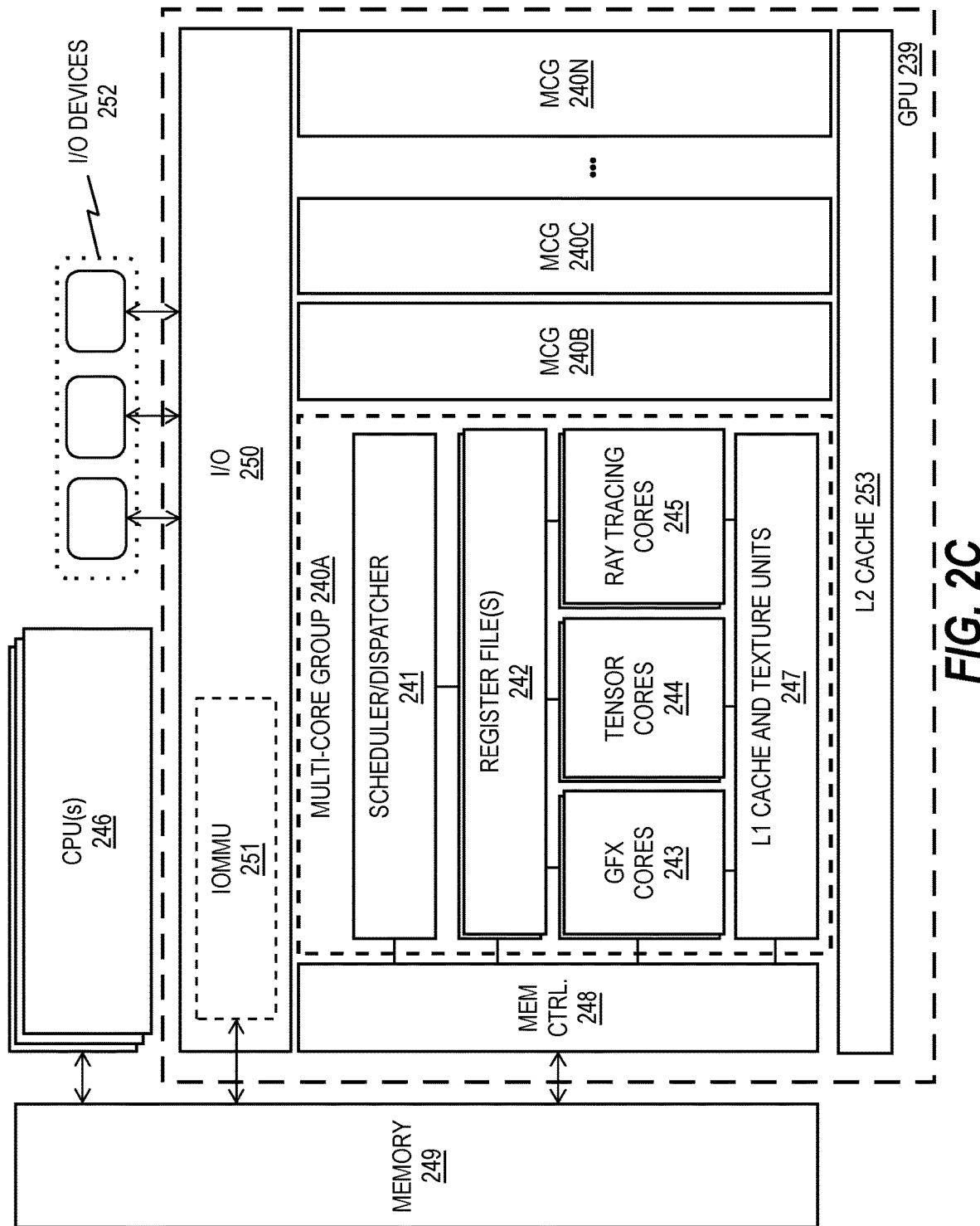

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero-value input to be bypassed. The graphics cores 243 of the GPU 239 of FIG. 2C differ in hierarchical abstraction level relative to the graphics cores 221A-221F of FIG. 2B, which are analogous to the multi-core groups 240A-240N of FIG. 2C. The graphics cores 243, tensor cores 244, and ray tracing cores 245 of FIG. 2C are analogous to, respectively, the vector engines 222A-222F, 224A-224F, matrix engines 223A-223F, 225A-225F, and ray tracing units 227A-227F of FIG. 2B.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating-point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPU(s) 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the embodiments described herein are not limited to this specific implementation.

In one embodiment, the tensor cores 244 include a plurality of functional units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high-speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the embodiments described herein are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the child volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
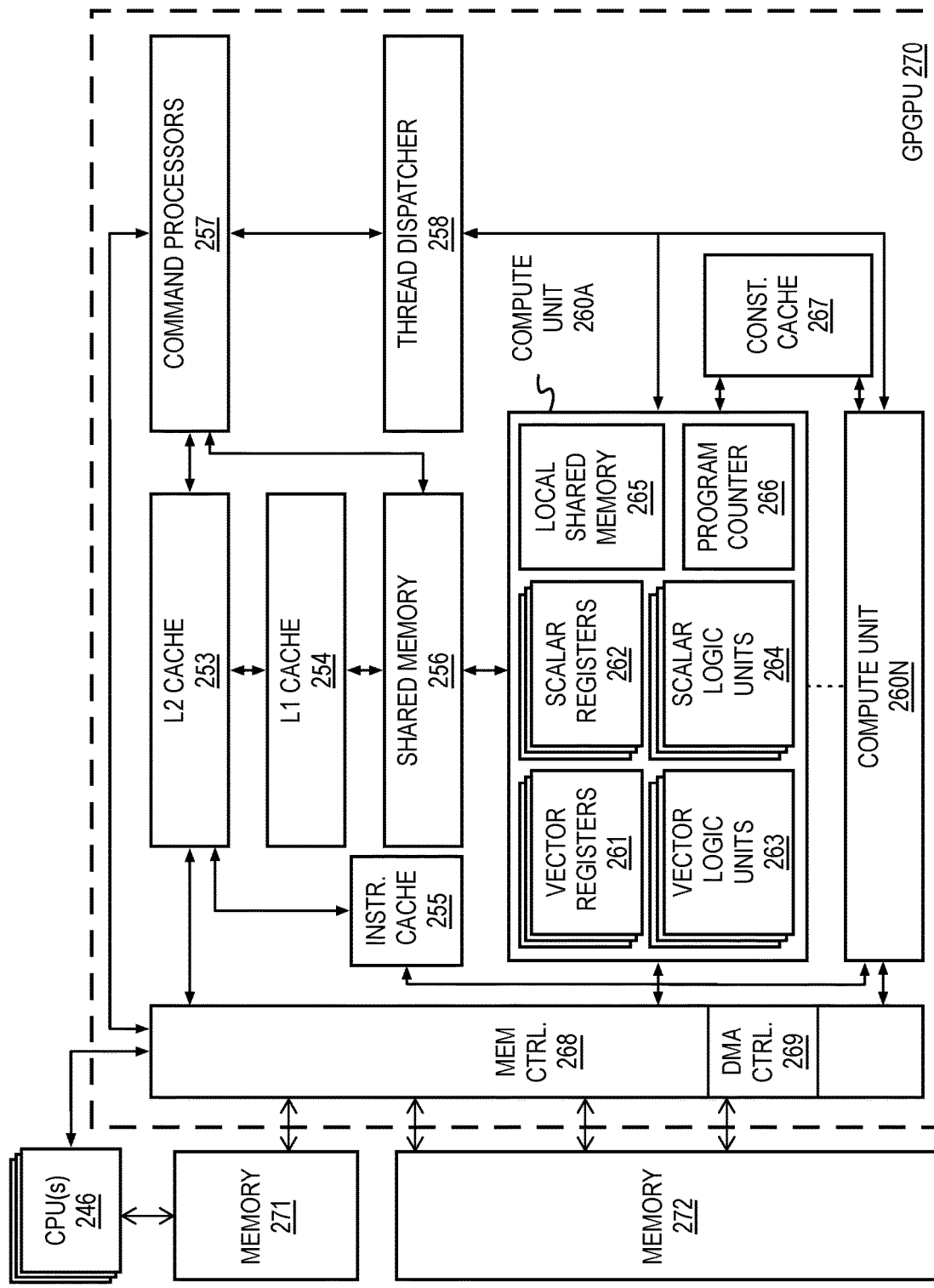

FIG. 2D is a block diagram of general-purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N, which represent a hierarchical abstraction level analogous to the graphics cores 221A-221F of FIG. 2B and the multi-core groups 240A-240N of FIG. 2C. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
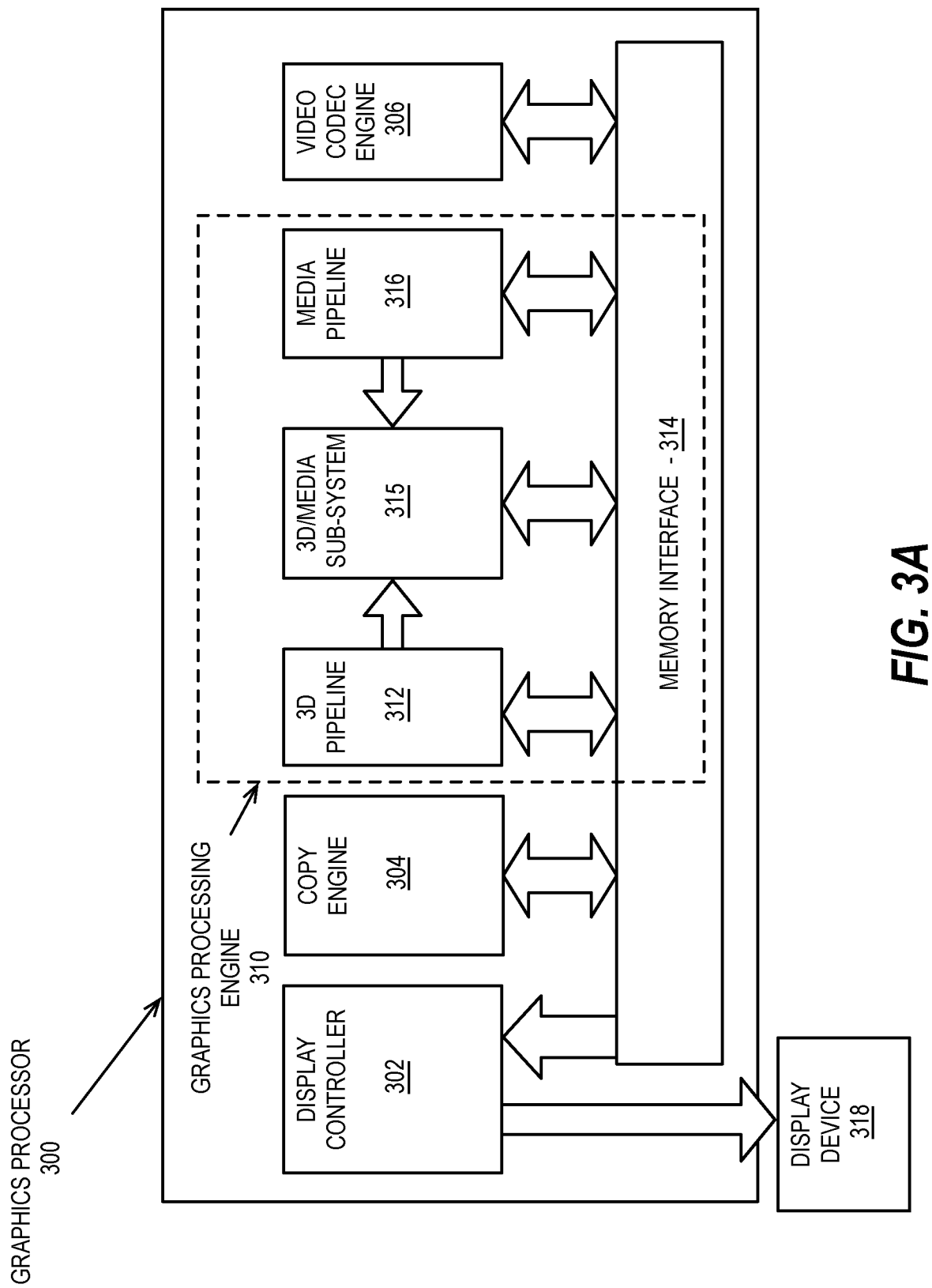
FIG. 3A-3C illustrate block diagrams of additional graphics processor and compute accelerator architectures provided by embodiments described herein.
Figure 3B:
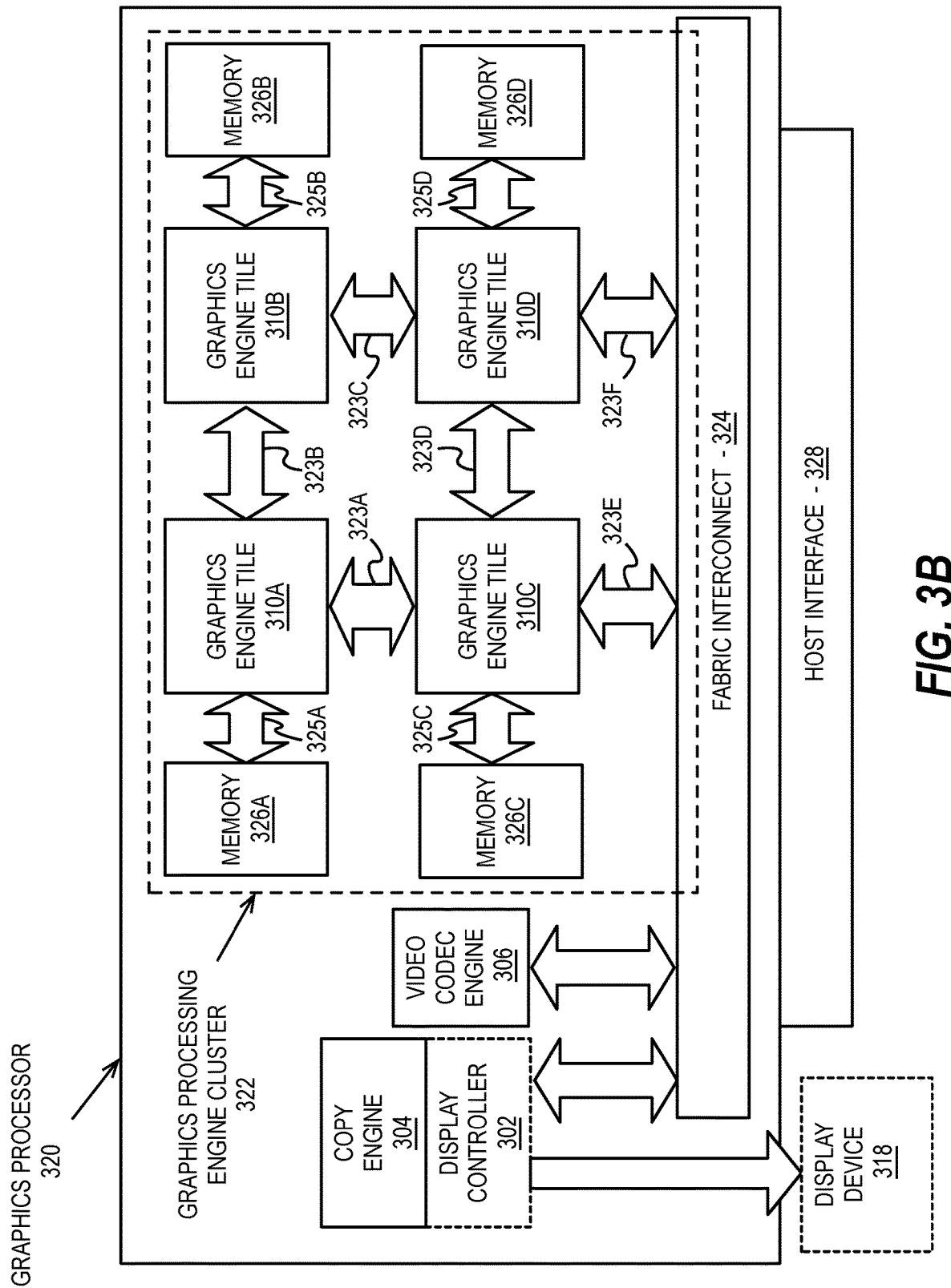
Figure 3C:
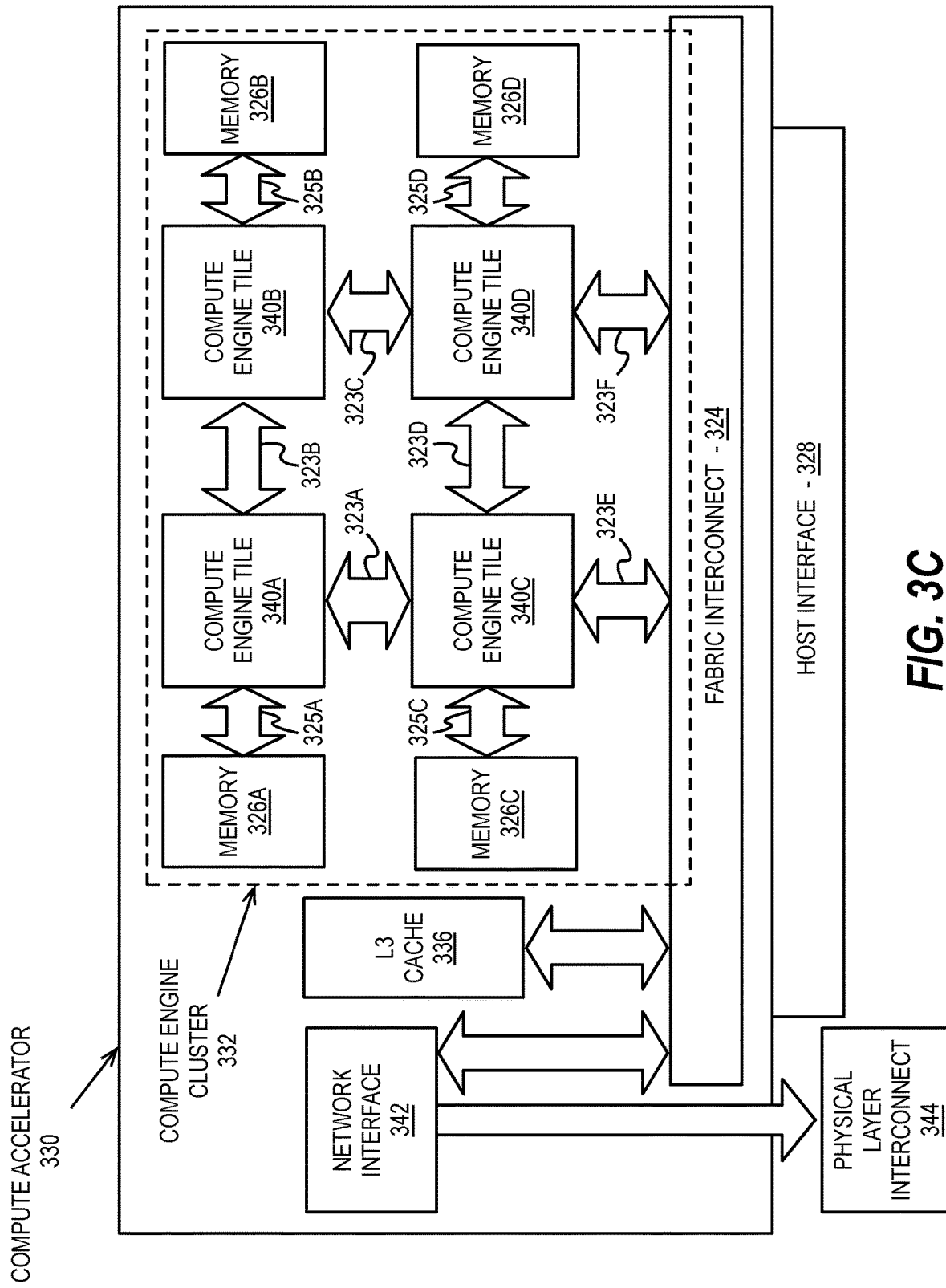

FIG. 3A-3C illustrate block diagrams of additional graphics processor and compute accelerator architectures provided by embodiments described herein. The elements of FIG. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics cores included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics cores to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are HBM modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIG. 11B-11D.

The graphics processor 320 may be configured with a non-uniform memory access (NUMA) systemin which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320 or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
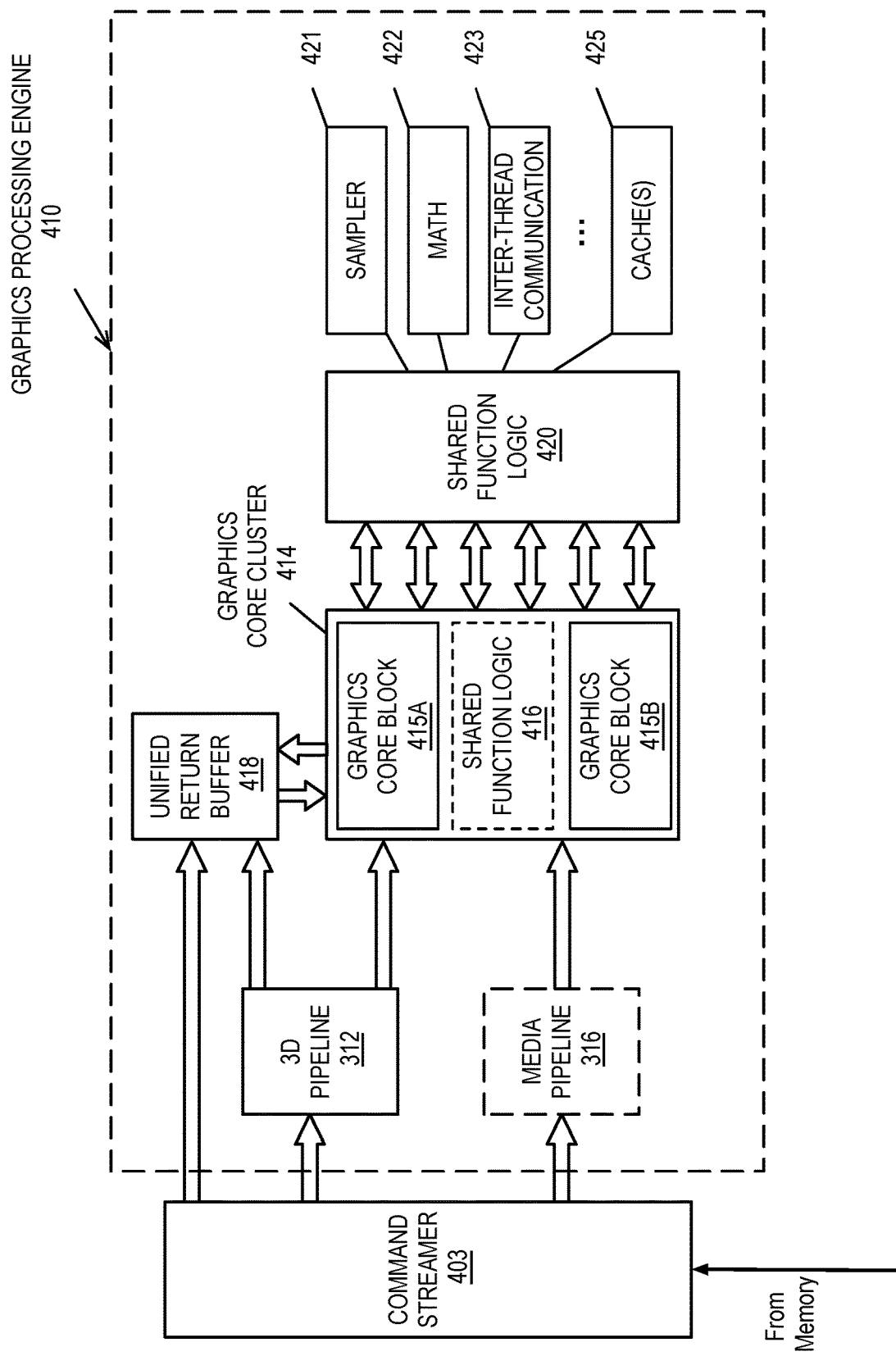
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer 418. The unified return buffer 418 may be communicatively coupled to a graphics core cluster 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core cluster 414. In one embodiment the graphics core cluster 414 include one or more blocks of graphics cores (e.g., graphics core block 415A, graphics core block 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic, such as matrix or AI acceleration logic.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core cluster 414. The graphics core cluster 414 provides a unified block of execution resources for use in processing these shader programs. Multi-purpose execution logic within the graphics core blocks 415A-415B of the graphics core cluster 414 includes support for various 3D API shader languages and can execute multiple simultaneous execution threads associated with multiple shaders.

In some embodiments, the graphics core cluster 414 includes execution logic to perform media functions, such as video and/or image processing. In one embodiment, the graphics cores include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core cluster 414 can output data to memory in a unified return buffer (URB) 418. The URB 418 can store data for multiple threads. In some embodiments the URB 418 may be used to send data between different threads executing on the graphics core cluster 414. In some embodiments the URB 418 may additionally be used for synchronization between threads on the graphics core array and fixed function logic within the shared function logic 420.

In some embodiments, graphics core cluster 414 is scalable, such that the cluster includes a variable number of graphics cores, each having a variable number of graphics cores based on the target power and performance level of GPE 410. In one embodiment the execution resources are dynamically scalable, such that execution resources may be enabled or disabled as needed.

The graphics core cluster 414 couples with shared function logic 420 that includes multiple resources that are shared between the graphics cores in the graphics core array. The shared functions within the shared function logic 420 are hardware logic units that provide specialized supplemental functionality to the graphics core cluster 414. In various embodiments, shared function logic 420 may include, but is not limited to sampler 421, math 422, and inter-thread communication (ITC) 423 logic. Additionally, some embodiments implement one or more cache(s) 425 within the shared function logic 420. The shared function logic 420 can implement the same or similar functionality as the additional fixed function logic 238 of FIG. 2B.

A shared function is implemented at least in a case where the demand for a given specialized function is insufficient for inclusion within the graphics core cluster 414. Instead, a single instantiation of that specialized function is implemented as a stand-alone entity in the shared function logic 420 and shared among the execution resources within the graphics core cluster 414. The precise set of functions that are shared between the graphics core cluster 414 and included within the graphics core cluster 414 varies across embodiments. In some embodiments, specific shared functions within the shared function logic 420 that are used extensively by the graphics core cluster 414 may be included within shared function logic 416 within the graphics core cluster 414. In various embodiments, the shared function logic 416 within the graphics core cluster 414 can include some or all logic within the shared function logic 420. In one embodiment, all logic elements within the shared function logic 420 may be duplicated within the shared function logic 416 of the graphics core cluster 414. In one embodiment the shared function logic 420 is excluded in favor of the shared function logic 416 within the graphics core cluster 414.

Graphics Processing Resources

Figure 5A:
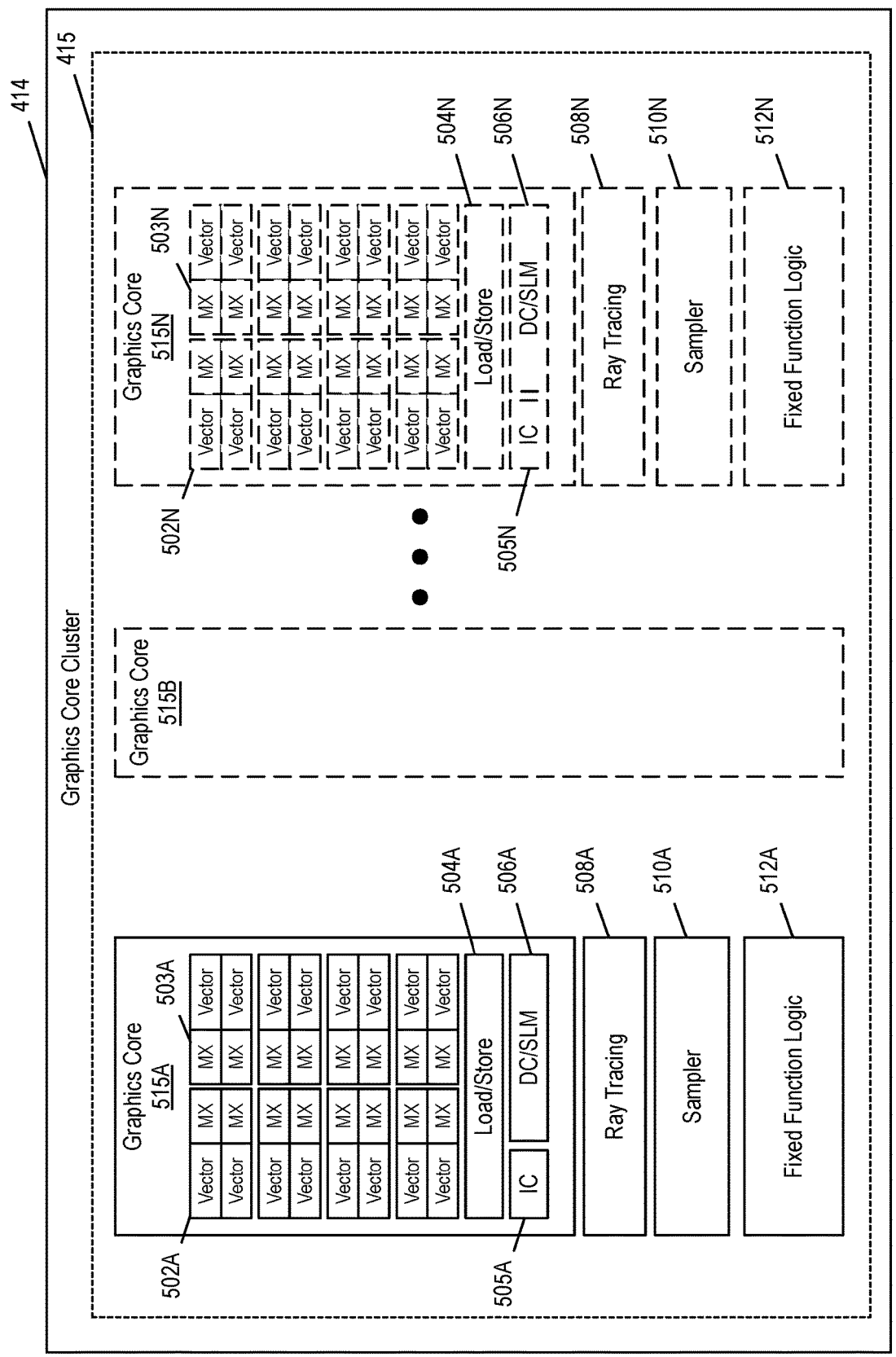
FIG. 5A-5C illustrate thread execution logic including an array of processing elements employed in a graphics processor core according to embodiments.
Figure 5B:
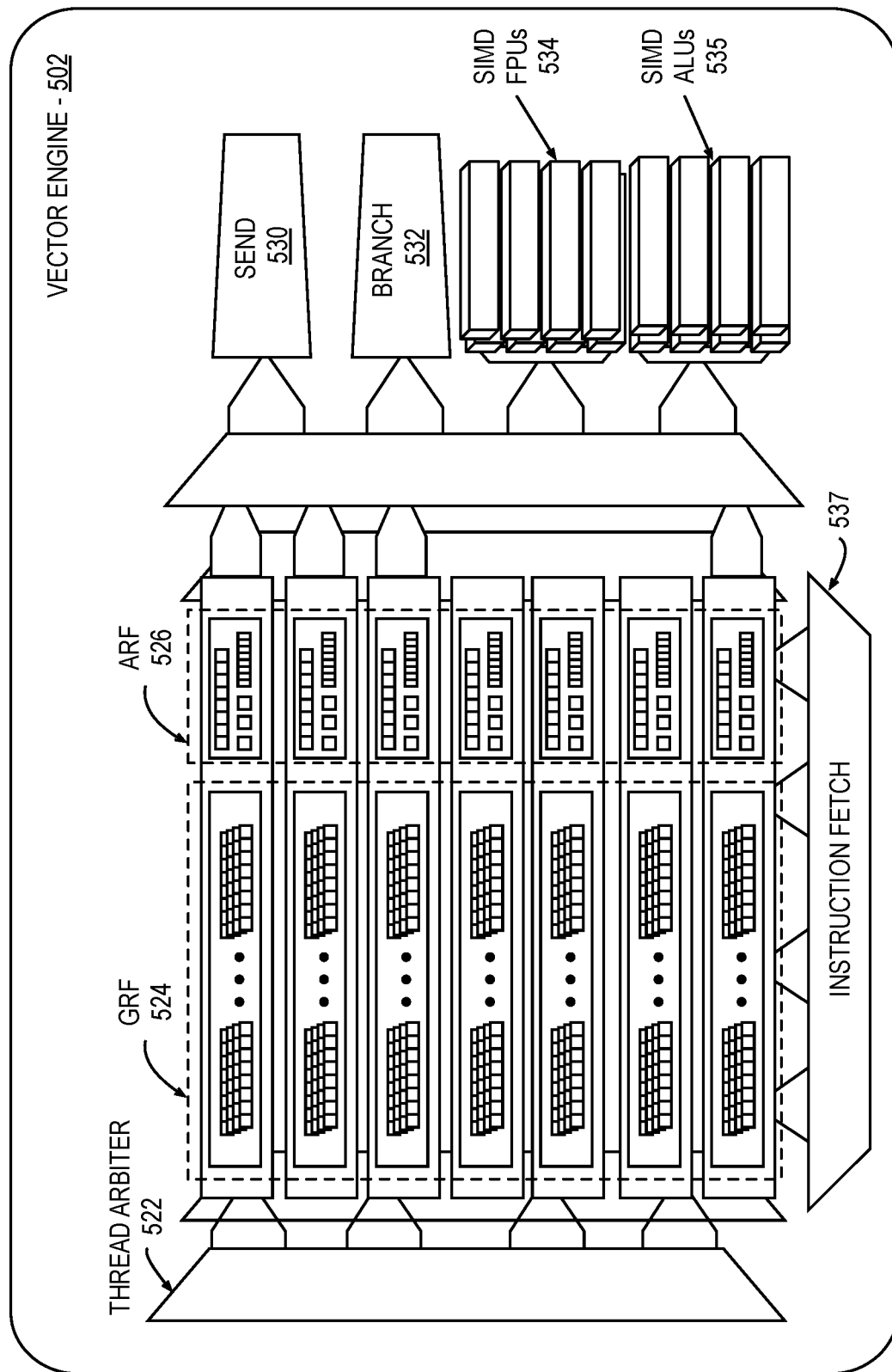
Figure 5C:
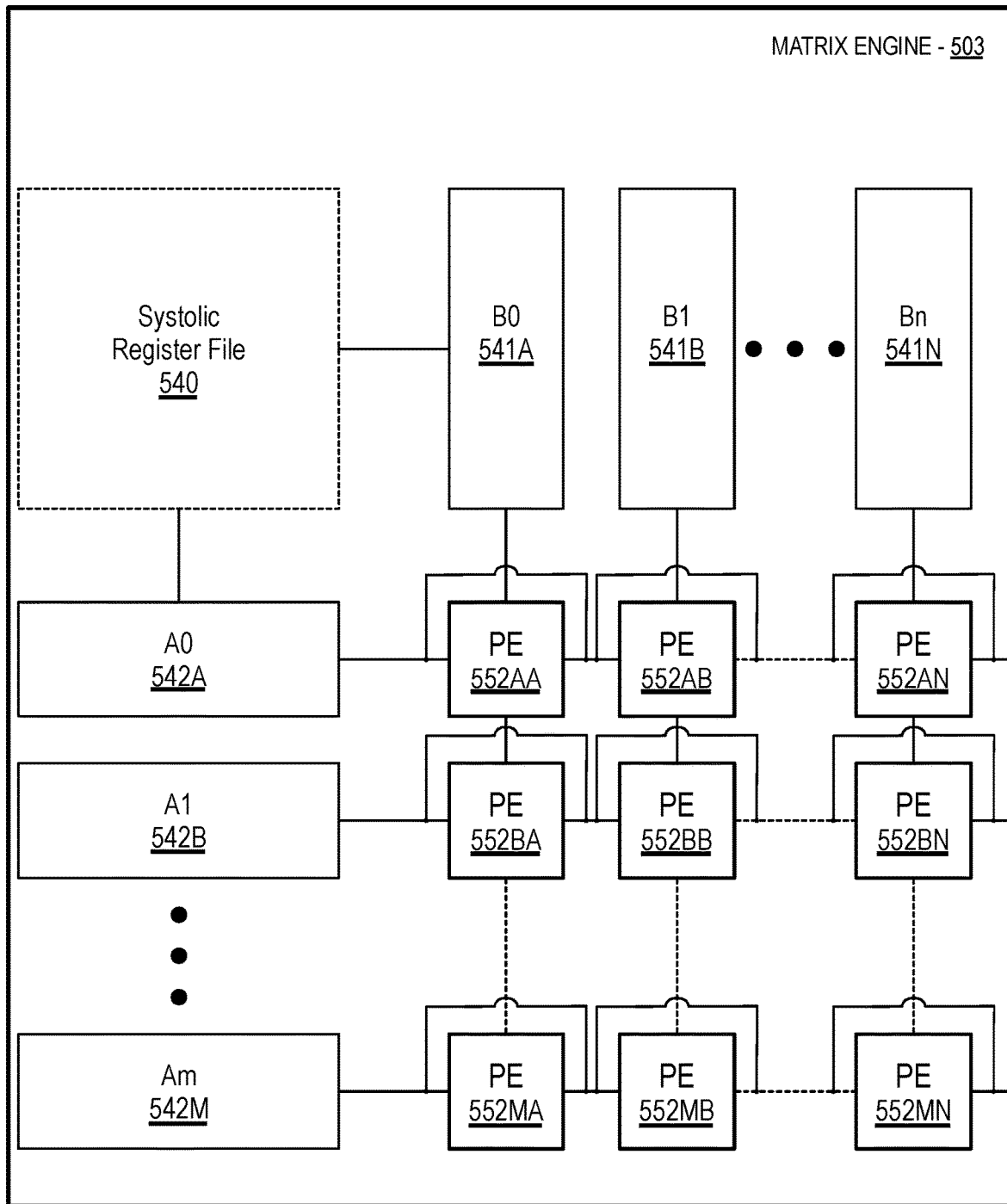

FIG. 5A-5C illustrate execution logic including an array of processing elements employed in a graphics processor, according to embodiments described herein. FIG. 5A illustrates graphics core cluster, according to an embodiment. FIG. 5B illustrates a vector engine of a graphics core, according to an embodiment. FIG. 5C illustrates a matrix engine of a graphics core, according to an embodiment. Elements of FIG. 5A-5C having the same reference numbers as the elements of any other figure herein may operate or function in any manner similar to that described elsewhere herein, but are not limited as such. For example, the elements of FIG. 5A-5C can be considered in the context of the graphics processor core block 219 of FIG. 2B, and/or the graphics core blocks 415A-415B of FIG. 4. In one embodiment, the elements of FIG. 5A-5C have similar functionality to equivalent components of the graphics processor 208 of FIG. 2A, the GPU 239 of FIG. 2C or the GPGPU 270 of FIG. 2D.

As shown in FIG. 5A, in one embodiment the graphics core cluster 414 includes a graphics core block 415, which may be graphics core block 415A or graphics core block 415B of FIG. 4. The graphics core block 415 can include any number of graphics cores (e.g., graphics core 515A, graphics core 515B, through graphics core 515N). Multiple instances of the graphics core block 415 may be included. In one embodiment the elements of the graphics cores 515A-515N have similar or equivalent functionality as the elements of the graphics cores 221A-221F of FIG. 2B. In such embodiment, the graphics cores 515A-515N each include circuitry including but not limited to vector engines 502A-502N, matrix engines 503A-503N, memory load/store units 504A-504N, instruction caches 505A-505N, data caches/shared local memory 506A-506N, ray tracing units 508A-508N, samplers 510A-2710N. The circuitry of the graphics cores 515A-515N can additionally include fixed function logic 512A-512N. The number of vector engines 502A-502N and matrix engines 503A-503N within the graphics cores 515A-515N of a design can vary based on the workload, performance, and power targets for the design.

With reference to graphics core 515A, the vector engine 502A and matrix engine 503A are configurable to perform parallel compute operations on data in a variety of integer and floating-point data formats based on instructions associated with shader programs. Each vector engine 502A and matrix engine 503A can act as a programmable general-purpose computational unit that is capable of executing multiple simultaneous hardware threads while processing multiple data elements in parallel for each thread. The vector engine 502A and matrix engine 503A support the processing of variable width vectors at various SIMD widths, including but not limited to SIMD8, SIMD16, and SIMD32. Input data elements can be stored as a packed data type in a register and the vector engine 502A and matrix engine 503A can process the various elements based on the data size of the elements. For example, when operating on a 256-bit wide vector, the 256 bits of the vector are stored in a register and the vector is processed as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible. In one embodiment, the vector engine 502A and matrix engine 503A are also configurable for SIMT operation on warps or thread groups of various sizes (e.g., 8, 16, or 32 threads).

Continuing with graphics core 515A, the memory load/store unit 504A services memory access requests that are issued by the vector engine 502A, matrix engine 503A, and/or other components of the graphics core 515A that have access to memory. The memory access request can be processed by the memory load/store unit 504A to load or store the requested data to or from cache or memory into a register file associated with the vector engine 502A and/or matrix engine 503A. The memory load/store unit 504A can also perform prefetching operations. In one embodiment, the memory load/store unit 504A is configured to provide SIMT scatter/gather prefetching or block prefetching for data stored in memory 610, from memory that is local to other tiles via the tile interconnect 608, or from system memory. Prefetching can be performed to a specific L1 cache (e.g., data cache/shared local memory 506A), the L2 cache 604 or the L3 cache 606. In one embodiment, a prefetch to the L3 cache 606 automatically results in the data being stored in the L2 cache 604.

The instruction cache 505A stores instructions to be executed by the graphics core 515A. In one embodiment, the graphics core 515A also includes instruction fetch and prefetch circuitry that fetches or prefetches instructions into the instruction cache 505A. The graphics core 515A also includes instruction decode logic to decode instructions within the instruction cache 505A. The data cache/shared local memory 506A can be configured as a data cache that is managed by a cache controller that implements a cache replacement policy and/or configured as explicitly managed shared memory. The ray tracing unit 508A includes circuitry to accelerate ray tracing operations. The sampler 510A provides texture sampling for 3D operations and media sampling for media operations. The fixed function logic 512A includes fixed function circuitry that is shared between the various instances of the vector engine 502A and matrix engine 503A. Graphics cores 515B-515N can operate in a similar manner as graphics core 515A.

Functionality of the instruction caches 505A-505N, data caches/shared local memory 506A-506N, ray tracing units 508A-508N, samplers 510A-2710N, and fixed function logic 512A-512N corresponds with equivalent functionality in the graphics processor architectures described herein. For example, the instruction caches 505A-505N can operate in a similar manner as instruction cache 255 of FIG. 2D. The data caches/shared local memory 506A-506N, ray tracing units 508A-508N, and samplers 510A-2710N can operate in a similar manner as the cache/SLM 228A-228F, ray tracing units 227A-227F, and samplers 226A-226F of FIG. 2B. The fixed function logic 512A-512N can include elements of the geometry/fixed function pipeline 231 and/or additional fixed function logic 238 of FIG. 2B. In one embodiment, the ray tracing units 508A-508N include circuitry to perform ray tracing acceleration operations performed by the ray tracing cores 245 of FIG. 2C.

As shown in FIG. 5B, in one embodiment the vector engine 502 includes an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of integer SIMD ALUs 535. The GRF 524 and ARF 526 includes the set of general register files and architecture register files associated with each hardware thread that may be active in the vector engine 502. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the vector engine 502 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per graphics core, where graphics core resources are divided across logic used to execute multiple simultaneous threads. The number of logical threads that may be executed by the vector engine 502 is not limited to the number of hardware threads, and multiple logical threads can be assigned to each hardware thread.

In one embodiment, the vector engine 502 can co-issue multiple instructions, which may each be different instructions. The thread arbiter 522 can dispatch the instructions to one of the send unit 530, branch unit 532, or SIMD FPU(s) 534 for execution. Each execution thread can access 128 general-purpose registers within the GRF 524, where each register can store 32 bytes, accessible as a variable width vector of 32-bit data elements. In one embodiment, each thread has access to 4 Kbytes within the GRF 524, although embodiments are not so limited, and greater or fewer register resources may be provided in other embodiments. In one embodiment the vector engine 502 is partitioned into seven hardware threads that can independently perform computational operations, although the number of threads per vector engine 502 can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the vector engine 502 includes one or more SIMD floating point units (FPU(s)) 534 to perform floating-point operations. In one embodiment, the FPU(s) 534 also support integer computation. In one embodiment the FPU(s) 534 can execute up to M number of 32-bit floating-point (or integer) operations, or execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 535 are also present and may be specifically optimized to perform operations associated with machine learning computations. In one embodiment, the SIMD ALUs are replaced by an additional set of SIMD FPUs 534 that are configurable to perform integer and floating-point operations. In one embodiment, the SIMD FPUs 534 and SIMD ALUs 535 are configurable to execute SIMT programs. In one embodiment, combined SIMD+SIMT operation is supported.

In one embodiment, arrays of multiple instances of the vector engine 502 can be instantiated in a graphics core. For scalability, product architects can choose the exact number of vector engines per graphics core grouping. In one embodiment the vector engine 502 can execute instructions across a plurality of execution channels. In a further embodiment, each thread executed on the vector engine 502 is executed on a different channel.

As shown in FIG. 5C, in one embodiment the matrix engine 503 includes an array of processing elements that are configured to perform tensor operations including vector/matrix and matrix/matrix operations, such as but not limited to matrix multiply and/or dot product operations. The matrix engine 503 is configured with M rows and N columns of processing elements (PE 552AA-PE 552MN) that include multiplier and adder circuits organized in a pipelined fashion. In one embodiment, the processing elements 552AA-PE 552MN make up the physical pipeline stages of an N wide and M deep systolic array that can be used to perform vector/matrix or matrix/matrix operations in a data-parallel manner, including matrix multiply, fused multiply-add, dot product or other general matrix-matrix multiplication (GEMM) operations. In one embodiment the matrix engine 503 supports 16-bit floating point operations, as well as 8-bit, 4-bit, 2-bit, and binary integer operations. The matrix engine 503 can also be configured to accelerate specific machine learning operations. In such embodiments, the matrix engine 503 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

In one embodiment, during each cycle, each stage can add the result of operations performed at that stage to the output of the previous stage. In other embodiments, the pattern of data movement between the processing elements 552AA-552MN after a set of computational cycles can vary based on the instruction or macro-operation being performed. For example, in one embodiment partial sum loopback is enabled and the processing elements may instead add the output of a current cycle with output generated in the previous cycle. In one embodiment, the final stage of the systolic array can be configured with a loopback to the initial stage of the systolic array. In such embodiment, the number of physical pipeline stages may be decoupled from the number of logical pipeline stages that are supported by the matrix engine 503. For example, where the processing elements 552AA-552MN are configured as a systolic array of M physical stages, a loopback from stage M to the initial pipeline stage can enable the processing elements 552AA-PE552MN to operate as a systolic array of, for example, 2M, 3M, 4M, etc., logical pipeline stages.

In one embodiment, the matrix engine 503 includes memory 541A-541N, 542A-542M to store input data in the form of row and column data for input matrices. Memory 542A-542M is configurable to store row elements (A0-Am) of a first input matrix and memory 541A-541N is configurable to store column elements (B0-Bn) of a second input matrix. The row and column elements are provided as input to the processing elements 552AA-552MN for processing. In one embodiment, row and column elements of the input matrices can be stored in a systolic register file 540 within the matrix engine 503 before those elements are provided to the memory 541A-541N, 542A-542M. In one embodiment, the systolic register file 540 is excluded and the memory 541A-541N, 542A-542M is loaded from registers in an associated vector engine (e.g., GRF 524 of vector engine 502 of FIG. 5B) or other memory of the graphics core that includes the matrix engine 503 (e.g., data cache/shared local memory 506A for matrix engine 503A of FIG. 5A). Results generated by the processing elements 552AA-552MN are then output to an output buffer and/or written to a register file (e.g., systolic register file 540, GRF 524, data cache/shared local memory 506A-506N) for further processing by other functional units of the graphics processor or for output to memory.

In some embodiments, the matrix engine 503 is configured with support for input sparsity, where multiplication operations for sparse regions of input data can be bypassed by skipping multiply operations that have a zero-value operand. In one embodiment, the processing elements 552AA-552MN are configured to skip the performance of certain operations that have zero value input. In one embodiment, sparsity within input matrices can be detected and operations having known zero output values can be bypassed before being submitted to the processing elements 552AA-552MN. The loading of zero value operands into the processing elements can be bypassed and the processing elements 552AA-552MN can be configured to perform multiplications on the non-zero value input elements. The matrix engine 503 can also be configured with support for output sparsity, such that operations with results that are pre-determined to be zero are bypassed. For input sparsity and/or output sparsity, in one embodiment, metadata is provided to the processing elements 552AA-552MN to indicate, for a processing cycle, which processing elements and/or data channels are to be active during that cycle.

In one embodiment, the matrix engine 503 includes hardware to enable operations on sparse data having a compressed representation of a sparse matrix that stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the matrix engine 503 can used the compression metadata for the compressed data to enable operations to be performed on only non-zero values, or to enable blocks of zero data input to be bypassed for multiply operations.

In various embodiments, input data can be provided by a programmer in a compressed tensor representation, or a codec can compress input data into the compressed tensor representation or another sparse data encoding. In addition to support for compressed tensor representations, streaming compression of sparse input data can be performed before the data is provided to the processing elements 552AA-552MN. In one embodiment, compression is performed on data written to a cache memory associated with the graphics core cluster 414, with the compression being performed with an encoding that is supported by the matrix engine 503. In one embodiment, the matrix engine 503 includes support for input having structured sparsity in which a pre-determined level or pattern of sparsity is imposed on input data. This data may be compressed to a known compression ratio, with the compressed data being processed by the processing elements 552AA-552MN according to metadata associated with the compressed data.

Figure 6:
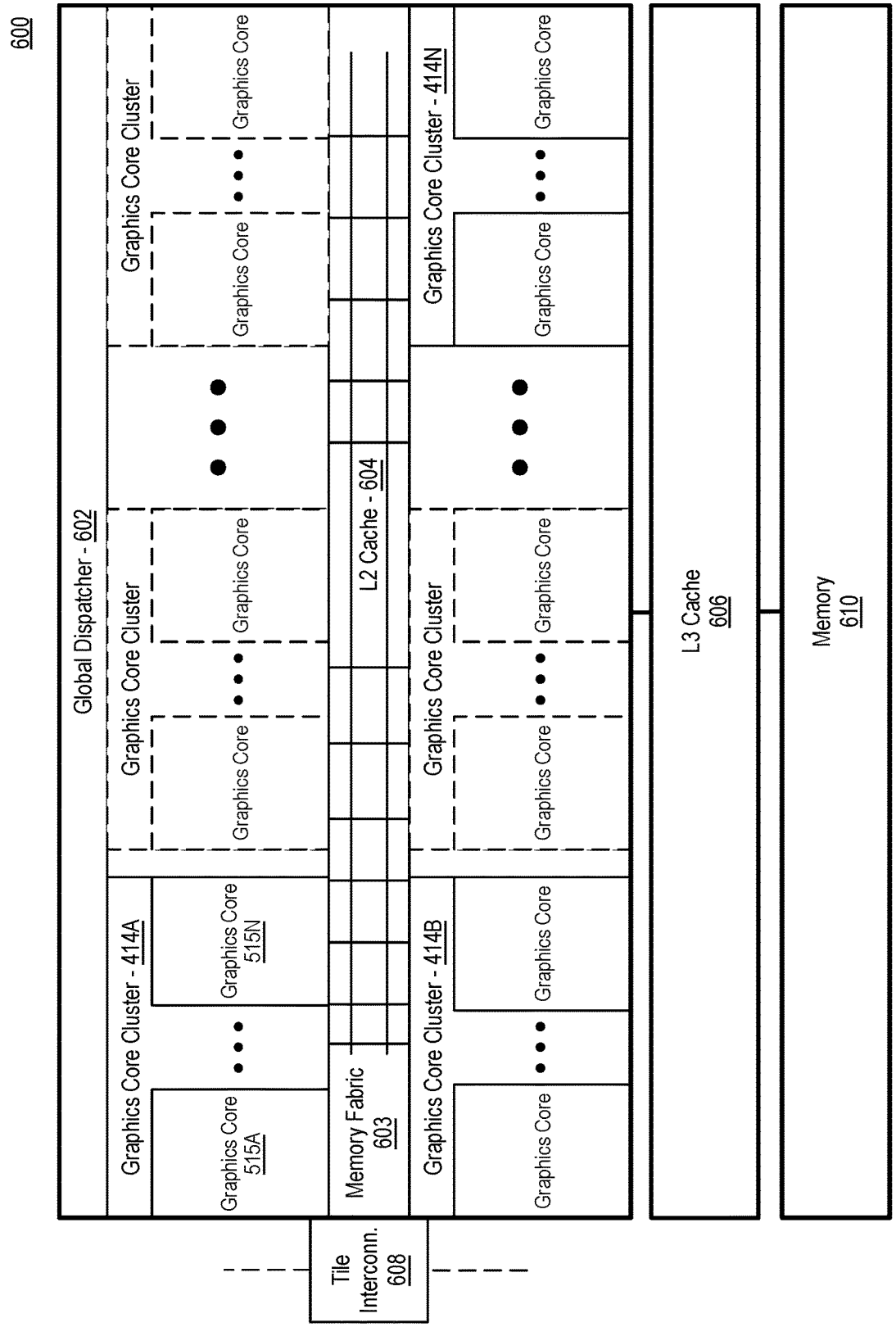
FIG. 6 illustrates a tile of a multi-tile processor, according to an embodiment.

FIG. 6 illustrates a tile 600 of a multi-tile processor, according to an embodiment. In one embodiment, the tile 600 is representative of one of the graphics engine tiles 310A-310D of FIG. 3B or compute engine tiles 340A-340D of FIG. 3C. The tile 600 of the multi-tile graphics processor includes an array of graphics core clusters (e.g., graphics core cluster 414A, graphics core cluster 414B, through graphics core cluster 414N), with each graphics core cluster having an array of graphics cores 515A-515N. The tile 600 also includes a global dispatcher 602 to dispatch threads to processing resources of the tile 600.

The tile 600 can include or couple with an L3 cache 606 and memory 610. In various embodiments, the L3 cache 606 may be excluded or the tile 600 can include additional levels of cache, such as an L4 cache. In one embodiment, each instance of the tile 600 in the multi-tile graphics processor has an associated memory 610, such as in FIG. 3B and FIG. 3C. In one embodiment, a multi-tile processor can be configured as a multi-chip module in which the L3 cache 606 and/or memory 610 reside on separate chiplets than the graphics core clusters 414A-414N. In this context, a chiplet is an at least partially packaged integrated circuit that includes distinct units of logic that can be assembled with other chiplets into a larger package. For example, the L3 cache 606 can be included in a dedicated cache chiplet or can reside on the same chiplet as the graphics core clusters 414A-414N. In one embodiment, the L3 cache 606 can be included in an active base die or active interposer, as illustrated in FIG. 11C.

A memory fabric 603 enables communication among the graphics core clusters 414A-414N, L3 cache 606, and memory 610. An L2 cache 604 couples with the memory fabric 603 and is configurable to cache transactions performed via the memory fabric 603. A tile interconnect 608 enables communication with other tiles on the graphics processors and may be one of tile interconnects 323A-323F of FIGS. 3B and 3C. In embodiments in which the L3 cache 606 is excluded from the tile 600, the L2 cache 604 may be configured as a combined L2/L3 cache. The memory fabric 603 is configurable to route data to the L3 cache 606 or memory controllers associated with the memory 610 based on the presence or absence of the L3 cache 606 in a specific implementation. The L3 cache 606 can be configured as a per-tile cache that is dedicated to processing resources of the tile 600 or may be a partition of a GPU-wide L3 cache.

FIG. 7 is a block diagram illustrating graphics processor instruction formats 700 according to some embodiments. In one or more embodiment, the graphics processor cores support an instruction set having instructions in multiple formats. The solid lined boxes illustrate the components that are generally included in a graphics core instruction, while the dashed lines include components that are optional or that are only included in a sub-set of the instructions. In some embodiments, the graphics processor instruction formats 700 described and illustrated are macro-instructions, in that they are instructions supplied to the graphics core, as opposed to micro-operations resulting from instruction decode once the instruction is processed. Thus, a single instruction may cause hardware to perform multiple micro-operations.

In some embodiments, the graphics processor natively supports instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit compacted instruction format 730. The native instructions available in the 64-bit compacted instruction format 730 vary by embodiment. In some embodiments, the instruction is compacted in part using a set of index values in an index field 713. The graphics core hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the graphics core is to perform. The graphics cores execute each instruction in parallel across the multiple data elements of each operand. For example, in response to an add instruction the graphics core performs a simultaneous add operation across each color channel representing a texture element or picture element. By default, the graphics core performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compacted instruction format 730.

Some graphics core instructions have up to three operands including two source operands, src0 720, src1 722, and one destination 718. In some embodiments, the graphics cores support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on instruction opcode 712 bit-fields to simplify Opcode decode 740. For an 8-bit opcode, bits 4, 5, and 6 allow the graphics core to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math instruction group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of a graphics core will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
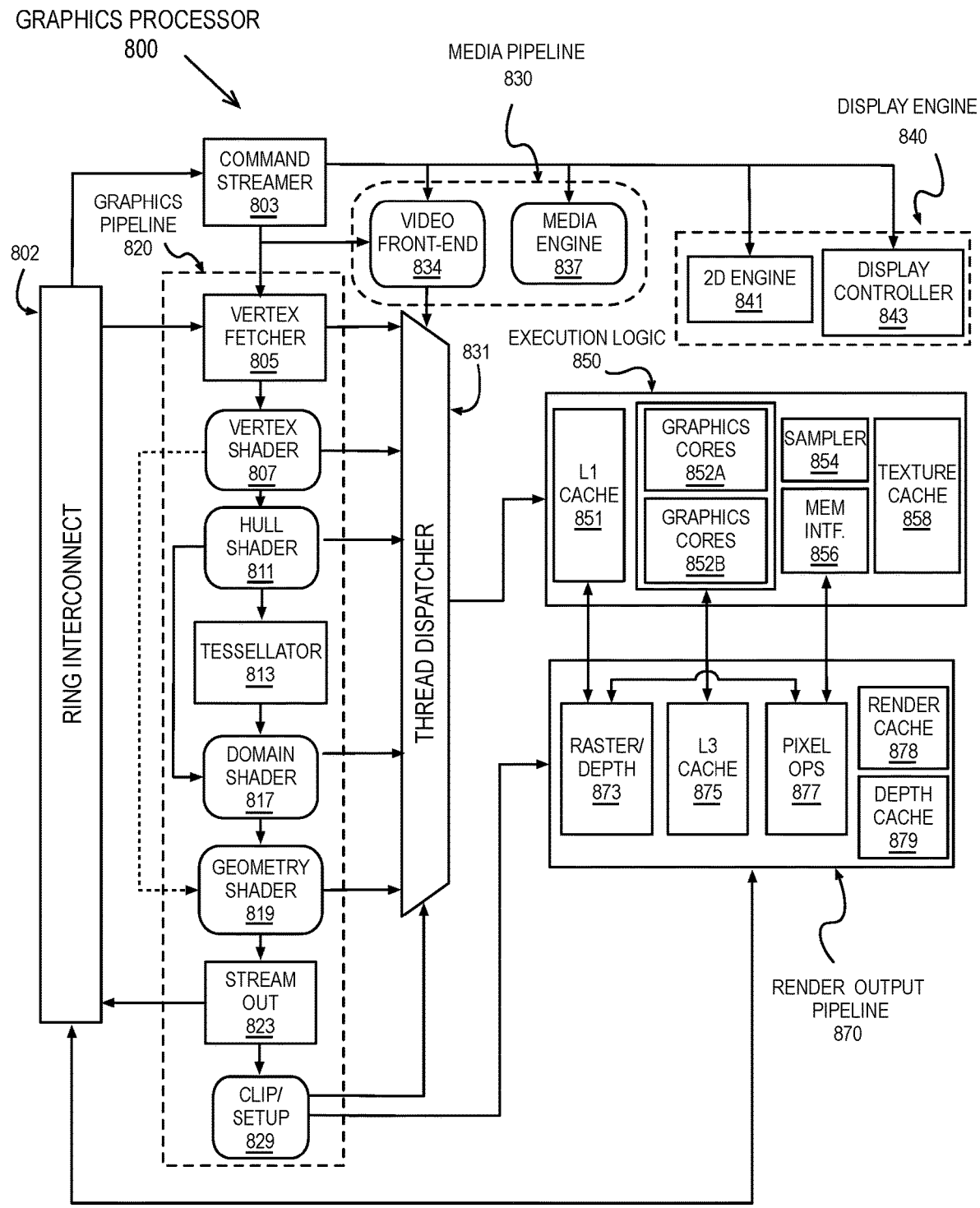
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to graphics cores 852A-852B via a thread dispatcher 831.

In some embodiments, graphics cores 852A-852B are an array of vector processors having an instruction set for performing graphics and media operations. In some embodiments, graphics cores 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to graphics cores 852A-852B or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, graphics cores 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and graphics cores 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g., bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 that may be used to program graphics processing pipelines according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and a data field 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands related to the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader programs to the graphics cores.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back-end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
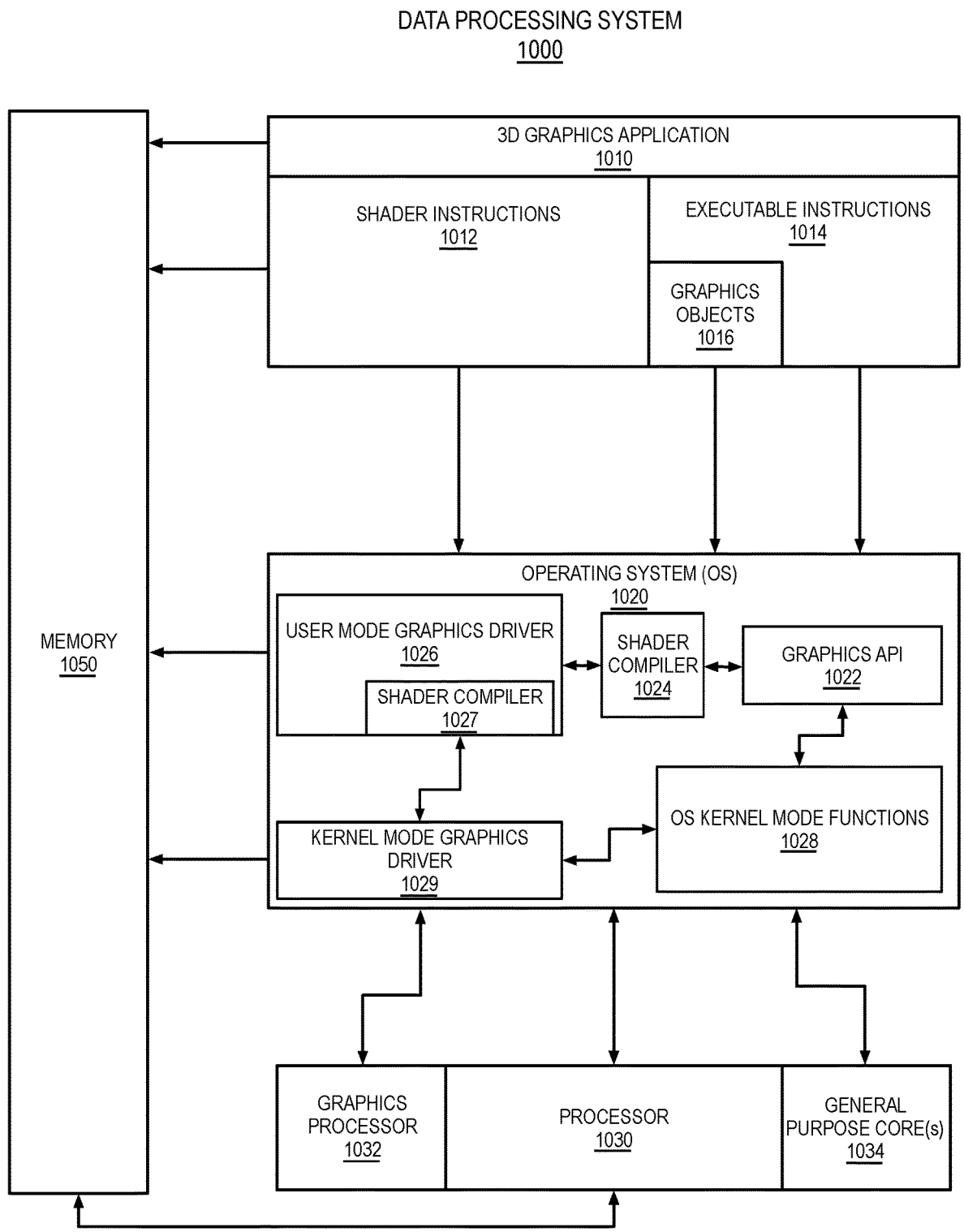
FIG. 10 illustrates exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
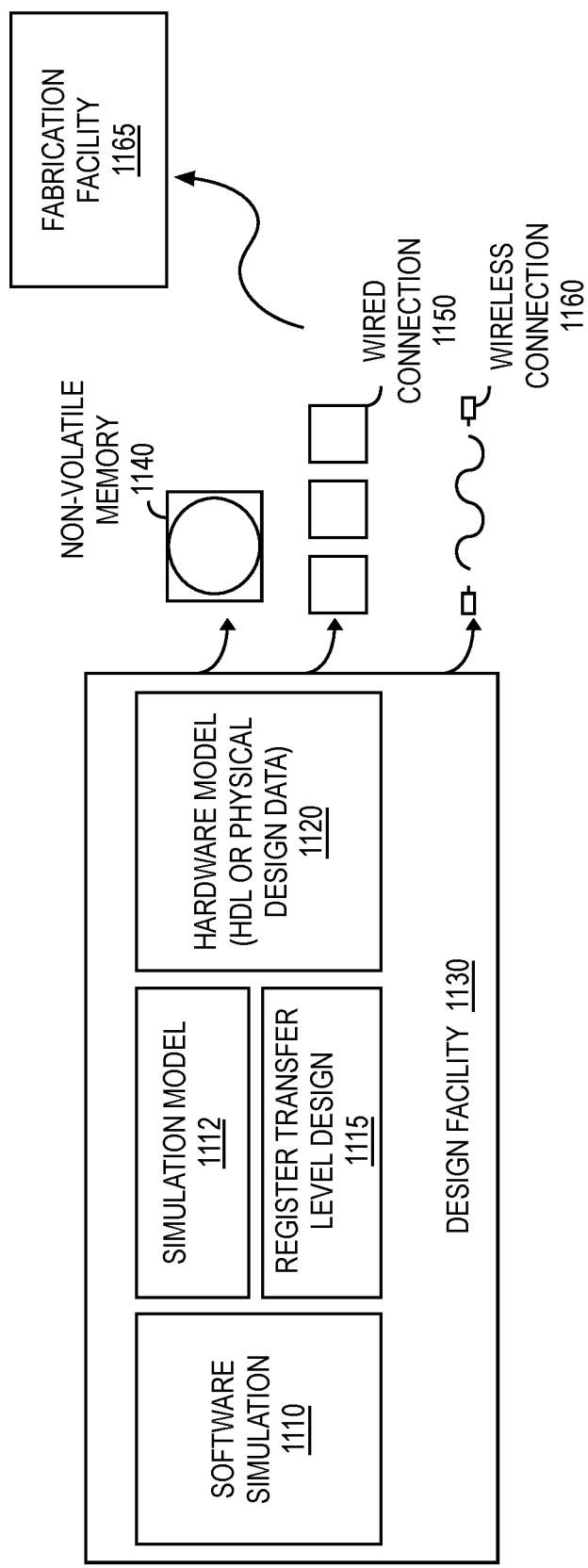
FIG. 11A-11D illustrate an integrated circuit package assembly, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
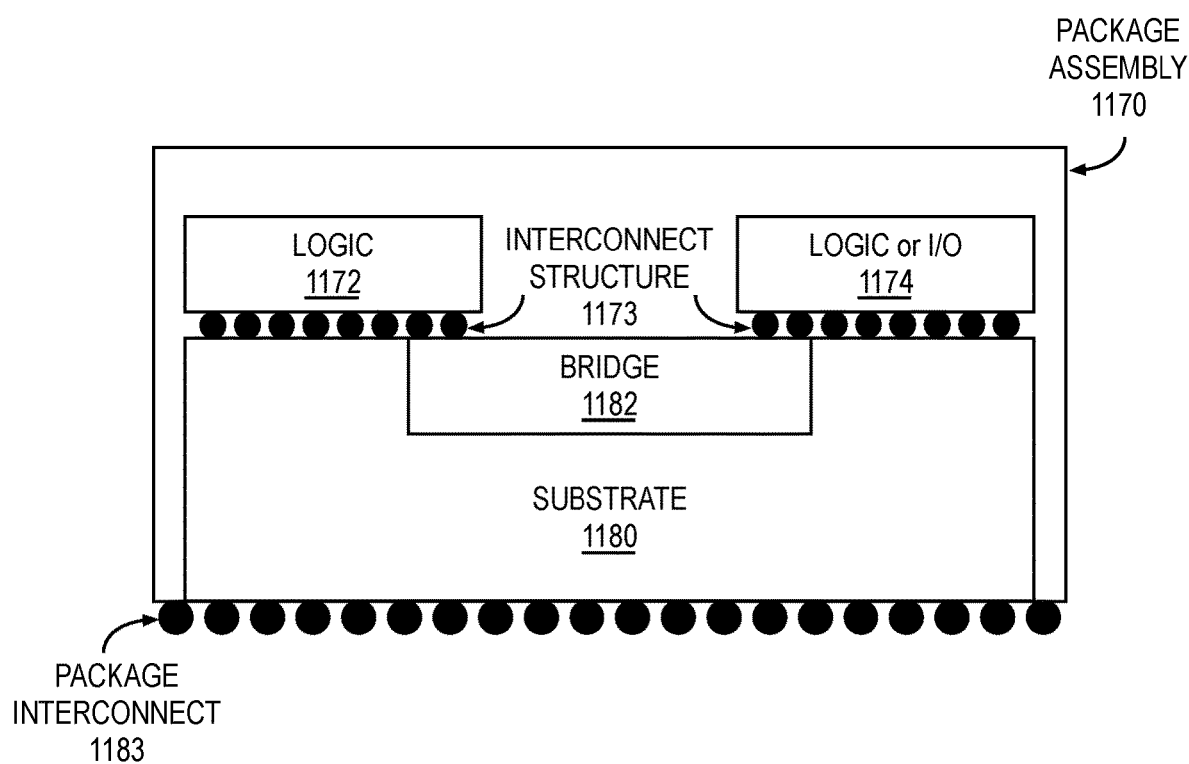
Figure 11C:
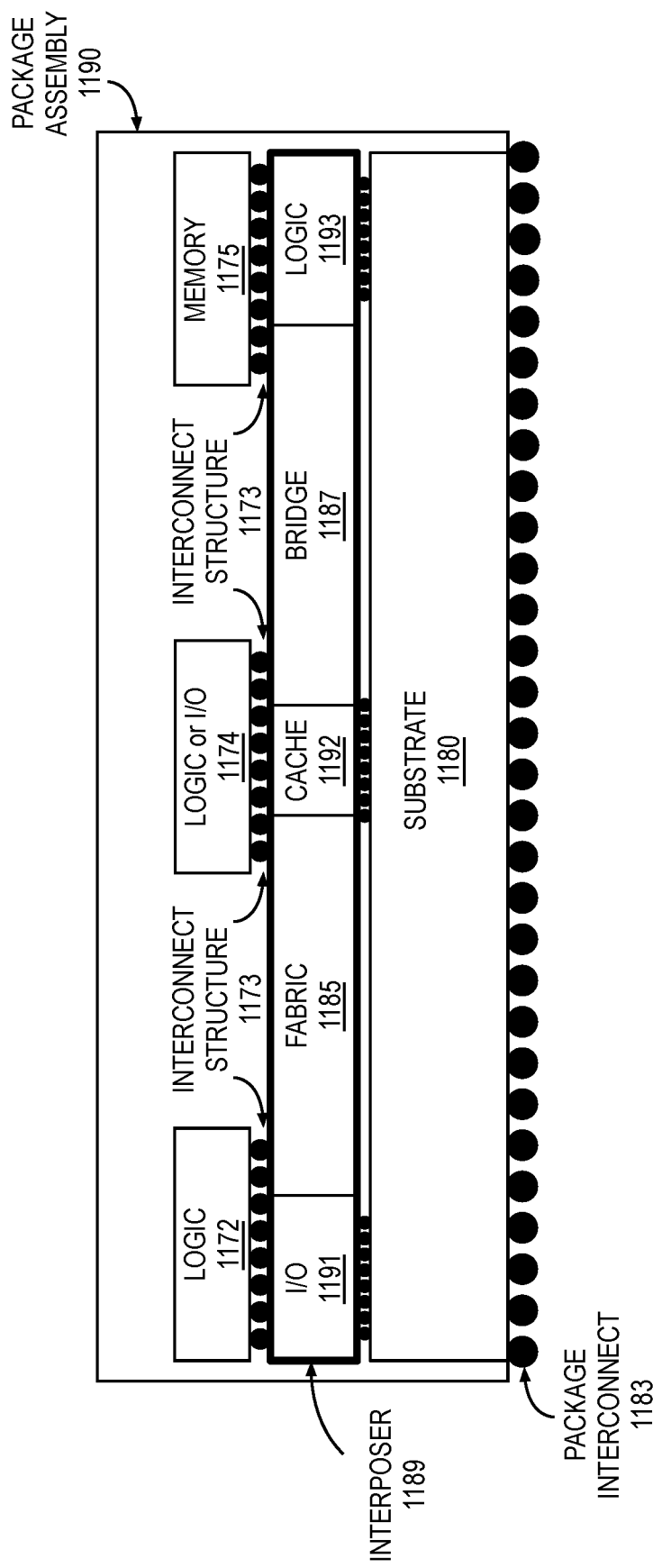

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

FIG. 11C illustrates a package assembly 1190 that includes multiple units of hardware logic chiplets connected to a substrate 1180. A graphics processing unit, parallel processor, and/or compute accelerator as described herein can be composed from diverse silicon chiplets that are separately manufactured. A diverse set of chiplets with different IP core logic from multiple vendors can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1190 can include components and chiplets that are interconnected by a fabric 1185 and/or one or more bridges 1187. The chiplets within the package assembly 1190 may have a 2.5D arrangement using Chip-on-Wafer-on-Substrate stacking in which multiple dies are stacked side-by-side on a silicon interposer 1189 that couples the chiplets with the substrate 1180. The substrate 1180 includes electrical connections to the package interconnect 1183. In one embodiment the silicon interposer 1189 is a passive interposer that includes through-silicon vias (TSVs) to electrically couple chiplets within the package assembly 1190 to the substrate 1180. In one embodiment, silicon interposer 1189 is an active interposer that includes embedded logic in addition to TSVs. In such embodiment, the chiplets within the package assembly 1190 are arranged using 3D face to face die stacking on top of the active silicon interposer 1189. The silicon interposer 1189 can include hardware logic for I/O 1191, cache memory 1192, and other hardware logic 1193, in addition to interconnect fabric 1185 and a silicon bridge 1187. The fabric 1185 enables communication between the various logic chiplets 1172, 1174 and the I/O logic 1191, 1193 within the active silicon interposer 1189. The fabric 1185 may be an NoC interconnect or another form of packet switched fabric that switches data packets between components of the package assembly. For complex assemblies, the fabric 1185 may be a dedicated chiplet enables communication between the various hardware logic of the package assembly 1190.

Bridge structures 1187 within the active silicon interposer 1189 may be used to facilitate a point-to-point interconnect between, for example, logic or I/O chiplets 1174 and memory chiplets 1175. In some implementations, bridge structures 1187 may also be embedded within the substrate 1180. The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory. Cache memory 1192 within the active interposer 1189 (or substrate 1180) can act as a global cache for the package assembly 1190, part of a distributed global cache, or as a dedicated cache for the fabric 1185.

Each chiplet can be fabricated as separate semiconductor die and coupled with a base die that is embedded within or coupled with the substrate 1180. The coupling with the substrate 1180 can be performed via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O, and memory chiplets. In one embodiment, an additional interconnect structure couples the active interposer 1189 with the substrate 1180.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

Figure 11D:
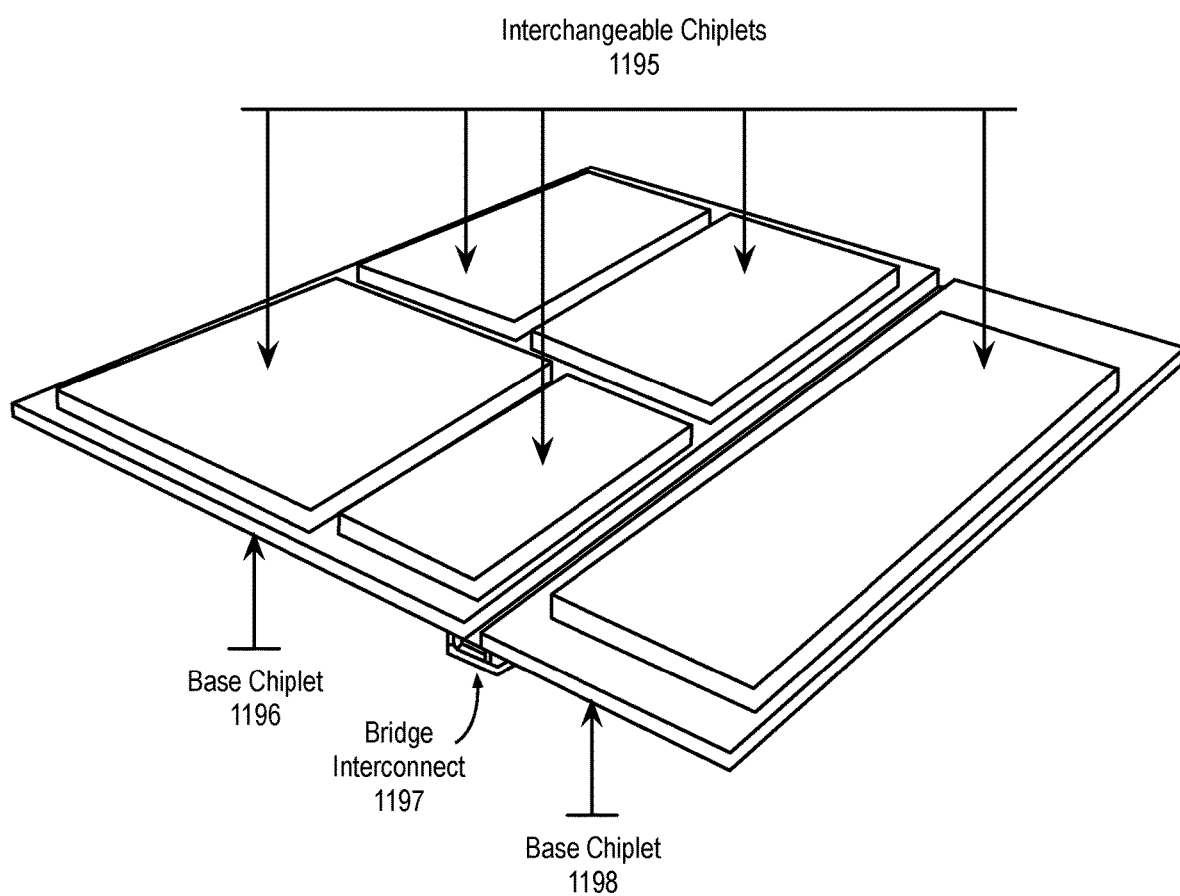

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. In one embodiment, the bridge interconnect 1197 may also be an interposer. The one or more base chiplets 1196, 1198, in one embodiment, are interposers that are positioned on top of a package substrate, such as the interposer 1189 of FIG. 11C. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
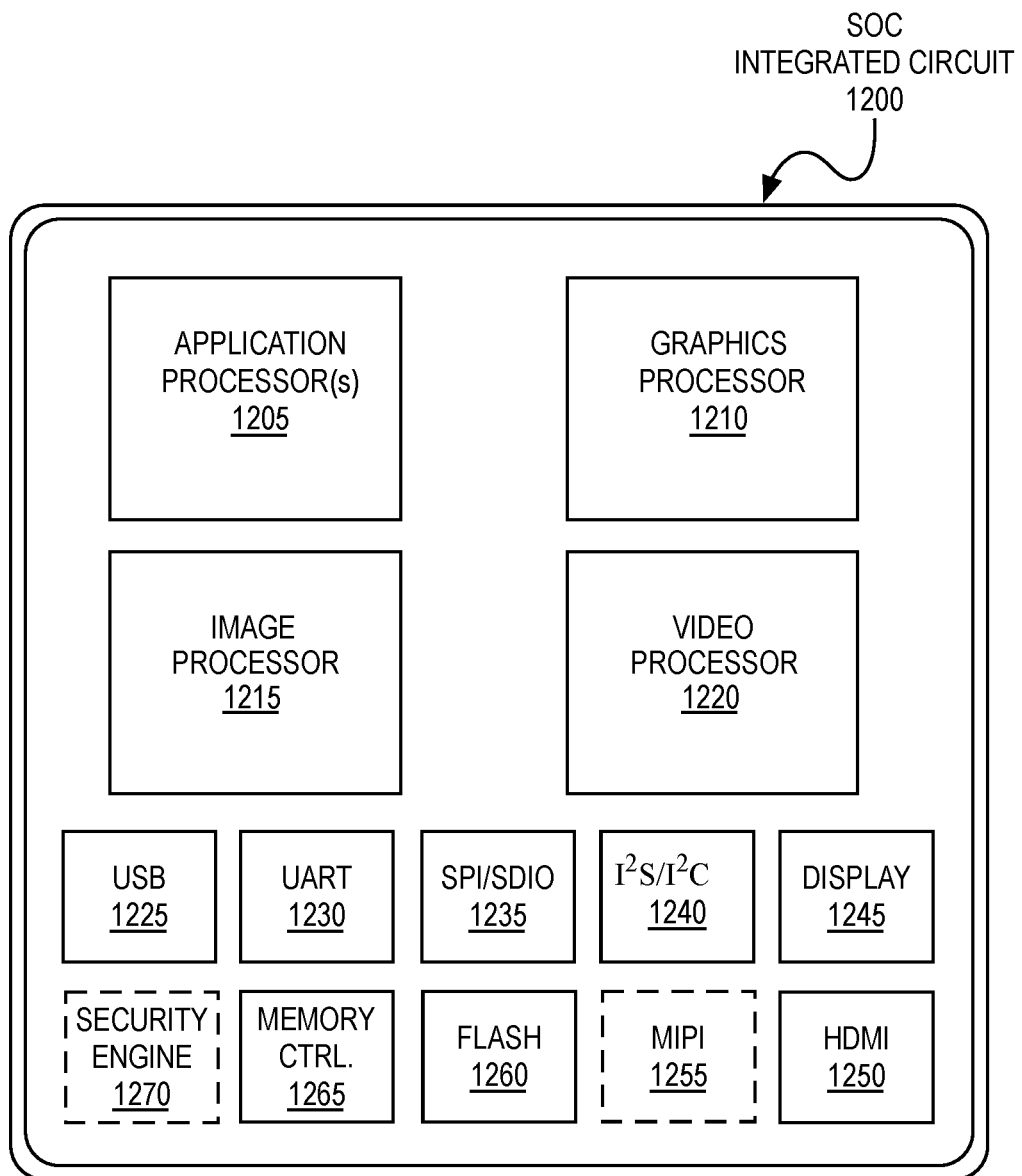
FIG. 12 is a block diagram illustrating an exemplary system on a chip integrated circuit that may be fabricated using one or more IP cores, according to an embodiment.
Figure 13A:
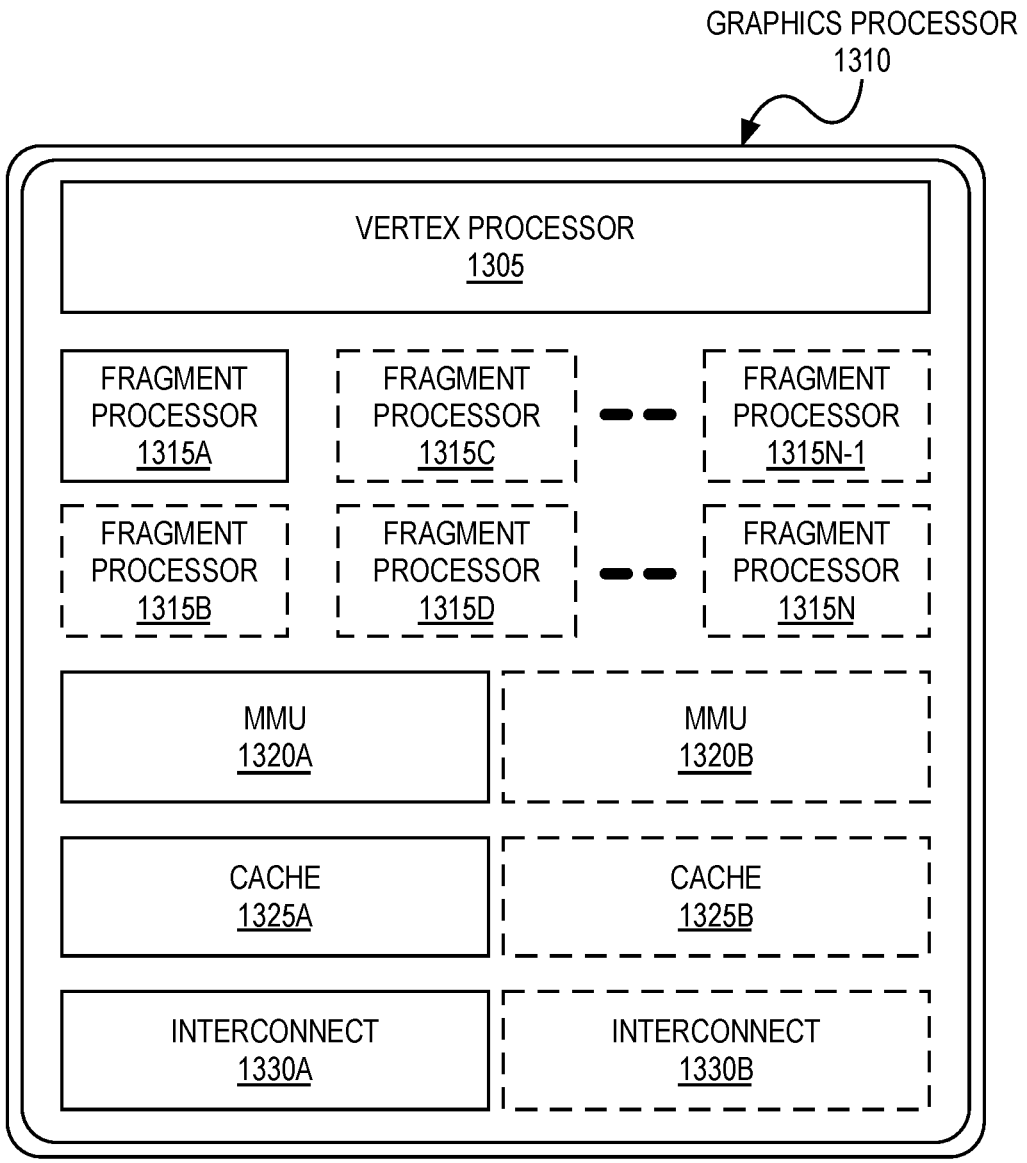
FIG. 13A-13B illustrate exemplary graphics processors that may be fabricated using one or more IP cores, according to embodiments described herein.
Figure 13B:
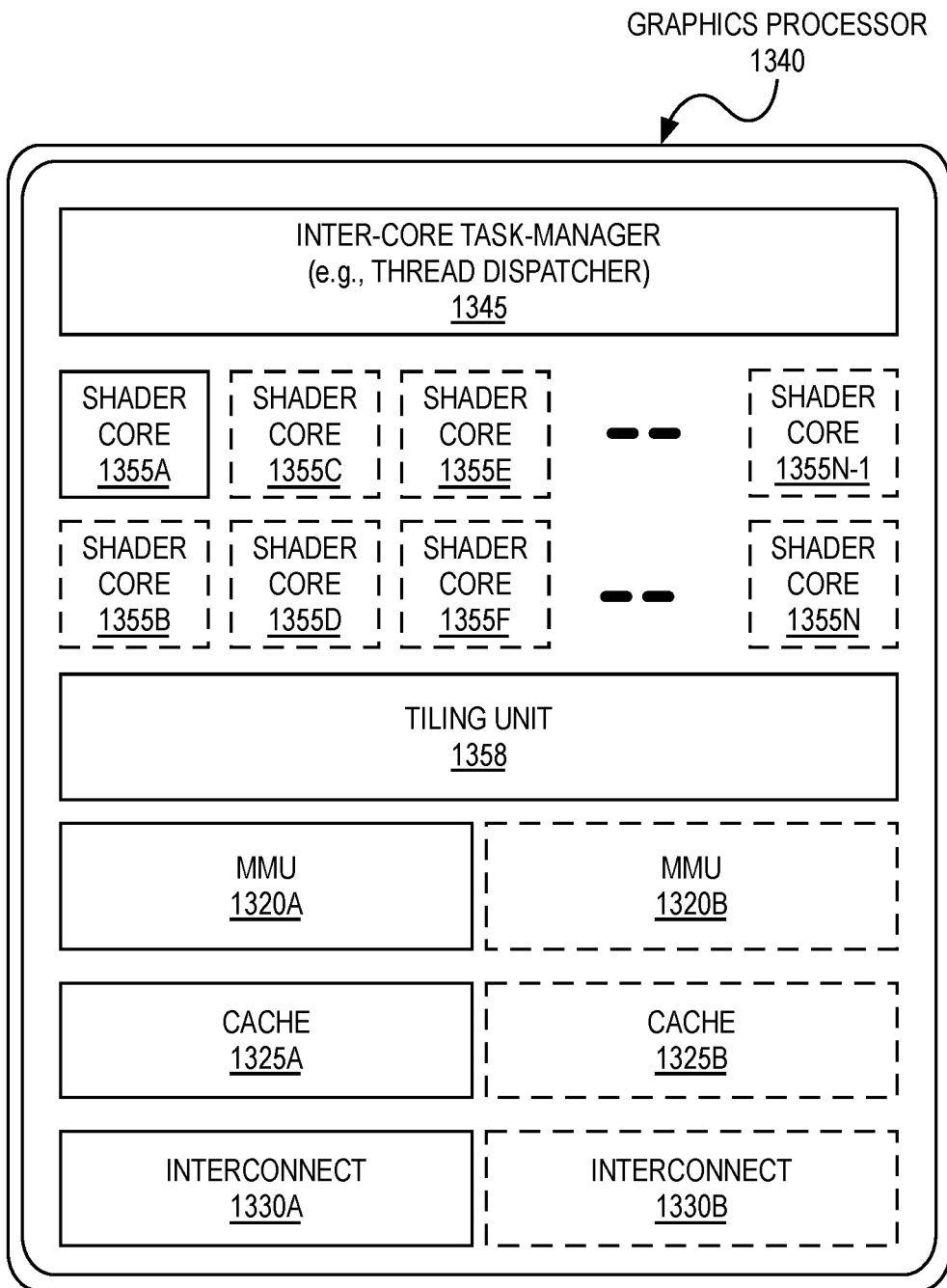

FIG. 12 and FIG. 13A-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of graphics processor 1310 and graphics processor 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The unified shader core architecture is also configurable to execute direct compiled high-level GPGPU programs (e.g., CUDA). The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14:
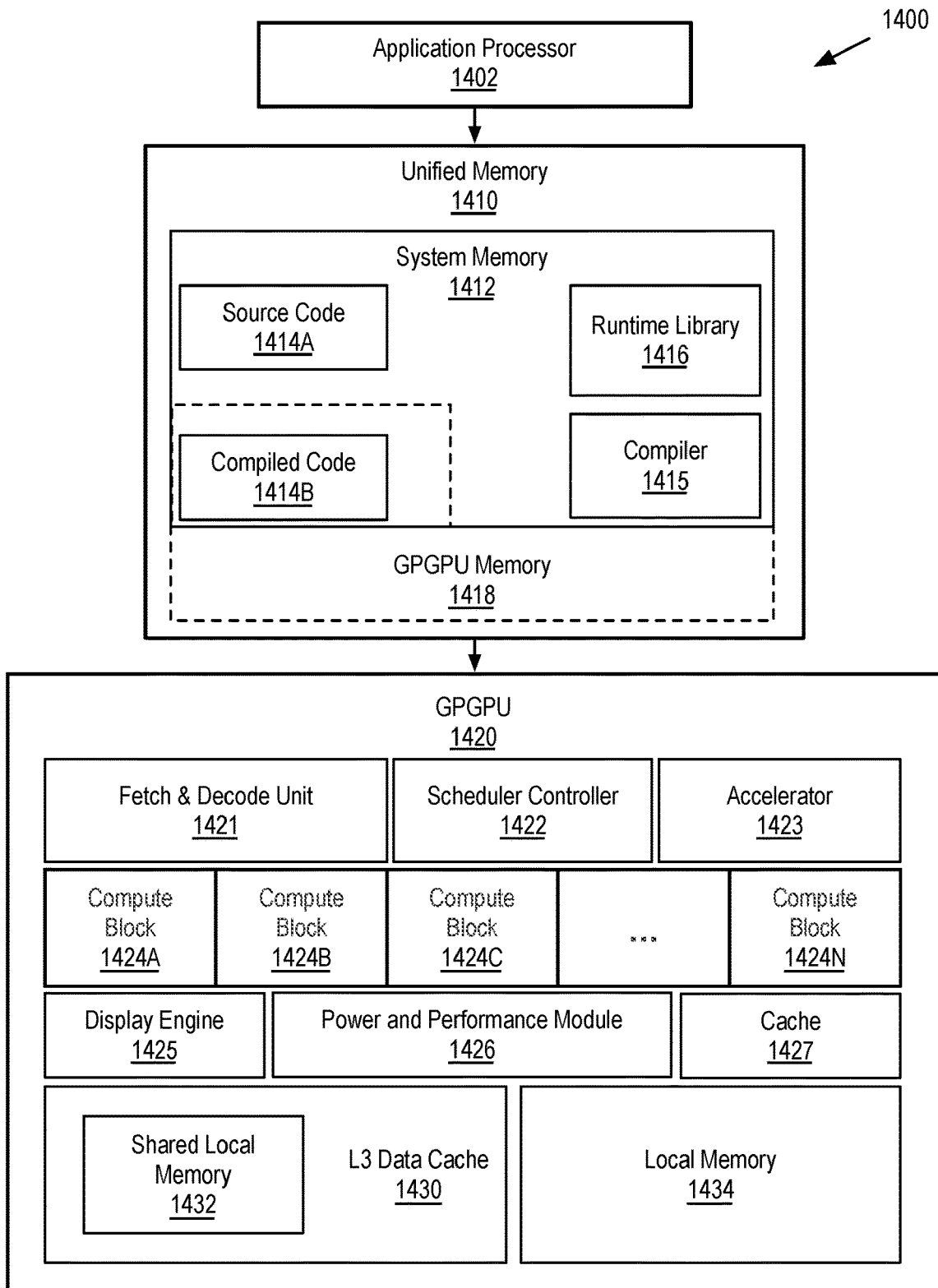
FIG. 14 is a block diagram of a data processing system, according to an embodiment.

FIG. 14 is a block diagram of a data processing system 1400, according to an embodiment. The data processing system 1400 is a heterogeneous processing system having a processor (e.g., application processor 1402), unified memory 1410, and a GPGPU 1420 including machine learning acceleration logic. The application processor 1402 and the GPGPU 1420 can be any of the processors and GPGPU/parallel processors as described herein. For example, with additional reference to FIG. 1, the application processor 1402 can be a variant of and/or share an architecture with a processor of the illustrated one or more processor(s) 102 and the GPGPU 1420 can be a variant of and/or share an architecture with graphics processor(s) 108.

The application processor 1402 can execute instructions for a compiler 1415 stored in system memory 1412. The compiler 1415 executes on the application processor 1402 to compile source code 1414A into compiled code 1414B. The compiled code 1414B can include instructions that may be executed by the application processor 1402 and/or instructions that may be executed by the GPGPU 1420. Compilation of instructions to be executed by the GPGPU can be facilitated using shader or compute program compilers, such as shader compiler 1027 and/or shader compiler 1024 as in FIG. 10. During compilation, the compiler 1415 can perform operations to insert metadata, including hints as to the level of data parallelism present in the compiled code 1414B and/or hints regarding the data locality associated with threads to be dispatched based on the compiled code 1414B. Hints can also be provided as to which processing resources of the GPGPU 1420 (or application processor 1402) should be used to execute a given set of instructions within the compiled code 1414B. In one embodiment, API hints can be provided as to a throughput, latency, or power target for instructions within the compiled code 1414B. In one embodiment, specific instructions will be directed for execution by specific processing resources. The compiler 1415 can include the information necessary to perform such operations or the operations can be performed with the assistance of a runtime library 1416. The runtime library 1416 can also assist the compiler 1415 in the compilation of the source code 1414A and can also include instructions that are linked at runtime with the compiled code 1414B to facilitate execution of the compiled instructions on the GPGPU 1420. The compiler 1415 can also facilitate register allocation for variables via a register allocator (RA) and generate load and store instructions to move data for variables between memory and the register assigned for the variable.

The unified memory 1410 represents a unified address space that may be accessed by the application processor 1402 and the GPGPU 1420. The unified memory can include system memory 1412 as well as GPGPU memory 1418. The GPGPU memory 1418 is memory within an address pace of the GPGPU 1420 and can include some or all of system memory 1412 and the local memory 1434 of the GPGPU 1420. In one embodiment the GPGPU memory 1418 can also include at least a portion of any memory accessible by the GPGPU 1420, such memory in other devices that are accessible to the GPGPU 1420. In one embodiment, the application processor 1402 can map the compiled code 1414B stored in system memory 1412 into GPGPU memory 1418 for access by the GPGPU 1420. In one embodiment, accesses to the unified memory 1410 are coherent accesses, where coherency is maintained via a coherent interconnect such as compute express link (CXL).

The GPGPU 1420 includes multiple compute blocks 1424A-1424N, which can include one or more of a variety of processing resources described herein. The processing resources can be or include a variety of different computational resources such as, for example, execution units, graphics cores, compute units, streaming multiprocessors, graphics multiprocessors, or multi-core groups, for example, as shown in the various graphics processor architectures described herein. The GPGPU 1420 can also include a set of resources that can be shared by the compute blocks 1424A-1424N and the accelerator circuitry 1423, including but not limited a power and performance module 1426, and a cache 1427. The power and performance module 1426 can be configured to adjust power delivery and clock frequencies for the compute blocks 1424A-1424N to power gate idle components within the compute blocks 1424A-1424N. In various embodiments the cache 1427 can include an instruction cache and/or a lower-level data cache.

The GPGPU 1420 can additionally include an L3 data cache 1430, which can be used to cache data accessed from the unified memory 1410 by the accelerator circuitry 1423 and/or the compute elements within the compute blocks 1424A-1424N. In one embodiment the L3 data cache 1430 includes shared local memory 1432 that can be shared by the compute elements within the compute blocks 1424A-1424N and the accelerator circuitry 1423. The GPGPU 1420 can also include a local memory 1434 that is local device memory of the GPGPU 1420.

In one embodiment the GPGPU 1420 includes instruction handling logic, such as a fetch and decode unit 1421 and a scheduler controller 1422. The fetch and decode unit 1421 includes a fetch unit and decode unit to fetch and decode instructions for execution by one or more of the compute blocks 1424A-1424N or the accelerator circuitry 1423. The instructions can be scheduled to the appropriate functional unit within the compute block 1424A-1424N or the tensor accelerator via the scheduler controller 1422. In one embodiment the scheduler controller 1422 is an ASIC configurable to perform advanced scheduling operations. In one embodiment the scheduler controller 1422 is a micro-controller or a low energy-per-instruction processing core capable of executing scheduler instructions loaded from a firmware module.

In one embodiment the GPGPU 1420 additionally includes accelerator circuitry 1423, which may be a coprocessor that can be configured to perform a specialized set of graphics, media, or compute operations, such as the accelerator 112 of FIG. 1. In one embodiment, logic components within the accelerator circuitry 1423 may be distributed across the processing resources of the multiple compute blocks 1424A-1424N. In one embodiment, the accelerator circuitry 1423 can augment or assist matrix and/or ray tracing operations performed by matrix and/or ray tracing circuitry within the processing resources of the multiple compute blocks 1424A-1424N. In one embodiment some functions to be performed by the compute blocks 1424A-1424N can be directly scheduled to or offloaded to the accelerator circuitry 1423. In one embodiment the accelerator circuitry 1423 is an application specific integrated circuit. In one embodiment the accelerator circuitry 1423 is a field programmable gate array (FPGA) that provides hardware logic that can updated between workloads.

The GPGPU 1420 also includes a display subsystem that includes a display engine 1425. In one embodiment, the display engine 1425 is configured to display an output buffer to one or more attached display devices, such as display device 111 of FIG. 1 or display device 318 of FIG. 3A-3B. The output buffer can be a framebuffer that includes pixel data that is rendered by the GPGPU 1420 based on commands provided by an operating system that is executed by the application processor 1402.

Chiplet Architecture for Late Bind SKU Fungibility

A chiplet architecture that enables late bind SKU fungibility allows IP for a product to be determined later in the design process, enabling a more fungible and nimble product architecture. Homogenous chiplet use enables scaling across a wide range of product segments with minimal R&D by simply swapping out the chiplets on top of a standardized base die. Heterogenous chiplets enable a wide variety of custom SKUs with varying ratios of application specific compute and IO assets which can be developed for customers with special applications. Heterogeneous chiplets enable the customization of cloud instance types with minimal additional research and development.

Figure 15:
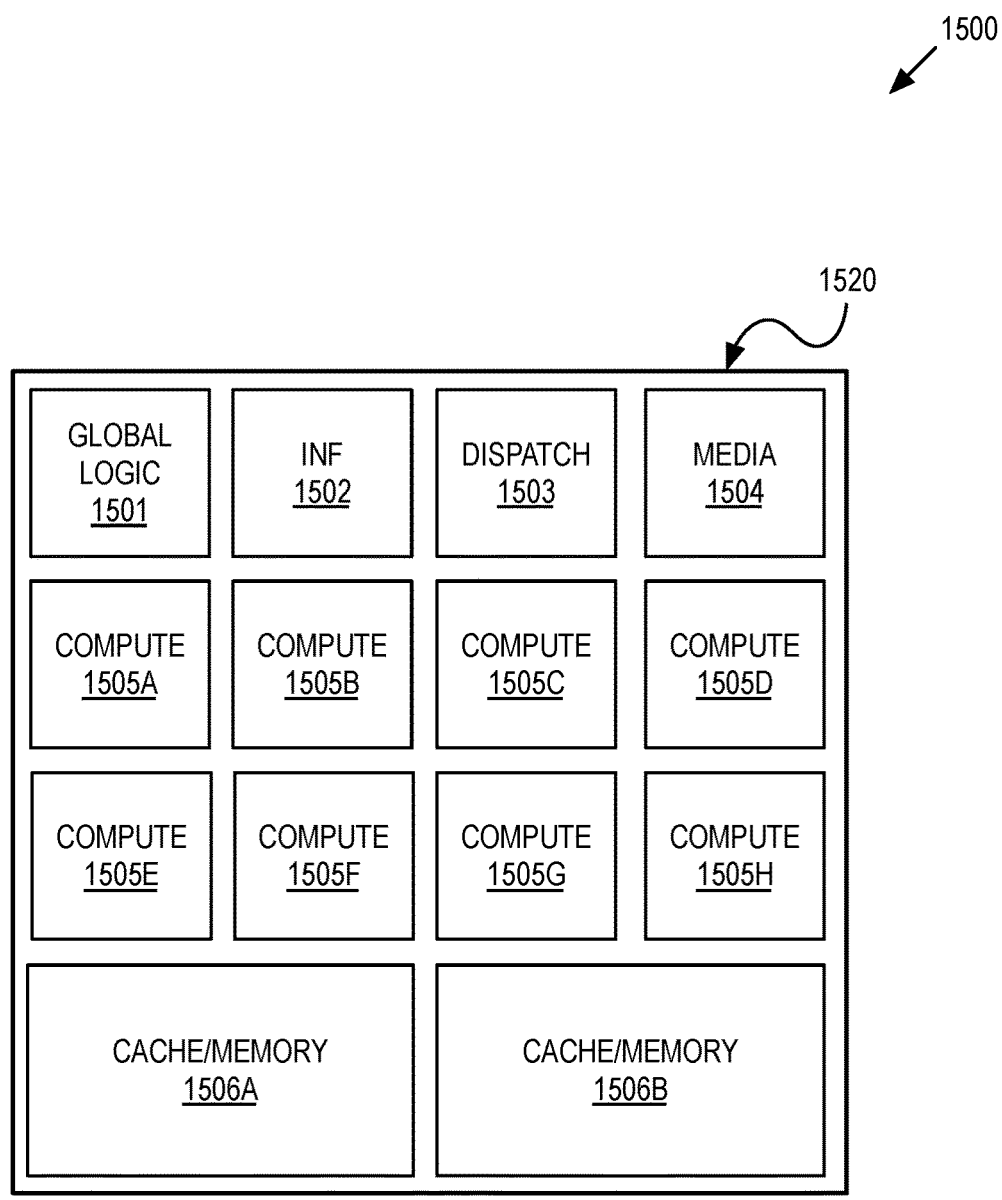
FIG. 15 illustrates a modular parallel compute system, according to an embodiment.

FIG. 15 illustrates a modular parallel compute system 1500, according to an embodiment. In one embodiment, the modular parallel compute system 1500 can provide an implementation of the GPGPU 1420 of FIG. 14. In one embodiment, the modular parallel compute system 1500 can be used to implement the entirety of the data processing system 1400 of FIG. 14. The modular parallel compute system 1500 includes a modular parallel processor 1520, which can be a graphics processor or compute accelerator as described herein. The modular parallel processor 1520 is composed of multiple chiplets in the form of discrete integrated circuits that are composed on an active base die having multiple standardized chiplet slots. In one embodiment, the modular parallel processor 1520 includes a global logic unit 1501, an interface 1502, a thread dispatcher 1503, a media unit 1504, a set of compute units 1505A-1505H, and a set of cache/memory units 1506A-1506B. The set of compute units 1505A-1505H can be dedicated general-purpose compute units or graphics and compute units that operate in concert with a fixed-function and programmable graphics pipeline.

The modular parallel processor 1520 can implement any of the graphics processor or parallel general-purpose compute processor architectures described herein. For example, the media unit 1504 can implement functionality associated with the media pipeline 234 of FIG. 2B, media pipeline 316 of FIG. 3A and FIG. 4, or media pipeline 830 of FIG. 8. In various embodiments, the thread dispatcher 1503 may be a global dispatcher (e.g., global dispatcher 602 of FIG. 6) that dispatches to local dispatchers, schedulers, or thread arbiters within the media unit 1504 and the set of compute units 1505A-1505H. The thread dispatcher 1503 can be implemented via a graphics microcontroller 233 as in FIG. 2B or can implement functionality of the scheduler/dispatcher 241 of FIG. 2C, thread dispatcher 258 of FIG. 2D. The thread dispatcher 1503 can also implement functionality of the thread dispatcher 831 of FIG. 8, inter-core task manager 1345 of FIG. 13A. The set of compute units 1505A-1505H can include circuitry to implement graphics and/or compute functionality including but not limited to circuitry of the graphics cores 221A-221F of FIG. 2B, multi-core groups 240A-240N of FIG. 2C, compute units 260A-260N of FIG. 2D, graphics cores 515A-514N of FIG. 5A, graphics cores 852A-852B of FIG. 8, fragment processor(s) 1315A-1315N of FIG. 13A, and/or shader core(s) 1355A-1355N of FIG. 13B.

The components and functionality of the modular parallel processor 1520 can be distributed across multiple chiplets, with each component or function being a separate chiplet. Multiple components can also be aggregated into a single chiplet. For example, the global logic unit 1501 and interface 1502 may be included in a single chiplet. The media unit 1504 may be included in a separate chiplet than the set of compute units 1505A-1505H or a single chiplet can provide the media unit 1504 and the set of compute units 1505A-1505H. In one embodiment, the chiplets of the modular parallel processor 1520 can be distributed across multiple base dies in a tiled manner, such as the graphics processor 320 of FIG. 3B, or compute accelerator 330 of FIG. 3C. In various embodiments and configurations, the components of the modular parallel processor 1520 can be arranged, stacked, or positioned in two-dimensions (2D), two and a half dimensions (2.5D), or three dimensions (3D).

The global logic unit 1501, in one embodiment, includes global functionality for the modular parallel processor 1520, including device configuration registers, global schedulers, power management logic, and the like. The global logic unit 1501 can also include clock control logic power control logic to perform dynamic voltage and frequency scaling for the modular parallel compute system 1500. In one embodiment, the global logic unit 1501 includes one-time programmable memory, such as eFuses or antifuses, for hardware key storage, device identifiers, etc. The global logic unit 1501 can also include reset logic, test logic, error handling, and error recovery logic.

The interface 1502 can include a front-end interface for the modular parallel processor 1520 and can include system interconnect logic to connect the modular parallel processor 1520 via a system interconnect protocol such but not limited to the PCIe and/or CXL protocols. The thread dispatcher 1503 can receive workloads from the interface 1502 and dispatch threads for the workload to the compute units 1505A-1505H. If the workload includes any media operations, at least a portion of those operations can be performed by the media unit 1504. The media unit can also offload some operations to the compute units 1505A-1505H. The cache/memory units 1506A-1506B can include SRAM for cache memory (e.g., L3 cache), DRAM for device-local random-access memory (e.g., HBM, GDDR), or a single cache/memory unit can include both SRAM and DRAM devices.

The modular nature of the modular parallel processor 1520 enables enhanced design and manufacturing capability relative to monolithic designs. As the size of integrated circuit dies increases to meet performance demands, designs begin to approach the photolithography reticle limit, which limits the size of a single integrated circuit. When a die can fit within the reticle limit, multiple smaller dies connected via on-package interconnects may be preferable for yield optimization and die reuse across multiple market segments. The modular nature of the modular parallel processor 1520 also enables the use of multiple different manufacturing technologies for different components. For example, to the compute units 1505A-1505H can be implemented in an advanced process node to enable power-efficient performance, while the memory and I/O controller functionality associated with the cache/memory 1506A-1506B and interface 1502 may be reused from a design already deployed in an established process node. Such partitioning can result in smaller dies, lower manufacturing costs, reduced design time, and reduced design costs. Chiplet integration on package also enables designers to make different trade-offs for different market segments by choosing different numbers and types of dies. For example, a designer can choose different numbers of compute, memory, and I/O dies depending on the need of the market segment. As different die designs are not required to be produced for different market segments, lower product SKU cost can be realized.

In various embodiments, the modular parallel processor 1520 can be implemented using both homogenous and heterogenous chiplet tiling. From a software standpoint, the compute model may be partitioned, such that the modular parallel processor 1520 can be partitioned into multiple sub-devices with separate command schedulers. While the command schedulers may be separate, the scheduling model a unified scheduling model may be used across all chiplet functions and/or sub-devices. In one embodiment, cache memory located within the cache/memory units 1505A-1505H can be distributed across multiple chiplets, which can minimize the crossbar bandwidth required to interconnect the cache memory with the compute units 1505A-1505H.

Figure 16:
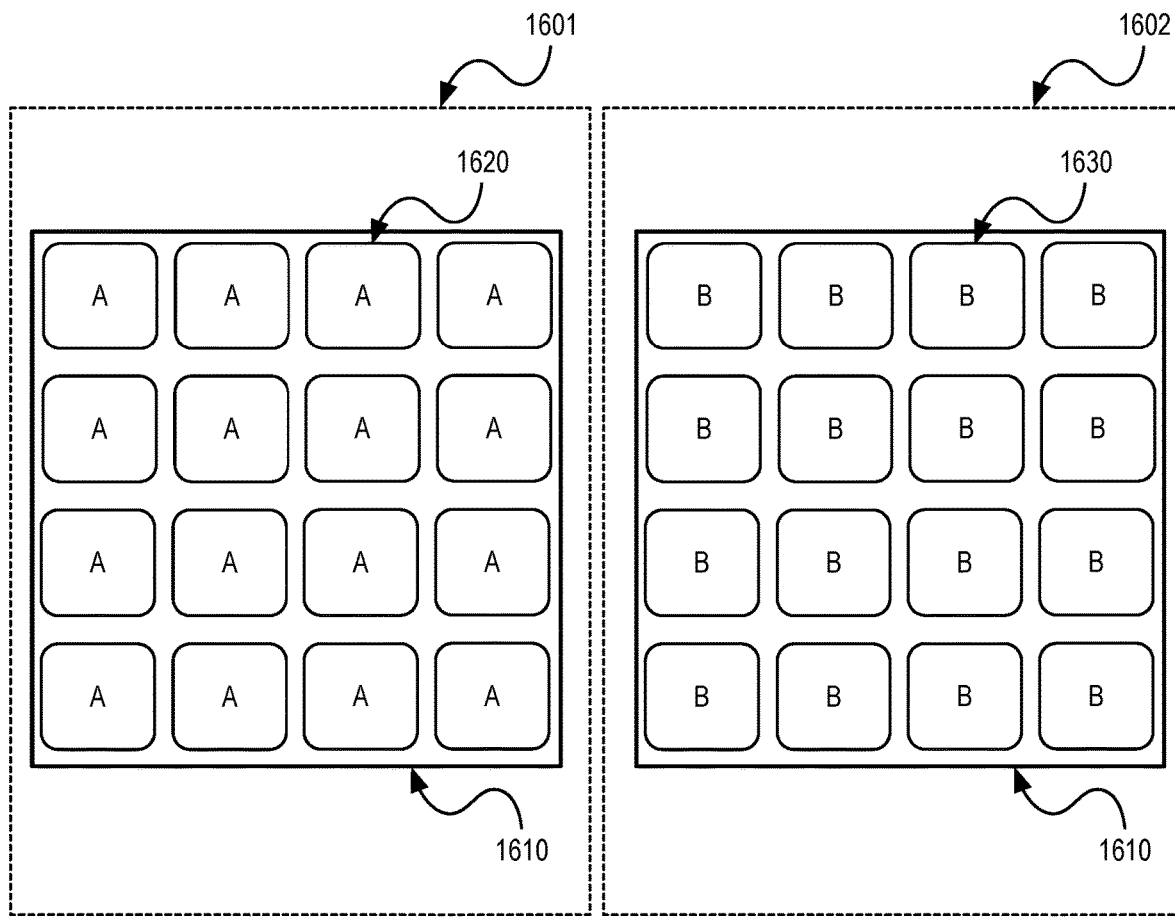
FIG. 16 illustrates a modular parallel processor implementation using homogenous chiplet tiling.

FIG. 16 illustrates a modular parallel processor implementation using homogenous chiplet tiling. In one embodiment, multiple modular parallel processor implementations 1601, 1602 can be specified based a base chiplet 1610, which may be a standardized base chiplet. The base chiplet 1610 includes a set of standard chiplet interfaces that can accept multiple different types of dimensionally homogenous chiplets that include a first chiplet type 1620 and a second chiplet type 1630. While the first chiplet type 1620 and the second chiplet type 1630 are dimensionally homogenous, the different chiplet types can be configured for different power and performance profiles. The different power and performance profiles enable the specification of product designs that span multiple product segments and power ranges, with memory capacity, cache capacity, I/O bandwidth, and GPU core counts spanning an order of magnitude or more.

For example, a first parallel processor implementation 1601 can include the base chiplet 1610 and an array of chiplets of the first chiplet type 1620. A second parallel processor implementation 1602 can include the base chiplet 1610 and an array of chiplets of the second chiplet type 1630. The first chiplet type 1620 may be a compute-optimized chiplet for machine learning training, machine learning inference, and high-performance compute, while the second chiplet type 1630 may be a traditional GPU chiplet with fixed-function GPU render, along with media, and compute capabilities. The base chiplet 1610 can be configured to include cache memory. The first parallel processor implementation 1601 can use the full cache capability of the base chiplet 1610, while the second parallel processor implementation 1602 can a down-bin cache of lower capacity. Further scaling can be realized by de-populating chiplets, down-binning chiplets, or adding additional tiles of chiplets to enable multi-tile products. In various product configurations, different combinations of chiplets of the first chiplet type 1620 or the second chiplet type 1630 can be selected to enable fine-grained product specification, as detailed further in FIG. 21

Figure 17:
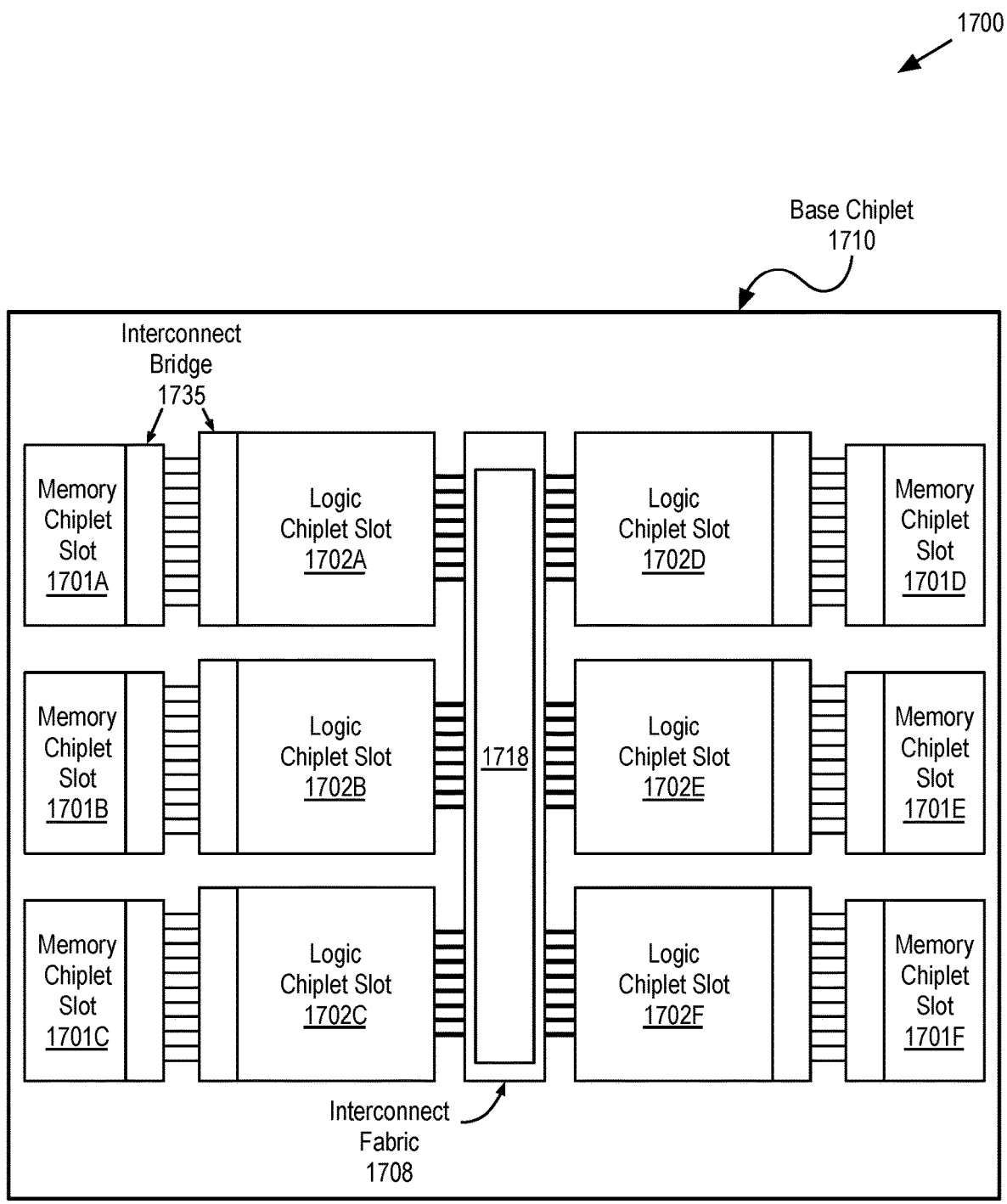
FIG. 17 illustrates an interchangeable chiplet system for homogeneous chiplets, according to an embodiment.

FIG. 17 illustrates an interchangeable chiplet system 1700 for homogeneous chiplets, according to an embodiment. In one embodiment the interchangeable chiplet system 1700 includes at least one base chiplet 1710 (or active base die) including multiple memory chiplet slots 1701A-1701F and multiple logic chiplet slots 1702A-1702F. A logic chiplet slot (e.g., 1702A) and a memory chiplet slot (e.g., 1701A) can be connected by an interconnect bridge 1735, which can be similar to other interconnect bridges described herein. Logic chiplet slots 1702A-1702F can be interconnected via an interconnect fabric 1708. The interconnect fabric 1708 includes switching logic 1718 that can be configured to enable the relay of data packets between logic chiplets slots in a manner that is agnostic to the data by encapsulating the data into a fabric packet. The fabric packet can then be switched to the destination slot within the interconnect fabric 1708.

In some embodiments, one or more of the memory chiplet slots 1701A-1701F may be configured to couple with a fabric interconnect node that enables the memory chiplet slots to be accessible via the interconnect fabric 1708. For example, any of the logic chiplet slots 1702A-1702F can be populated with circuitry that functions only as a fabric interconnect node to couple an associated memory chiplet slot that is connected to the logic chiplet via an interconnect bridge 1735. In one embodiment, one or more of the memory chiplet slots 1701A-1701F include a fabric interconnect node to enable memory coupled with the memory chiplet to act as a node or endpoint of the interconnect fabric 1708.

The interconnect fabric 1708 can include one or more physical data channels. One or more programmable virtual channels can be carried by each physical channel. The virtual channels may be arbitrated independently, with channel access negotiated separately per virtual channel. Traffic over the virtual channels may be classified into one or more traffic classes. In one embodiment, a prioritization system allows virtual channels and traffic classes to be assigned a relative priority for arbitration. In one embodiment, traffic balancing algorithms operate to maintain substantially equal bandwidth and throughput to each node coupled to the fabric. In one embodiment, the fabric interconnect logic operates at a higher clock rate than the nodes couples to the fabric, allowing reduction in interconnect width while maintaining the bandwidth requirements between nodes.

Where certain nodes require higher bandwidth, multiple physical links can be combined to carry a single virtual channel. Multiple traffic classes can be carried over a single virtual channel, where a traffic class is a division of traffic that is related to arbitration. Traffic within a virtual channel may block the transmission of additional traffic on the same virtual channel. However, a given virtual channel will not block a different virtual channel. Accordingly, traffic on different virtual channels is arbitrated independently. In one embodiment, each physical link is separately clock gated when idle. An early indication upcoming activity can be used as a trigger to wake the physical link before data is to be transmitted.

Figure 18A:
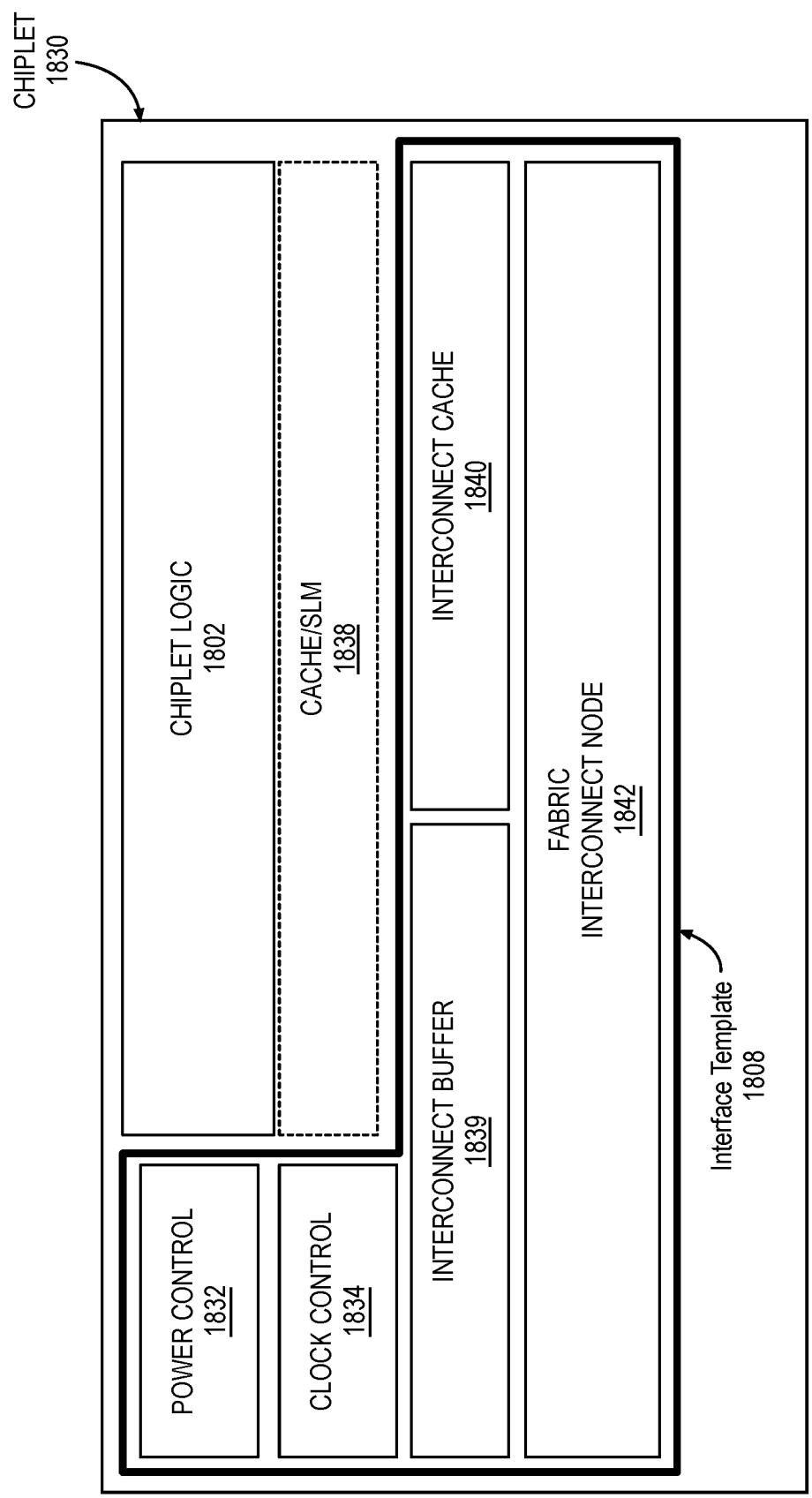
FIG. 18A-18B illustrate a modular architecture for interchangeable chiplets, according to an embodiment.
Figure 18B:
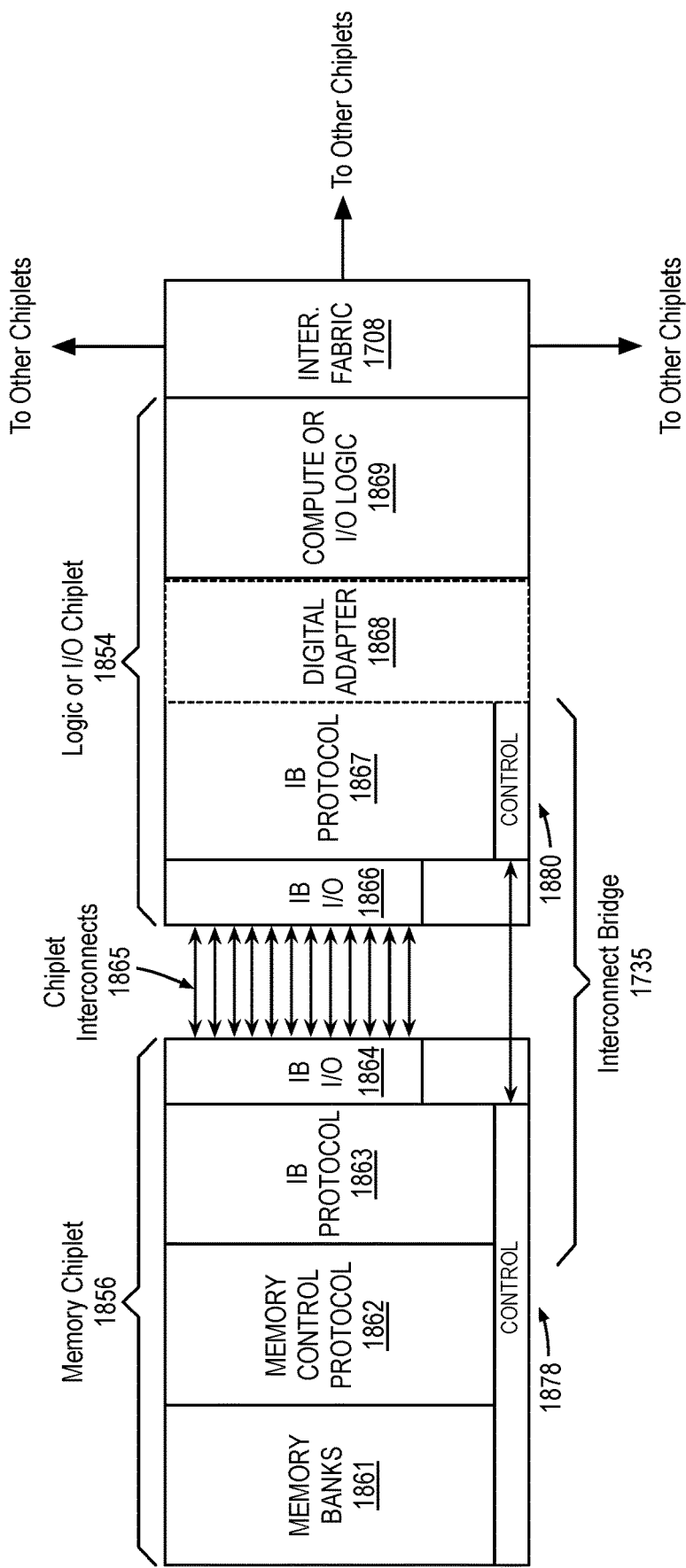

FIG. 18A-18B illustrate a modular architecture for interchangeable chiplets, according to an embodiment. FIG. 18A illustrates a modular architecture for interchangeable logic or I/O chiplets. FIG. 18B illustrates a modular architecture for interchangeable memory chiplets.

As shown in FIG. 18A, a chiplet 1830 can be made interchangeable by configuring the chiplet logic 1802 for interoperability with an interface template 1808. The interface template 1808 can include standardized logic such as power control logic 1832 and clock control logic 1834, and interconnect buffer 1839, interconnect cache 1840, a fabric interconnect node 1842. A product designer can then select the specific chiplet logic 1802 that will interface with the interface template 1808. The specifics of the chiplet logic 1802 can vary and can include any of the chiplet types described herein (e.g., first chiplet type 1620, second chiplet type 1630). The chiplet logic 1802 can also couple with cache/SLM 1838, which can be used as a private cache or shared local memory for functional units of the chiplet logic 1802.

Within the interface template 1808, the power control logic 1832 includes circuitry to manage power delivery to the chiplet logic 1802. The power control logic 1832 can power gate the chiplet logic 1802 during idle or low power states. The clock control logic 1834 can adjust the clock frequency provided to the chiplet logic 1802. The power control logic 1832 and clock control logic 1834 can collectively manage dynamic voltage and frequency scaling for the chiplet logic 1802. The interconnect buffer 1839 can store data that is to be transmitted to or received from the interconnect fabric 1708 via the fabric interconnect node 1842. The interconnect cache 1840 can be a fabric specific cache that can be used to store data that is frequently received or transmitted via the fabric interconnect node 1842. In one embodiment, the interconnect cache 1840 can also be used as an extension of the interconnect buffer 1839 during periods of high traffic flow or congestion over the interconnect fabric 1708.

As shown in FIG. 18B, a memory chiplet 1856 can connect with a logic or I/O chiplet 1854 via chiplet interconnects 1865 routed though the interconnect bridge 1735. The logic or I/O chiplet 1854 can communicate with other chiplets via the interconnect fabric 1708 of FIG. 17. In one embodiment, the memory chiplet 1856 includes a set of memory banks 1861 that correspond with the memory technology provided by the chiplet. The memory banks 1861 can include any of the types of memory described herein, including but not limited to DRAM (e.g., double data rate DRAM, High-bandwidth memory (HBM), GDDR), SRAM or other cache memory, or non-volatile memory such as flash, or 3D XPoint memory. For DRAM memory, DDR5, HBM3, and GDDR7 are supported. However, embodiments are not limited to any specific memory technology. A memory control protocol layer 1862 can enable control of the memory banks 1861 and can include logic for one or more memory controllers. An interconnect bridge protocol layer 1863 can relay messages between the memory control protocol layer 1862 and interconnect bridge I/O layer 1864. Interconnect bridge I/O layer 1864 can communicate with interconnect bridge I/O layer 1866 over the chiplet interconnects 1865. Interconnect bridge I/O layers 1864, 1866 can represent physical layers that transmit signals to or receive signals from a corresponding interconnect point over the chiplet interconnects 1865. The physical I/O layers may include circuitry to drive signals over the chiplet interconnects 1865 and/or receive signals from the chiplet interconnects 1865. An interconnect bridge protocol layer 1867 within the logic or I/O chiplet 1854 can translate signals from interconnect bridge I/O layer 1866 into messages or signals that can be communicated to the compute or I/O logic 1869. In one embodiment a digital adapter layer 1868 can be used to facilitate the translation of signals into messages or signals for use by the compute or I/O logic 1869.

The compute or I/O logic 1869 can communicate with other logic or I/O chiplets via the interconnect fabric 1708. The compute or I/O logic 1869, in one embodiment, includes integrated fabric interconnect node logic that can communicate with the interconnect fabric 1708, such as the fabric interconnect node 1842 of FIG. 18A. In one embodiment, a control layer 1878 in the memory chiplet 1856 can be in communication with a control layer 1880 in the logic or I/O chiplet 1854. These control layers 1878, 1880 can be used to propagate or transmit certain control signals in an out-of-band manner, for example, to send power and configuration messages between interface bus protocol layer 1867 of the logic or I/O chiplet 1854 and interface bus protocol layer 1863, memory control protocol layer 1862 and/or memory banks 1861 of the memory chiplet 1856.

Figure 19:
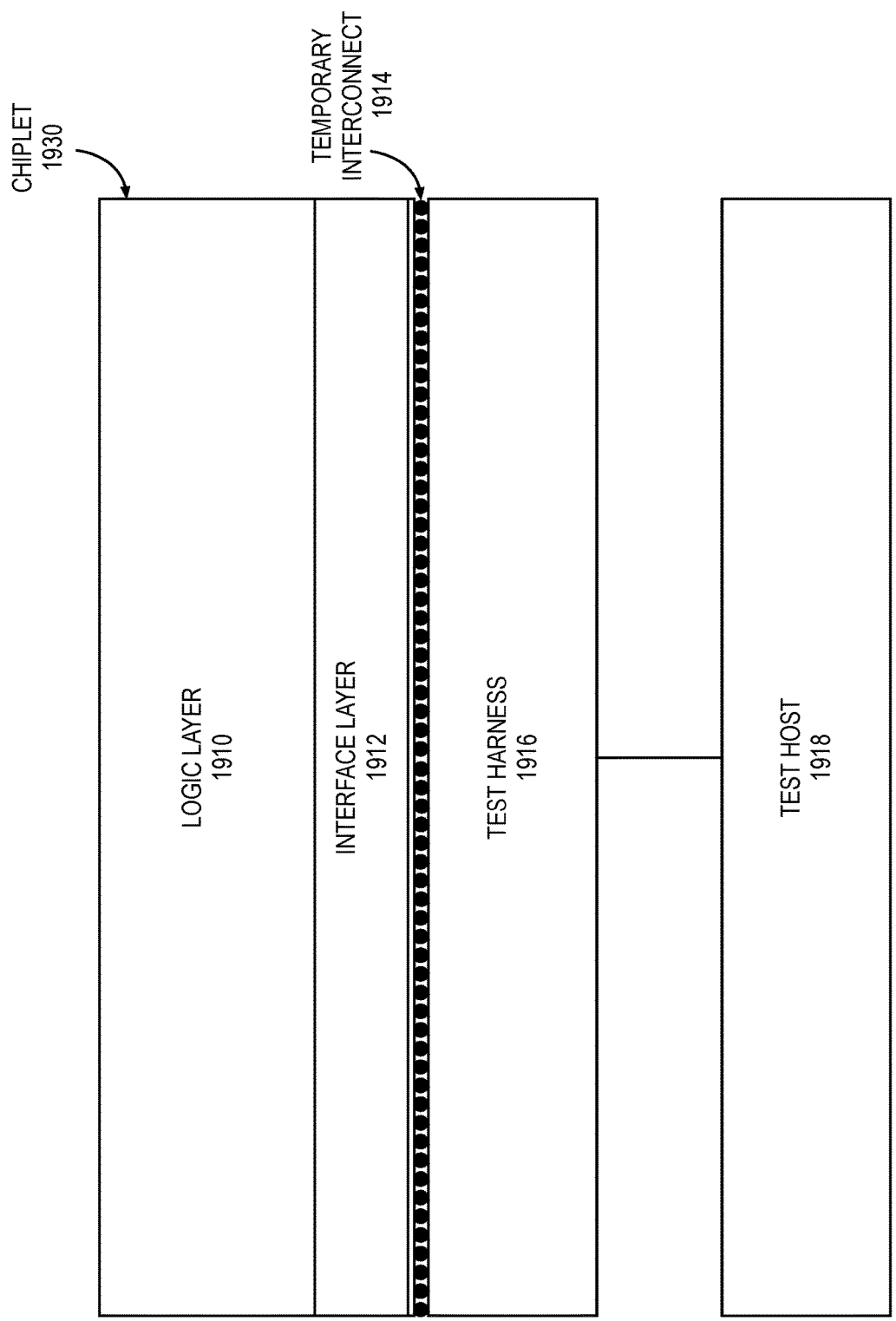
FIG. 19 illustrates the use of a standardized chassis interface for use in enabling chiplet testing, validation and integration.

FIG. 19 illustrates the use of a standardized chassis interface for use in enabling chiplet testing, validation and integration. A chiplet 1930 can include a logic layer 1910 and an interface layer 1912, similar to chiplet 1830 of FIG. 18A. The interface layer 1912 can be a standardized interface that can communicate with a temporary interconnect 1914 that enables the chiplet to be removably coupled to a test harness 1916. The test harness 1916 can communicate with a test host 1918. The test harness 1916, under the communication of the test host 1918, can perform a battery of tests on an individual chiplet 1930 during an initial testing or binning-out process to check for defects within the logic layer 1910 and to determine a performance or functionality bin for the chiplet 1930. For example, the logic layer 1910 can be tested to determine a number of defective and non-defective functional units and whether a threshold number of special functional units (e.g., matrix accelerators, ray-tracing cores, etc.) are functional. The logic layer 1910 can also be tested to determine if the internal logic can operate at a target frequency. At this time, compute components within the logic layer 1910 may be reserved for in-field repair.

Figure 20:
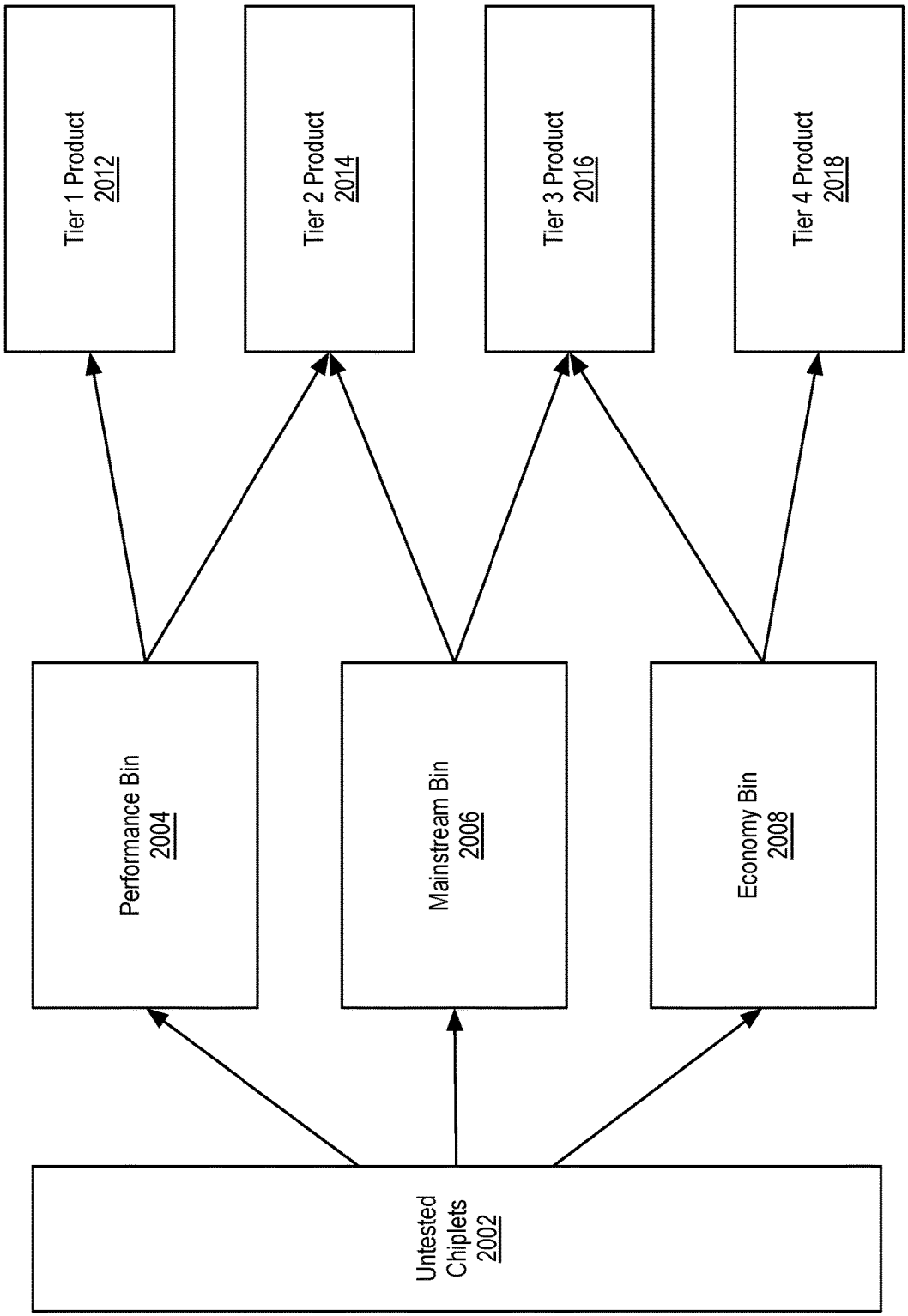
FIG. 20 illustrates the use of individually binned chiplets to create a variety of chiplet tiers.

FIG. 20 Illustrates the use of individually binned chiplets to create a variety of chiplet tiers. A set of untested chiplets 2002 can be tested and binned into a set of bins, including a performance bin 2004, a mainstream bin 2006, and an economy bin 2008, depending on whether the individual chiplets conform to specific performance or functionality tiers. The performance bin 2004 can include chiplets that exceed the performance (e.g., stable frequency) of the mainstream bin 2006, while the economy bin 2008 can include chiplets that are functional but underperform those of the mainstream bin 2006. In one embodiment, chiplets may be tested and sorted according to features such as high/low leakage power, high/low dynamic power consumption, maximum operational frequency, minimum voltage, and/or the number and type of test failures.

As the chiplets may be placed interchangeably during assembly different product tiers can be assembled based on the selected set of chiplets. A tier 1 product 2012 may be assembled only from chiplets in the performance bin 2004, while a tier 2 product 2014 can include a selection of chiplets from the performance bin 2004 and other chiplets from the mainstream bin 2006. For example, a tier 2 product 2014 that is designed for workloads that require high-bandwidth, low latency memory can use high-performance memory chiplets from the performance bin 2004, while using compute, graphics, or media chiplets from the mainstream bin. Additionally, a tier 3 product 2016 can be assembled using mainstream compute chiplets from the mainstream bin 2006 and memory from the economy bin 2008 if such product is tailored for workloads without high memory bandwidth requirements. A tier 4 product 2018 can be assembled from functional but underperforming chiplets in the economy bin 2008. Chiplets assigned to products can also select for specific features, such as chiplets that are determined to be operable at lower voltages can be reserved for use in a product with a low power target.

Figure 21:
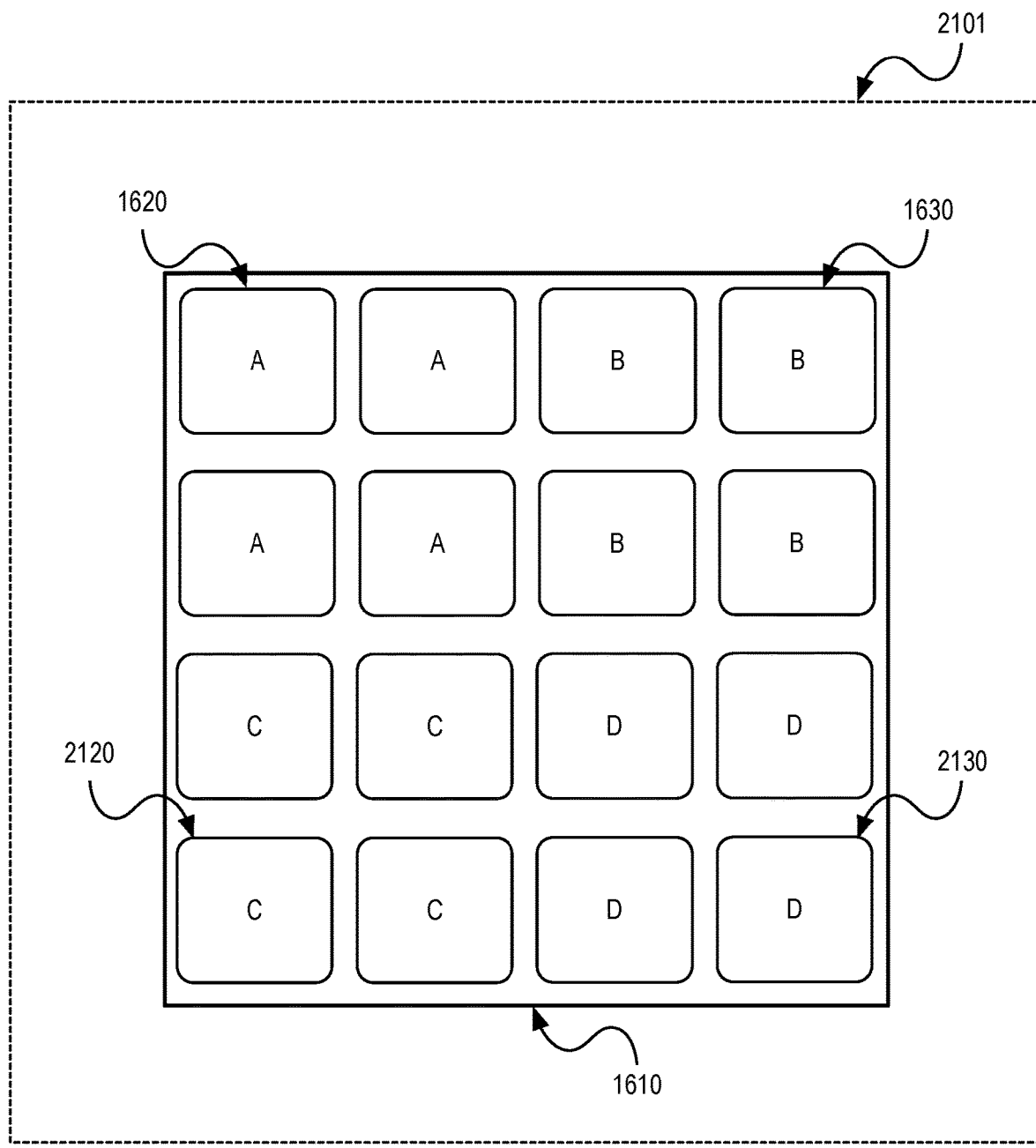
FIG. 21 illustrates a graphics processor having multiple different chiplet types with a uniform chiplet aperture.

FIG. 21 illustrates a graphics processor having multiple different chiplet types with a uniform chiplet aperture. Various chiplet types that perform different tasks or having differing IP can be placed on a base die, with the product being configured late in the design phase or specified from a selection of pre-designed chiplets. In one embodiment a modular parallel processor 2101 can be specified that mixes a variety of different types of chiplets, including the first chiplet type 1620 and the second chiplet type 1630 as in FIG. 16. Additional chiplet types can also be included in the modular parallel processor 2101, including a third chiplet type 2120 and a fourth chiplet type 2130. The various chiplet types can be selected based on the functionality that is provided by those chiplets.

Product differentiation can be enhanced by mixing chiplets not only of different types, but that are also a mix of different bins. Individually binned chiplets can be selected based on the desired performance profile of the modular parallel processor 2101. For example, the modular parallel processor 2101 can be configured with chiplets of the first chiplet type 1620, which may compute-optimized chiplets for machine learning training, machine learning inference, and high-performance compute that are selected from the economy bin 2008. Such compute-optimized chiplets may not have sufficient performance to be used in datacenter or workstation products. However, such chiplets may be suitable for use in the modular parallel processor 2101 when paired with performance bin 2004 chiplets of the second chiplet type 1630, which may be a traditional GPU chiplet with graphics media and compute capability.

The mix between chiplets of the first chiplet type 1620 and chiplets of the second chiplet type 1630, and the relative bins from which those chiplets are derived, can be used to specifically tune the balance of the modular parallel processor 2101 when performing a mix of graphics and general-purpose compute functionality. In one implementation, minimum voltage matching can be performed in which chiplets having the lowest minimum operable voltage can be paired to ensure a product has the best power characteristics for low-power applications. Chiplets with higher stable maximum frequencies can also be paired to create a high performance product. In another implementation, chiplets with low power consumption can be paired with chiplets with relatively higher power consumption to achieve a certain average power consumption.

Additional functionality and the performance associated with that functionality can be specified based on the type of chiplets of the third chiplet type 2120 and fourth chiplet type 2130 that are selected for use in the modular parallel processor 2101. For example, chiplets of the third chiplet type 2120 may be cache memory chiplets to provide a large last level cache that can be shared by chiplets of the first chiplet type 1620 and second chiplet type 1630 that populate the base chiplet 1610 of the modular parallel processor 2101. Such cache memory can be used in concert with cache memory that may reside within the base chiplet 1610. In one configuration, the fourth chiplet type 2130 may be one of a variety of different random-access memory technologies, including but not limited to HBM3 memory. Various memory capacities may be enabled by populating or depopulating memory chiplet slots on the base chiplet 1610.

Exemplary chiplet designs that may be included in the various chiplet types of the modular parallel processor 2101 include compute-optimized chiplets without graphics functionality and with no or limited media functionality. Such compute-optimized chiplets may include single precision (FP32) and double precision (FP64) floating-point units that are optimized for general purpose compute. Chiplets can also include multi-purpose traditional GPU chiplets that include render, pixel, and color pipelines as well as basic compute and media support. Chiplets can also include AI-training optimized chiplets that include systolic combinational logic for 8-bit and 16-bit brain floating point (BF8, BF16) and tensorfloat-32 (TF32), as well as general purpose FP32 and FP64. Such chiplets can also include support for structured matrix sparsity and register file optimization for sparse matrix operations. Chiplets can also include AI-inference optimized chiplets that include systolic combinational logic for 4-bit integer (INT4), 8-bit integer (INT8), and ternary formats, as well as structured weight sparsity and associated register file optimizations. Additional chiplets include high-performance compute (HPC) optimized chiplets that are optimized for FP32 and FP64, with more robust cache and memory datapaths. HPC chiplets may also include systolic arrays having support for FP32 or FP64 data types. Such systolic arrays may also include sparse data support. HPC chiplets may also include internal ray tracing acceleration blocks.

Additional chiplet designs can include hardware logic that is optimized for homomorphic encryption and database analytics using 32-bit integer (INT32) and 64-bit integer (INT64) operations, such as multiply-add operations, bit-wise operations, swizzle and data movement operations. Additional product designs can include media-only chiplets to enable video delivery, video transcode, video encode, and video decode operations. Additional product designs can include ray tracing optimized chiplets with BVH and Motion Blur acceleration, low-latency L1 caches, hardware ray transversal, triangle intersection, DirectX Raytracing (DXR) support, and a CPU offload engine. Additional chiplet designs include field-programmable gate array (FPGA) chiplets.

Any of the various chiplet designs may be mixed within modular parallel processor 2101 according to the intended use case for the product. Chiplet and HBM module de-population, with associated dummy dies, and down-binning allows for architectural flexibility and scalability for varying compute and bandwidth ratios. Dynamic Die-to-Die (D2D) interconnect utilization, fuse-down, and redundancy configurability allow for varying compute to cache bandwidth ratios, along with cache fuse down options for configurable compute to cache capacity variability. Additionally, dynamic I/O lane configurability and power-down and dynamic I/O power states allow for varying compute to I/O ratios.

Dimensionally Heterogeneous Chiplet Architecture for Late Bind SKU Fungibility

Figure 22:
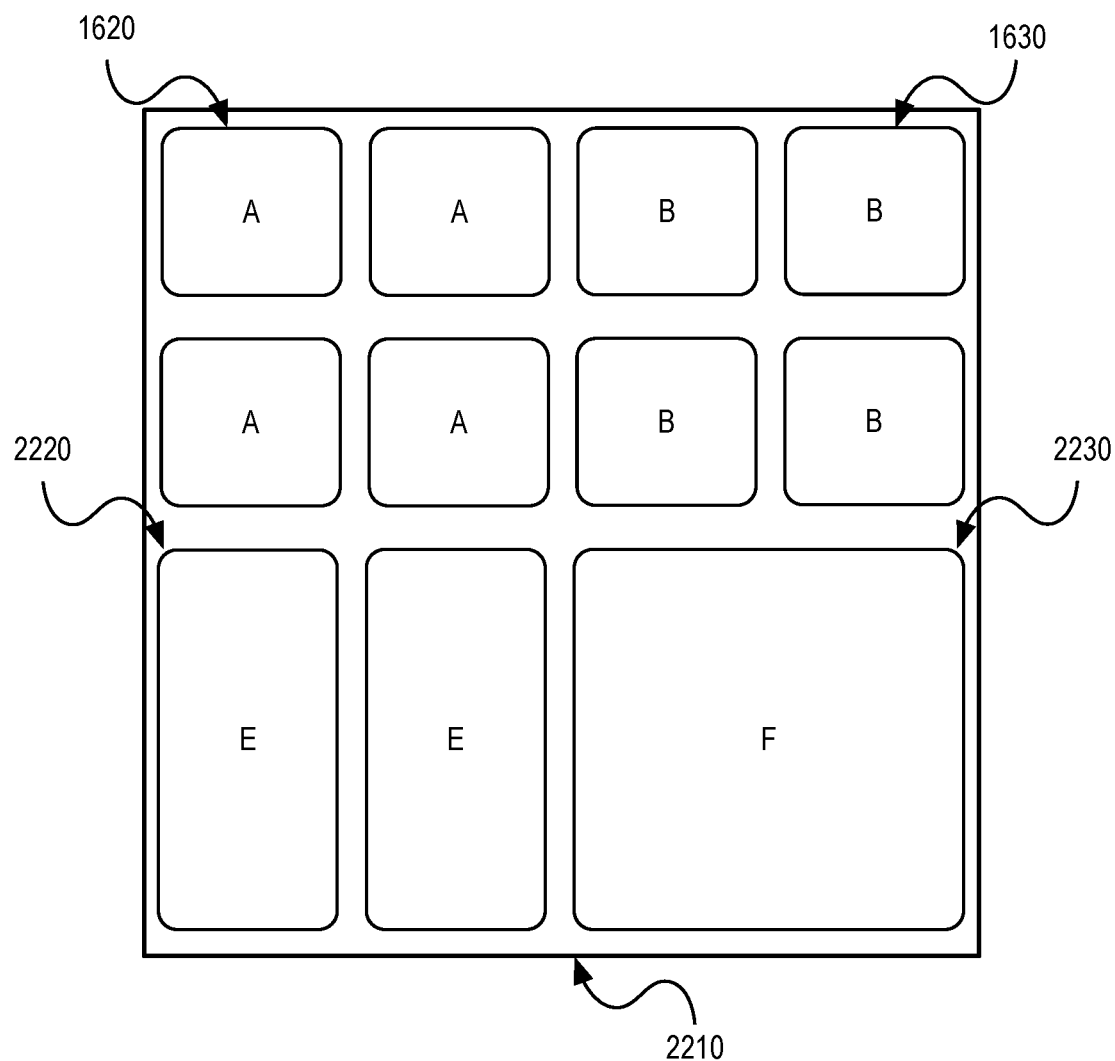
FIG. 22 illustrates a dimensionally heterogenous chiplet architecture that enables late bind SKU fungibility.

FIG. 22 illustrates a dimensionally heterogenous chiplet architecture that enables late bind SKU fungibility. An N×M grid layout can be enabled with chiplets of varying dimensions, where each chiplet has a length and/or width that is a multiple of the length or width of a homogenous chiplet. For example, chiplets of 1×1, 1×2, 2×1, 2×2, etc., can be mixed on a base die having support for chiplets of multiple dimensions. A base die 2210 can be configured with support for the specified chiplet apertures. In one embodiment, the base die 2210 is a base chiplet that can be configured with a variety of different chiplet apertures. For example, in addition to chiplets of the first chiplet type 1620 and chiplets of the second chiplet type 1630, which are 1x1 chiplets. Chiplets of a sixth chiplet type 2220 can be supported, which may have a 2×1 chiplet aperture. A chiplet of a seventh chiplet type 2230 may also be included, which may have a 2×2 chiplet aperture. Such chiplets may have the functionality of any of the chiplet types described herein.

Figure 23:
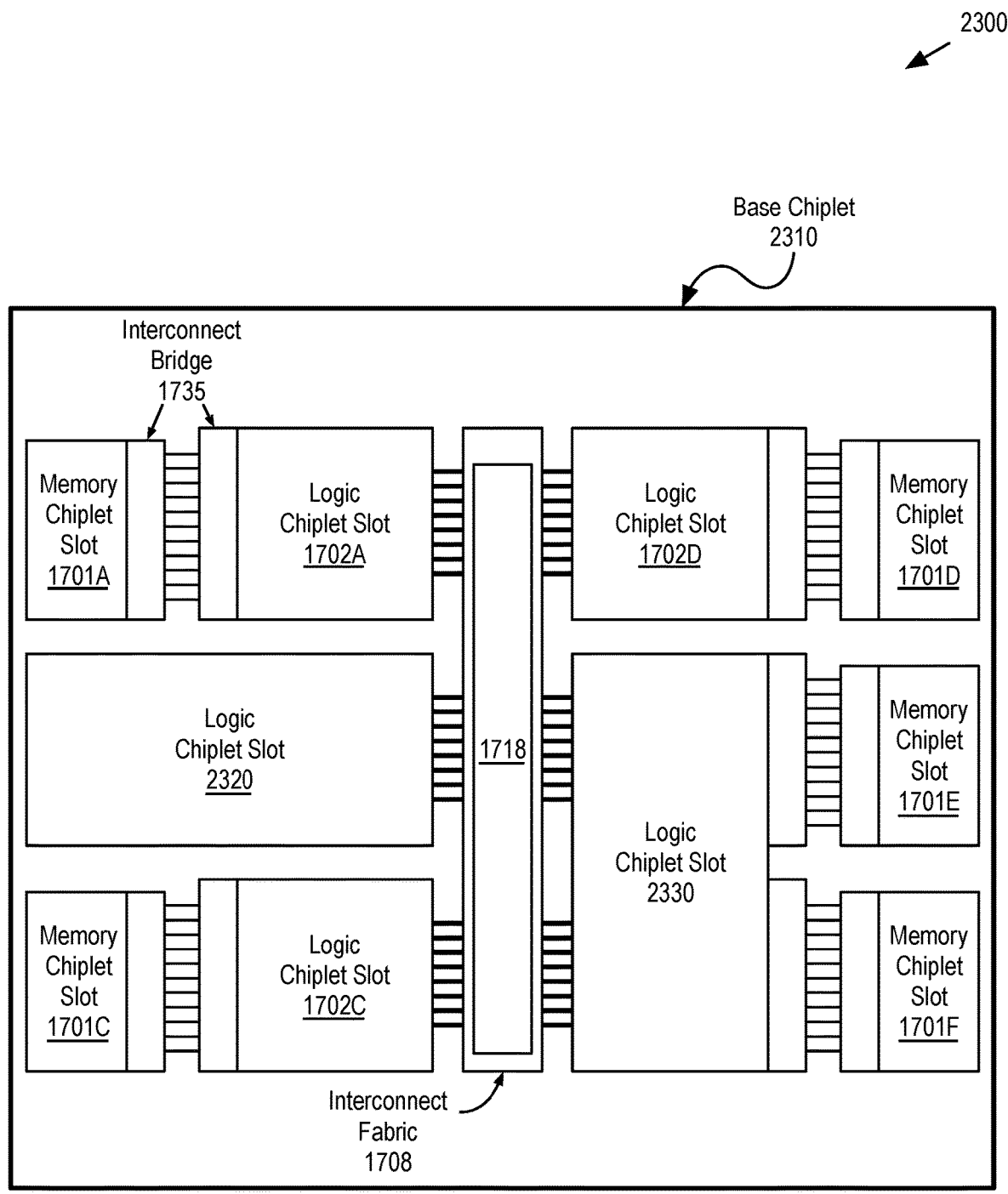
FIG. 23 illustrates an interchangeable chiplet system for heterogenous chiplets.

FIG. 23 illustrates an interchangeable chiplet system 2300 for heterogenous chiplets. The interchangeable chiplet system 2300 for heterogenous chiplets can have similar functionality as the interchangeable chiplet system 1700 for homogenous chiplets, as in FIG. 17, with the addition logic slots of various aperture sizes. For example, in one embodiment, a base chiplet 2310 is configured such that memory chiplet slot 1701B and logic chiplet slot 1702B of the base chiplet 1710 of FIG. 17 are replaced with a logic chiplet slot 2320 with a 2×1 aperture. In one embodiment, the base chiplet 2310 is configured such that logic chiplet slots 1702E-1702F of the base chiplet 1710 of FIG. 17 are replaced with a single logic chiplet slot 2330 having a 1×2 aperture that is coupled with both memory chiplet slot 1701E and memory chiplet slot 1701F. Different variants of the base chiplet 2310 can be configured with a variety of different chiplet slots with a variety of different aperture sizes depending on the desired specification of the graphics or parallel processor that is being specified. For example, logic chiplet slot 2320 can house an FPGA with internal memory or a non-volatile memory module. Logic chiplet slot 2330 may be populated with high performance functional units that benefit from additional memory bandwidth relative to chiplets that may populate logic chiplet slot 1702A, logic chiplet slot 1702B, or logic chiplet slot 1702D. The switching logic 1718 of the interconnect fabric 1708 is configured to balance the fabric bandwidth demands of the various chiplet slots by dynamically configuring the active frequency and width of the I/O interconnects to the various logic chiplet slots.

Figure 24:
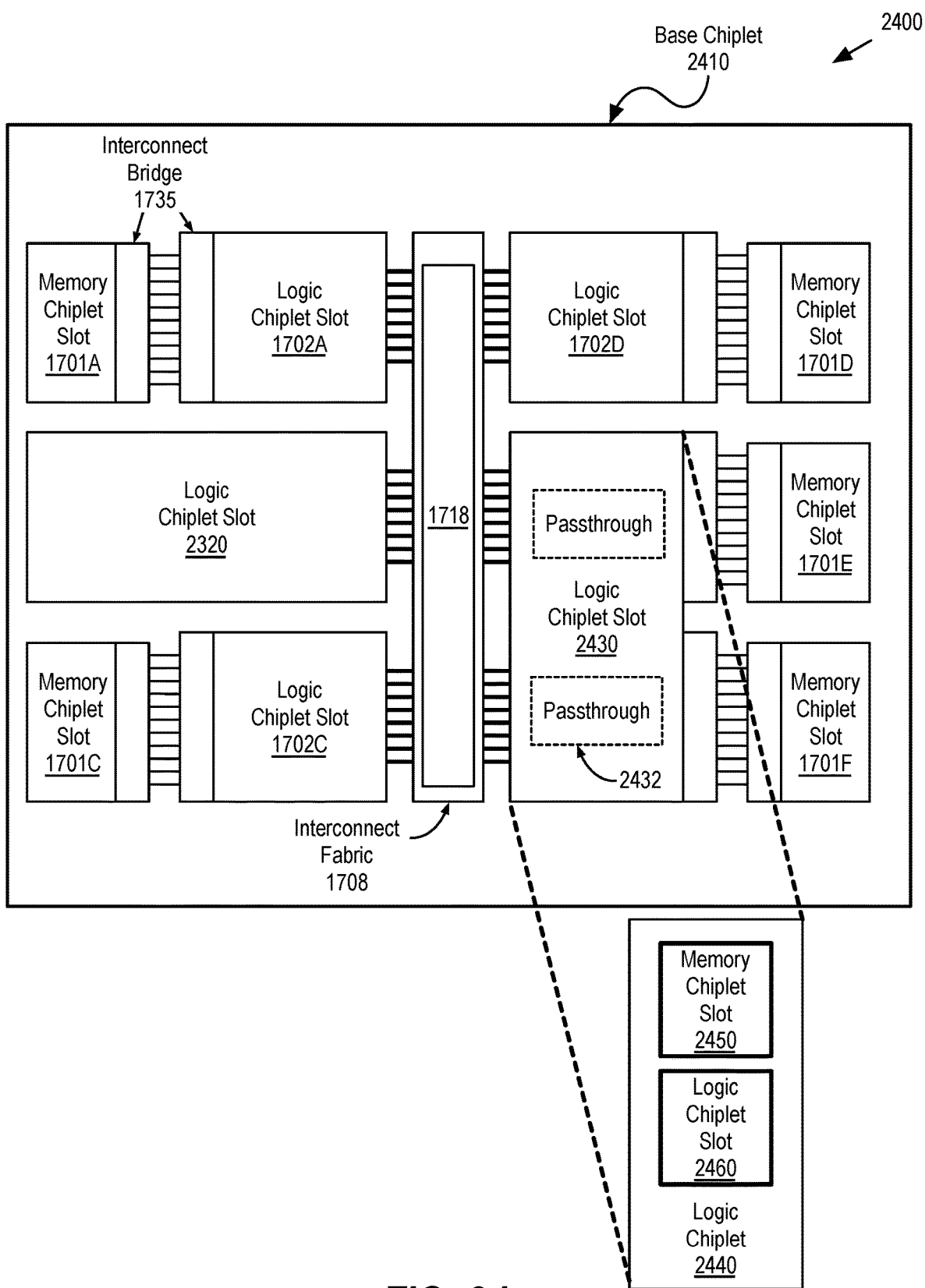
FIG. 24 illustrates an additional interchangeable chiplet system for heterogenous chiplets.

FIG. 24 illustrates an additional interchangeable chiplet system 2400 for heterogenous chiplets. The interchangeable chiplet system 2400 is similar to the interchangeable chiplet system 2300 of FIG. 23, with the addition of a base chiplet 2410 having a logic chiplet slot 2430 that includes one or more passthroughs 2432. The one or more passthroughs 2432 enables the logic chiplet slot 2430 to be populated with a logic chiplet 2440 that includes additional chiplet slots, which can include a memory chiplet slot 2450 or an additional logic chiplet slot 2460. The memory chiplet slot 2450 can be populated with a chiplet that include additional cache memory or random-access memory in a similar manner as memory chiplet slot 1701E or memory chiplet slot 1701F. The logic chiplet slot 2460 can be populated with a logic chiplet in a similar manner as any of logic chiplet slot 1702A, logic chiplet slot 1702C, or logic chiplet slot 1702D. The one or more passthroughs 2432 can couple the memory chiplet slot 2450 and logic chiplet slot 2460 to the interconnect fabric 1708 and/or an interconnect bridge 1735.

Figure 25:
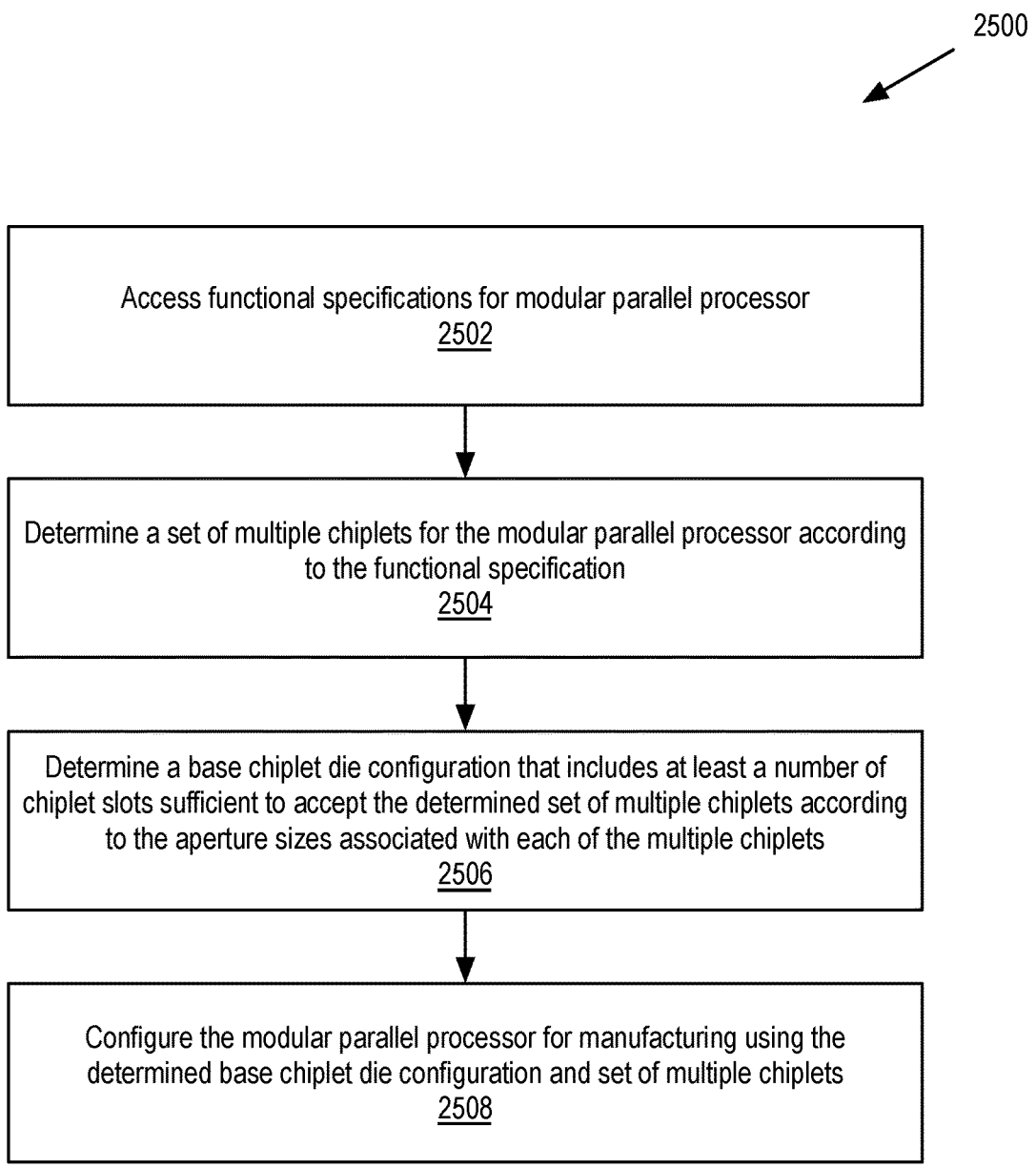
FIG. 25 illustrates a method of configuring a modular parallel processor via an interchangeable chiplet system, according to an embodiment.

FIG. 25 illustrates a method 2500 of configuring a modular parallel processor via an interchangeable chiplet system, according to an embodiment. Method 2500 can be performed by a product manufacturer or vendor to enable late-stage specification of a product in a manner that is decoupled from the design phase of the individual chiplets that make up the modular parallel processor. The modular parallel processor can be configured from two or more logic layers and can be configured with a 2D, 2.5D, or 3D arrangement. The specification of the components of the modular parallel processor can be performed via software logic that enables the provisioning of the logic of the various layers of the modular parallel processor according to provided functional specifications.

Method 2500 additionally includes operations to access functional specifications for a modular parallel processor (2502). In one embodiment, the functional specifications indicate the functionality to be provided by the modular parallel processor (e.g., AI training, AI inference, GPU gaming, GPU compute, CPU compute, heterogenous/hybrid parallel processing, etc.), as well as a power and performance target for the modular parallel processor. In one embodiment, the functional specifications indicate a specific number and type of functional units to be included modular parallel processor (e.g., matrix accelerators, integer units, floating-point units, media engines, etc.) and the specific number and type of cache and memory devices to couple with or include within those functional units. Such specifications can also include a power and performance target for the set of functional units and their associated cache and memory devices. The power and performance target can be an individual power and performance target for each group of memory devices and functional units according to the functionality provided by the group or can be a power envelope in which the aggregate set of functional units is to operate. Power targets can be specified as a target peak or average power consumption. Performance targets can be specified as a target number of operations per second or a clock frequency target. The functional specifications can be provided by a device manufacturer of a product designed by the manufacturer. The functional specifications can also be provided by a customer vendor of the device manufacturer for a custom device.

Method 2500 additionally includes to determine a set of multiple chiplets for the modular parallel processor according to the functional specification (2504). In one embodiment, the set of multiple chiplets are be determined that meet the functionality, power, and performance targets of the functional specification. In one embodiment, the set of multiple chiplets is determined based on an explicitly specified set of functional units. Determining the set of multiple chiplets may also include determining the desired post-production testing bin from which chiplets of a given functionality will be derived, which can be determined based on provided power and performance targets or specified functional detail, such as a number of functional execution cores. The set of multiple chiplets can be selected via a database of available chiplets, which may include an inventory of previously manufactured, tested, and binned chiplets and/or a projected inventory based on manufacturing targets and yield metrics.

Method 2500 additionally includes to determine a base chiplet die configuration that includes at least a number of chiplet slots sufficient to accept the determined set of multiple chiplets according to the aperture sizes associated with each of the multiple chiplets (2506). The determined set of multiple chiplets will couple with multiple chiplet slots of one or more base chiplet dies of the determined base chiplet die configuration. Each of the multiple chiplets has a dimension of (aN×bM), where N×M is the spatial dimension of a chiplet having a base aperture size (e.g., 1×1) and "a" and "b" are integer values that indicate a multiple of the dimensions of the base aperture size. The base chiplet can have corresponding chiplet slots of multiple different aperture sizes (e.g., lxi, 2×1, 1×2, 2×2, etc.). The determined base chiplet die configuration will include at least enough chiplet slots to accept the determined set of multiple chiplets and the aperture sizes associated with the determined set of multiple chiplets. The determined base chiplet die configuration can include multiple base chiplet dies, as shown in FIG. 11D, such as base chiplet 1196 and base chiplet 1198 that are coupled via a bridge interconnect 1197. Not all chiplet slots provided by the determined base chiplet die configuration are required to be populated. Different available base die configurations can include different interconnect configurations, with different interconnect configurations having different maximum interconnect bandwidths. The different interconnect configurations can vary based on the interconnect fabric layout and switching throughput for switching logic for a given base chiplet die or the number and positions of memory chiplet slots and interconnect bridges between the memory chiplet slots and logic chiplet slots. Where multiple base chiplet dies are used, the interconnect configuration includes the way the multiple chiplet dies are interconnected. Accordingly, determining the base chiplet die configuration may include determining a number and aperture configuration of the base chiplet dies as well as the interconnect mechanism for the base chiplet die configuration.

Method 2500 additionally includes to configure the modular parallel processor for manufacturing using the selected base chiplet die configuration and selected set of multiple chiplets (2508). Configuring the modular parallel processor for manufacturing can include generating a manufacturing manifest that identifies the specific base dies and chiplets to be used during the manufacturing process of the modular parallel processor. The manufacturing process for the modular parallel processor includes populating the chiplet slots provided by the base chiplet die configuration by mounting the determined set of multiple chiplets to the chiplet slots. Using method 2500, a modular product ecosystem can be enabled in which the exact specifications of each product SKU can be determined late in the product cycle based on the array of chiplets that are scheduled for manufacture or in some scenarios, using chiplets that are already in production.

Chiplet Architecture Chunking for Uniformity Across Configurations

Chiplet configurations with high chiplet counts require a high-cost, high-area power delivery system. When employing homogenous chiplet configurations, in-field repair and yield loss present execution core asymmetry across homogeneous chiplets, which may make high performance software scheduling problematic. Heterogeneous chiplet configurations present dynamic capacitance per area ($C_{dyn}$/mm$^2$) deltas that complicate power delivery and thermal management.

One approach is to use lowest common denominator configurations, which provisions all chiplets with uniform execution core counts, levelizing both in-field repair allocations and yield loss allocations. For example, if a block of execution cores on a compute unit chiplet is determined to be non-functional due to yield loss, the remaining execution cores can be allocated for in-field repair use. The ability to use those asymmetric compute unit chiplets as active chiplets would have increased performance and improved chiplet fallout utilization, binning, and overall product cost. However, the complexity of scheduling at the software level increases significantly when scheduling across chiplets with divergent execution core counts.

Figure 26:
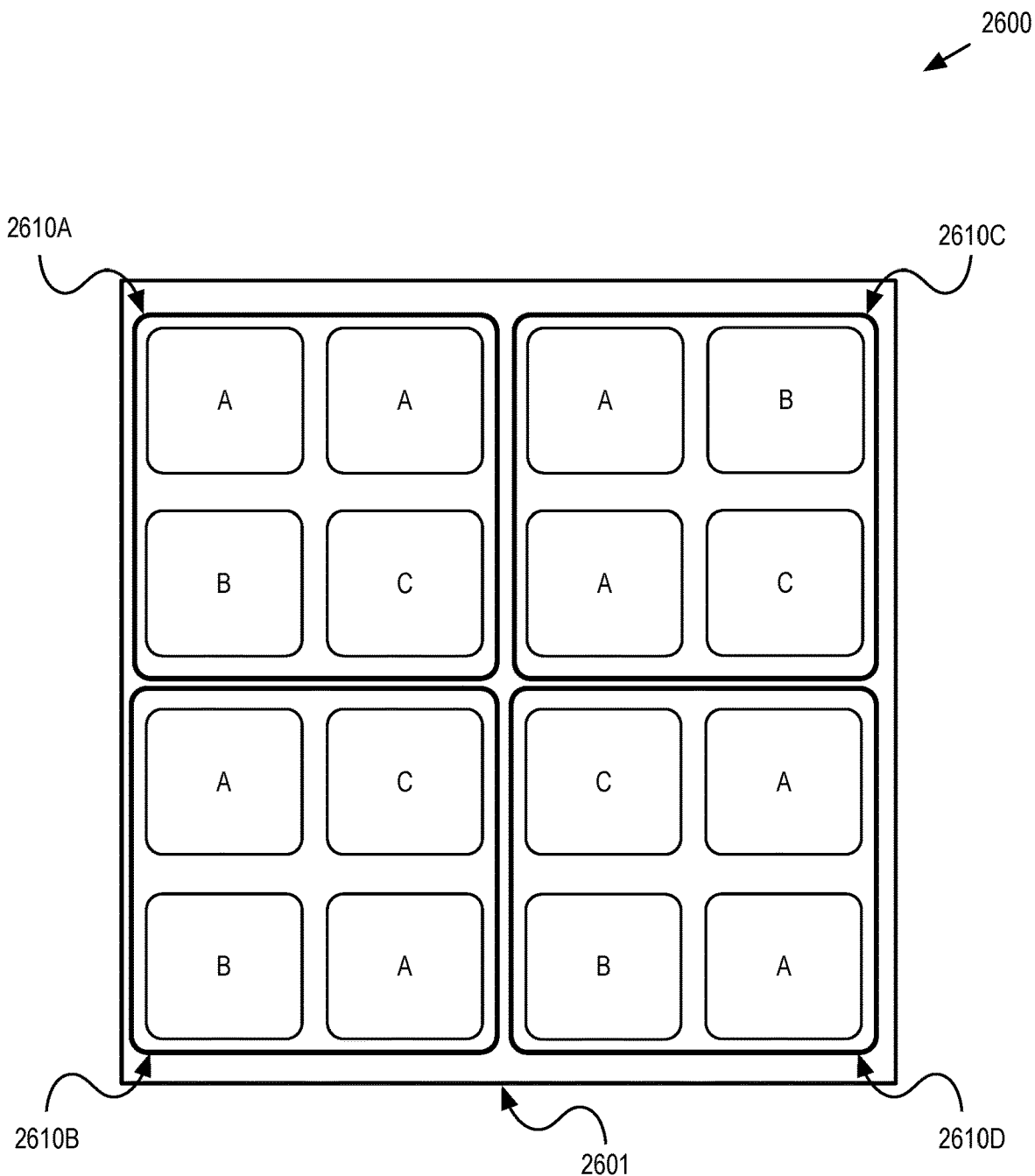
FIG. 26 illustrates a modular parallel processor configured with a chiplet chunking architecture, according to an embodiment.

Described herein is a technique of chiplet architecture chunking that enables software, power delivery, and thermal uniformity across asymmetric configurations. In one embodiment, overall execution core counts are normalized across multiple homogeneous chiplets. Normalization across multiple chiplets enable unified power delivery and thermal management across chunks of chiplets based on the combined core count of each chunk. In one embodiment, overall $C_{dyn}$ across chunks of heterogeneous chiplets is normalized. High-volume manufacturing (HVM) reels can be sorted by $C_{dyn}$, and power delivery and thermals are unified across chunks of chiplets. A semiconductor manufacturer would then no longer be required to use the lowest common denominator execution core counts across all homogeneous chiplets and in-field repair resources are not required to be allocated in a manner that is synergistic to the yield loss. Higher performance products become possible with more flexible SKUs, simplified power delivery, and lower production costs. Additionally, heterogenous chiplet configurations gain increase designed flexibility while maintaining a unified power delivery and thermal solution that enables the heterogenous chiplet configurations to obey $ICC_{max}$ limitations FIG. 26 illustrates a modular parallel processor 2600 configured with a chiplet chunking architecture, according to an embodiment. The modular parallel processor 2600 includes at least one base chiplet die 2601 and multiple chiplets that are configured to implement functionality according to the modular parallel processor 1520 of the modular parallel compute system 1500 of FIG. 15. The chiplets are arranged in multiple chunks 2610A-2610D that have a normalized execution core count. While four chunks are illustrated, any number of chunks can be used for the modular parallel processor 2600. In one embodiment, the modular parallel processor 2600 is a multi-tile processor, such as the graphics processor 320 of FIG. 3B or the compute accelerator 330 of FIG. 3C. In one embodiment, each of the multiple chunks 2610A-2610D corresponds with a tile. In one embodiment, each tile includes multiple chunks of chiplets.

In one embodiment, each of the multiple chunks 2610A-2610D include a balanced set of chiplets, where, for example chiplet A represents a fully yielding chiplet with all execution cores enabled, while chiplet B represents a chiplet with yield loss or a defect that lowers the total number of functional execution cores, and chiplet C represents a chiplet with a portion of the execution resources reserved in-field repair. While the number of execution cores is not identical across all chiplets, the number of execution cores are balanced within each of the multiple chunks 2610A-2610D. Firmware of the modular parallel processor 2600 can be configured to aggregate all execution cores within a chunk into a single schedulable unit, which enables simplified hardware and software scheduling on a per-chunk basis.

Figure 27:
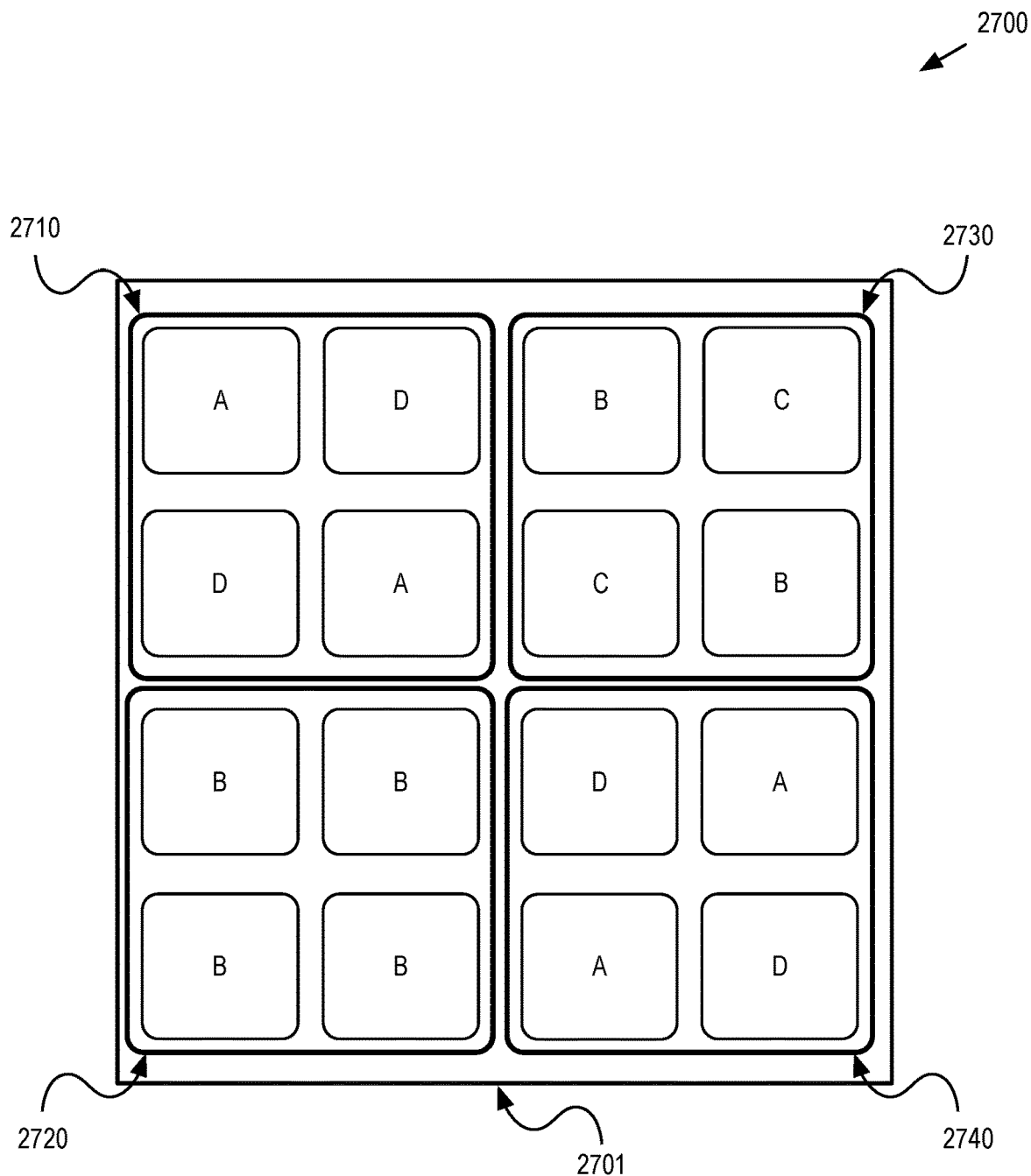
FIG. 27 illustrates a modular parallel processor configured with a heterogeneous chiplet chunking architecture, according to an embodiment.

FIG. 27 illustrates a modular parallel processor 2700 configured with a heterogeneous chiplet chunking architecture, according to an embodiment. The modular parallel processor 2700 includes at least one base chiplet 2701 that multiple heterogenous chiplets arranged in multiple chunks 2710, 2720, 2730, 2740. The multiple chunks 2710, 2720, 2730, 2740 may be non-uniform in functionality while being uniform for the purposes of power delivery and thermal management. During chiplet testing, a heterogenous set of chiplets can be sorted by $C_{dyn}$, or other power metrics. As noted with respect to FIG. 20, chiplets may also be tested and sorted according to leakage power, maximum operational frequency, minimum voltage, and the number and type of test failures. The tested and sorted chiplets can then be paired to create chunks having uniform power and thermal dissipation requirements. The chiplets may be heterogenous in functionality, power consumption, and aperture size. For example, with reference to FIG. 22, two chiplets of the sixth chiplet type 2220, each having a 2×1 chiplet aperture, can be included within a single chunk, while a single chiplet of the seventh chiplet type 2230 can represent a chunk. Alternatively, four chiplets of the first chiplet type 1620 can be included in a chunk with two chiplets of the sixth chiplet type 2220, while four chiplets of the second chiplet type 1630 can be included in a chunk with the chiplet of the seventh chiplet type 2230. Any contiguous arrangement of chiplets can be grouped into a chunk to create uniform power delivery, thermal management, and thermal dissipation regions.

Returning to FIG. 27, chiplet A, chiplet B, chiplet C, and chiplet D can have any of the following chiplet functions: 1) machine-learning training optimized systolic neural cores having support for BF16, TF32, BF8, FP16, and other formats that are optimal for training neural networks, 2) machine learning inference optimized systolic neural cores with support for small integer datatypes (e.g., INT4, INT8, ternary, binary), 3) non-systolic single-precision (FP32) and double-precision (FP64) vector and GEMM compute optimized cores, 4) INT32 and INT64 cores optimized for integer and bitwise operations, 5) GPU fixed-function graphics rendering pipeline, 6) Media fixed-function decode, transcode, encode, and video enhancement 7) security functions, including trusted domain extensions (TDX, TDX-io), memory encryption), GSC/CSC controllers, firmware, etc., 8) Ray tracing, 9) Cache and/or memory, 10) Boot uController, 11) Offload CPU core module that can accept offload of host CPU operations and/or assist in the execution of device driver logic. Other chiplet functions may also be supported. In one embodiment, the boot microcontroller can be configured to boot a variety of different types of functional units within the various chiplets, including but not limited to boot operations for CPUs and/or GPUs.

The above chiplet functions can be encapsulated implementations of the parallel processor and graphics processor functionality described herein. For example, the training or inference optimized systolic neural cores can include circuitry of the tensor cores 244 of FIG. 2C or the matrix engine 503 of FIG. 5C. Non-systolic floating-point and integer cores may be implemented using circuitry of the vector engine 502 of FIG. 5B, the graphics cores 243 of FIG. 2C, or the vector logic units 263 of FIG. 2D. Media fixed-function decode, transcode, encode, and video enhancement can be implemented using circuitry of the video front-end 834 and media engine 837 of FIG. 8. Controller or firmware functionality can be implemented using circuitry associated with, for example, the graphics microcontroller 233 of FIG. 2B. Ray tracing chiplet functions can be implemented, for example, using circuitry of one or more ray tracing units 227A-227F of FIG. 2B, ray tracing cores 245 of FIG. 2C, or ray tracing units 508A-508N of FIG. 5A. Cache and/or memory functionality can be implemented or configured for use as any cache or memory described herein, such as the cache unit(s) 204A-204N or embedded memory module 218 of FIG. 2A, the cache/SLM 228A-228F of FIG. 2B, L1 caches and shared memory units 247 or L2 cache 253 of FIG. 2C, or any other L1, L2, L3, or LLC cache described herein. The offload CPU core may be a CPU core such as one of the processor core(s) 107 of FIG. 1, core 202A-202N of FIG. 2A, or any other CPU or application processor core described herein.

In various embodiments, multiple chiplet functions can be included within a single chiplet or a chiplet can be dedicated to a single function. For example, in one embodiment a chiplet having a 1×1 aperture size can include a single function, while a 2×1 or 1×2 aperture chiplet can include two or more functions. In one embodiment, a chiplet having a 1xi aperture can also include multiple functions depending on the silicon area required to implement those functions.

For example, in one datacenter configuration, chiplet A may be a media chiplet, chiplet B may be a non-systolic compute core, chiplet C may be a GPU core, and chiplet D may be a machine-learning training optimized chiplet including systolic neural cores. According to the tested $C_{dyn}$ for the respective chiplets, the chiplets are grouped into chunks. Power delivery, thermal management, and thermal dissipation can then be configured according to the requirements of each of the multiple chunks 2710, 2720, 2730, 2740.

Figure 28:
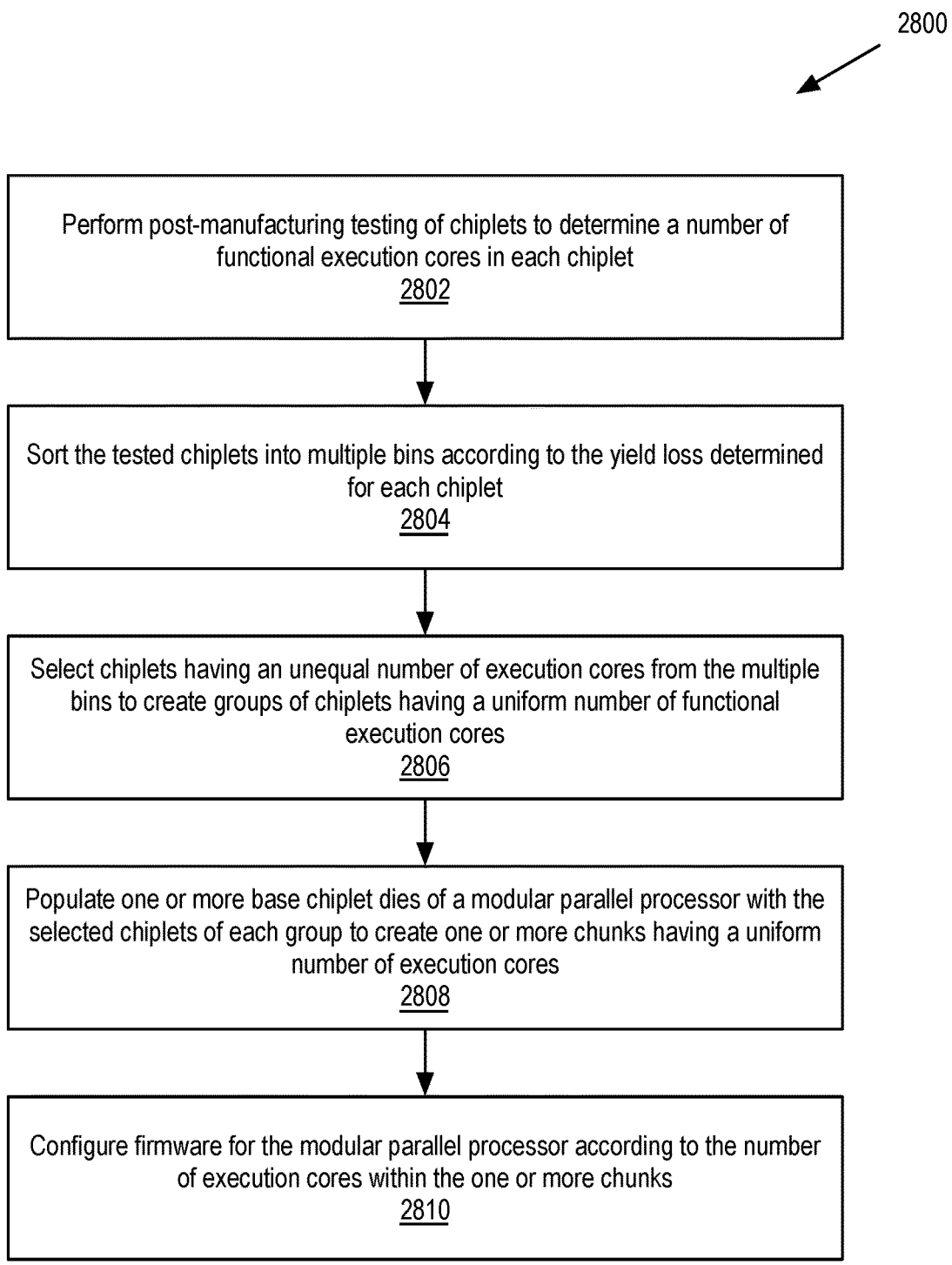
FIG. 28 illustrates a method of chunking chiplets having heterogenous execution core counts, according to an embodiment.

FIG. 28 illustrates a method 2800 of chunking chiplets having heterogenous execution core counts, according to an embodiment. The method 2800 can be performed by a product or semiconductor manufacturer to enable the creation of uniform chunks of execution cores to simplify software and hardware scheduling. Operations associated with the method 2800 can be facilitated via software logic that assists chiplet selection and chunking.

Method 2800 includes to perform post-manufacturing testing of chiplets to determine a number of functional execution cores in each chiplet (2802). The execution cores may also be referred to execution units, graphics cores, compute units, streaming multiprocessors, graphics multiprocessors, or multi-core groups, for example, as shown in the various graphics processor architectures described herein. The post-manufacturing testing can be performed by at least partially packaging the chiplet and testing chiplet functionality via a test harness, as shown in FIG. 19. The chiplet functionality test can determine the number of functional execution cores on the tested chiplet. Non-functional or faulting execution cores can be disabled and the functional execution cores of the chiplet can be further tested for performance binning.

The chiplets can then be sorted into multiple bins according to the yield loss determined for each chiplet (2804). The chiplets having an unequal number of execution cores can then be selected from the multiple bins to create groups of chiplets having a uniform number of functional execution cores (2806). In one embodiment, a group of chiplets may include one or more fully yielding chiplets, one or more chiplets with a number of non-functional execution cores due to yield loss, and/or one or more chiplets with a number of functional execution cores that are reserved for in-field repair. The chiplets with functional execution cores that are reserved for in-field repair may or may not also include a number of execution cores that are non-functional due to yield loss.

Method 2800 additionally includes, once the chiplet groups are created, to populate one or more base chiplet dies for a modular parallel processor with the selected chiplets of each group to create one or more chunks having a uniform number of execution cores (2808). The product or semiconductor manufacturer can then configure firmware for the modular parallel processor according to the number of execution cores within the one or more chunks (2810). In one embodiment, the firmware configuration includes configuring a BIOS for the modular parallel processor with the number of functional execution cores that are active within each chunk, as well as the number of functional execution cores that are reserved for in-field repair. The firmware configuration can also include configuring scheduling firmware to indicate the chunking arrangement of the various chiplets and their associated execution cores. Threads may then be scheduled uniformly across each chunk.

Figure 29:
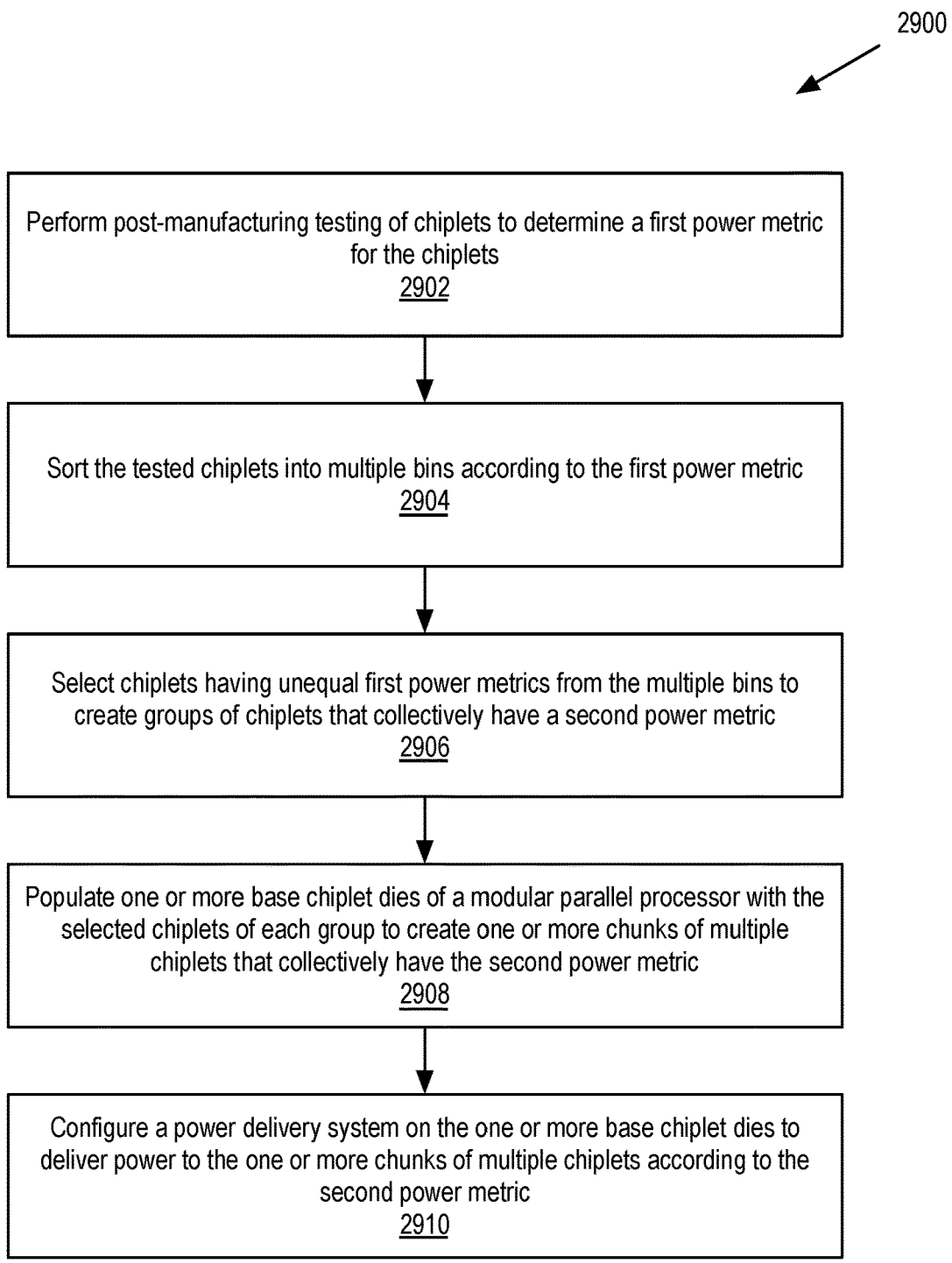
FIG. 29 illustrates a method of chunking chiplets having heterogenous power requirements, according to an embodiment.

FIG. 29 illustrates a method 2900 of chunking chiplets having heterogenous power requirements, according to an embodiment. The method 2900 can be performed by a product or semiconductor manufacturer to enable the creation of chunks of chiplets having uniform power requirements to simplify power delivery and thermal management. Operations associated with the method 2900 can be facilitated via software logic that assists chiplet selection and chunking. In one embodiment, method 2900 is performed in conjunction with method 2800 to select chiplet chunks for a modular parallel processor that include a uniform or pre-determined number of execution cores and have uniform or pre-determined power metrics.

Method 2900 includes to perform post-manufacturing testing of chiplets to determine a first power metric for the chiplets (2902). The determined power metric can include $C_{dyn}$, or other power metrics, such as the peak power consumption of the chiplet or power-frequency relationship for the chiplet. The post-manufacturing testing can be performed by at least partially packaging the chiplet and testing chiplet functionality and power consumption via a test harness, as shown in FIG. 19. A single modular parallel processor can include multiple types of chiplets that have different types of functional units. The power metric determined for a given chiplet may be a function of the type of functional units within a chiplet and the number of functional units within a chiplet. The power metric determined for a given chiplet may also be related to the aperture size of the chiplet, which may also be related to the type and number of functional units within a chiplet, as larger chiplets contain a larger number of functional units and/or more complex types of functional units. The power metric determined for a given chiplet can also vary across chiplets having the same type and number of functional units due to manufacturing variances.

The method 2900 additionally includes performing operations to sort the tested chiplets into multiple bins according to the first power metric (2904). The chiplets can then be selected from the multiple bins to create groups of chiplets that collectively have a second power metric (2906). The second power metric can be a collective or aggregate $C_{dyn}$ for the groups of chiplets, a collective or aggregate peak power consumption, or collective power-frequency relationship. The groups of chiplets can be generated to have uniform power delivery requirements or can be associated with a tier of power delivery requirements. The tier of power delivery requirements can be associated with a target performance or power segment intended for multiple tiers of a modular parallel processor that is manufactured using this method. The tier of power delivery requirements may also be associated with a tier of power domains of a single modular parallel processor.

Method 2900 additionally includes, once the chiplet groups are created, to populate one or more base chiplet dies of a modular parallel processor with the selected chiplets to create one or more chunks of multiple chiplets that collectively have the second power metric (2908). The method 2900 additionally includes operations to configure a power delivery system on the one or more base chiplet dies to deliver power to the one or more chunks of multiple chiplets according to the second power metric (2910). In one embodiment, configuring the power delivery system on the one or more base chiplet dies includes selecting and voltage and thermal regulator components for use on the one or more base chiplet dies. In one embodiment, configuring the power delivery to the chiplets can be performed by selecting a base chiplet die from multiple available base chiplet dies, where the selected base chiplet die is pre-configured with sufficient power delivery capacity for each heterogenous chunk. Configuring the voltage and thermal regulator components can additionally include configuring settings for the voltage and thermal regulator components selected for use on the one or more base chiplets dies or on the selected one or more pre-configured base chiplet dies.

Firmware of the modular parallel processor may then be fine-tuned based on the $C_{dyn}$ or other power metrics for each chunk of multiple chiplets. While power delivery on a base chiplet die is configured on a per-chunk basis, power control logic 1832 within the interface template 1808 for each chiplet is configured according to the specific power requirements for each chiplet.

Figure 30B:
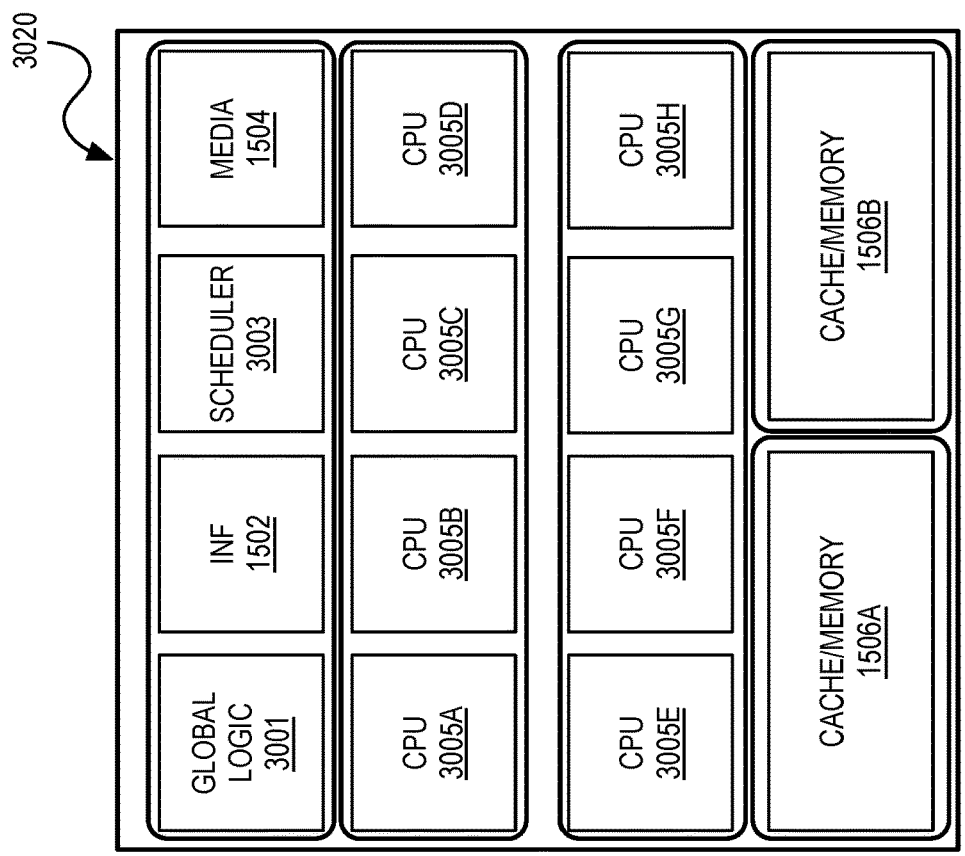
FIG. 30A-30B illustrates exemplary modular parallel processors having chiplets configured for a universal chiplet architecture.
Figure 30A:
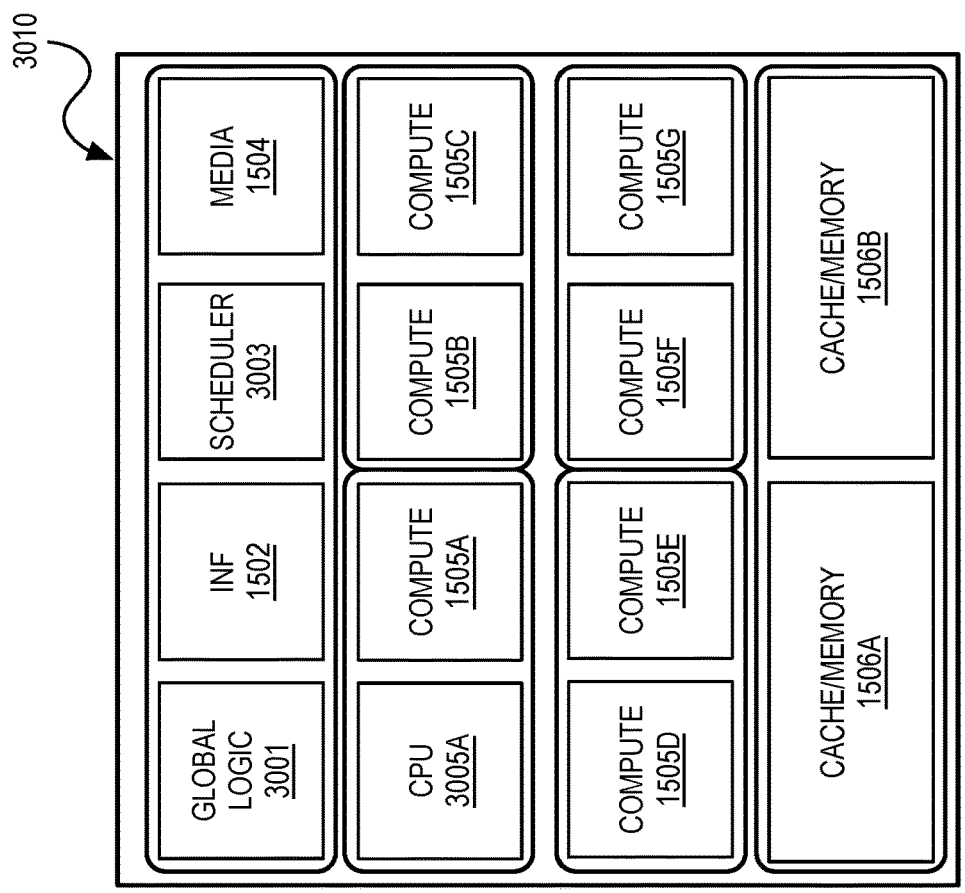

FIG. 30A-30B illustrates exemplary modular parallel processors 3010, 3020 having chiplets configured for a universal chiplet architecture. The modular parallel processors 3010, 3020 may be versions of the modular parallel processor 1520 of FIG. 15, where modular functionality is provided by an array of chiplets as described herein.

As shown in FIG. 30A, a modular parallel processor 3010 may configured that is similar to the modular parallel processor 1520 of FIG. 15, excepting that one or more of the compute chiplets may be replaced with one or more general-purpose processor chiplets (e.g., CPU 3005A), which can perform operations of one or more general-purpose processor cores as described herein. In one embodiment, a general-purpose processor chiplet can act as a CPU offload processor and accept workloads dispatched from a host processor to which the exemplary modular parallel processor 3010 is coupled with via the interface 1502. In one embodiment, the general-purpose processor chiplet may act as a standalone CPU. In such embodiment, the global logic 3001 can include boot logic to enable the general-purpose processor chiplet to act as a bootable CPU. A scheduler chiplet 3003 can replace the thread dispatcher. The scheduler chiplet 3003, in one embodiment, is a microcontroller or low power processor that executes software or firmware that is capable of performing scheduling and dispatch operations for CPU, GPU, or general-purpose compute tasks.

The chiplets of the modular parallel processor 3010 can be arranged into multiple chunks depending one or more chunking characteristics. In one embodiment, a first chiplet chunk can include the global logic 3001, interface 1502, scheduler 3003, and media unit 1504, which may be chunked for power delivery purposes. Various chunks may be created among the general-purpose processor chiplet and the various chiplets that provide the compute units 1505A-1505G. Chiplet chunks may also be created among the chiplets that provide the compute units 1505A-1505G to normalize the number of execution cores within each chunk. The cache and/or memory chiplets that provide the set of cache/memory units 1506A-1506B may be grouped into a chunk for power delivery purposes.

As shown in FIG. 30B, a modular parallel processor 3020 may be configured that provides a high core count or many integrated core CPU. Chiplets that provide graphics processing functionality may be entirely replaced with CPU chiplets 3005A-3005H that enable general-purpose parallel processing operations. The modular parallel processor 3020 may employ a variety of chiplet chunking arrangements to simplify power delivery and scheduling across diverse chiplets which may include uneven core counts of power requirements. In one embodiment, the cache and/or memory chiplets that provide the set of cache/memory units 1506A-1506B may be reside in separate chunks for power delivery or capacity leveling purposes.

In various embodiments, chiplet chunks or other groupings of chiplets may reside on separate tiles of chiplets, which couple via tile interconnects. Each tile may include one or more chiplet chunks. Cache coherency between the various chiplets can be maintained at various granularities using both software and hardware coherency. For example, hardware coherency may be maintained within a tile, while cross-tile coherency is managed via software. In one embodiment, hardware coherency may be maintained among groups of tiles, while software coherency is maintained across groups of tiles.

Figures 31A, 31B:
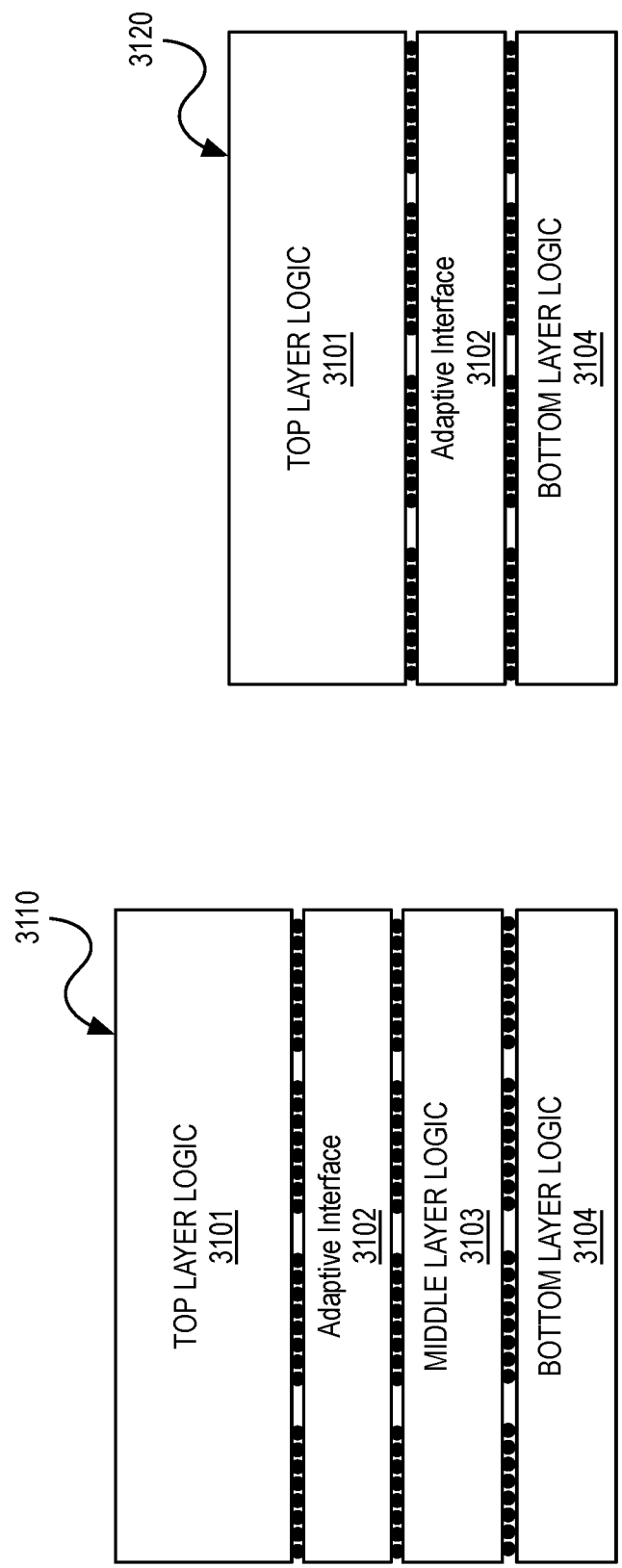
FIG. 31A-31B illustrates an exemplary adaptive chiplet interface for modular parallel processors.

FIG. 31A-31B illustrates an exemplary adaptive chiplet interface for modular parallel processors 3110, 3120. Chiplets of the modular parallel processors as described herein may be manufactured using a variety of process technologies and interface via a variety of die-to-die interface technologies. In one embodiment, an adaptive interface 3102 is provided that includes logic that is configurable to interconnect with multiple cache or memory technologies over a unified die-to-die interface.

As shown in FIG. 31A, a modular parallel processor 3110 configured for data center operations can include top layer logic 3101, the adaptive interface 3102, middle layer logic 3103, and bottom layer logic 3104. The top layer logic 3101 can include one or more chiplets that provide control logic and functional units. The middle layer logic 3103 can include for example, cache memory and cache controller logic. The bottom layer logic 3104 can include additional cache memory and a package interface. For example, the middle layer logic 3103 can include a large cache that may be shared among multiple logic units within the top layer logic 3101, while the bottom layer logic 3104 provides an additional layer of cache memory. Logic within the adaptive interface 3102 can be selectively enabled to facilitate the use of the cache memory in the middle layer logic 3103 and the bottom layer logic 3104.

As shown in FIG. 31B, a modular parallel processor 3110 configured for consumer use can exclude the middle layer logic 3103 and its associated cache memory. The adaptive interface 3102 can be configured to provide access to the cache memory of the bottom layer logic 3104, without requiring the use of a separate interface.

Additional Exemplary Computing Device

Figure 32:
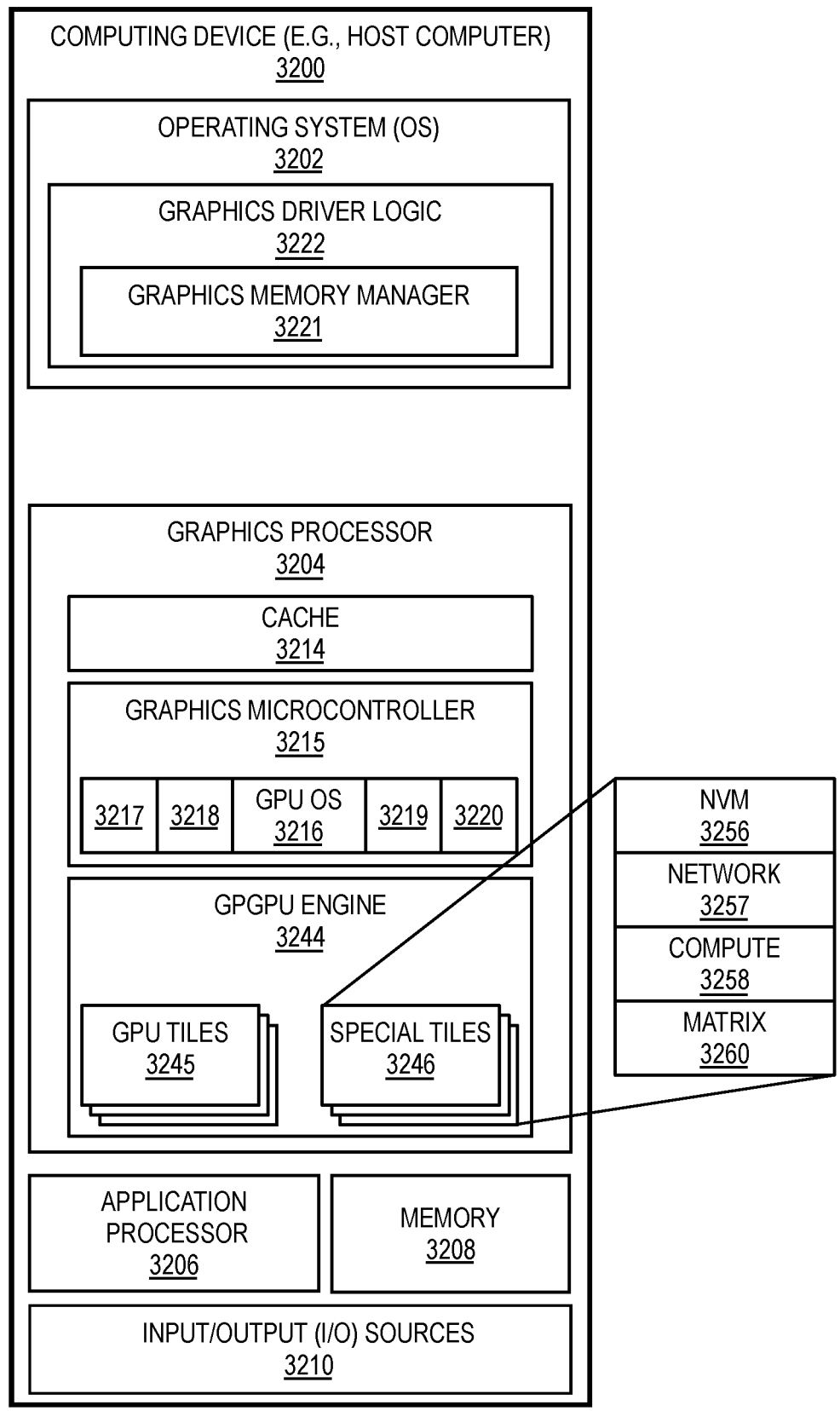
FIG. 32 is a block diagram of a computing device including a graphics processor, according to an embodiment.

FIG. 32 is a block diagram of a computing device 3200 including a graphics processor 3204, according to an embodiment. Versions of the computing device 3200 may be or be included within a communication device such as a set-top box (e.g., Internet-based cable television set-top boxes, etc.), global positioning system (GPS)-based devices, etc. The computing device 3200 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 3200 includes a mobile computing device employing an integrated circuit ("IC"), such as system on a chip ("SoC" or "SOC"), integrating various hardware and/or software components of computing device 3200 on a single chip. The computing device 3200 can be a computing device such as the processing system 100 as in of FIG. 1.

The computing device 3200 includes a graphics processor 3204. The graphics processor 3204 represents any graphics processor described herein. In one embodiment, the graphics processor 3204 includes a cache 3214, which can be a single cache or divided into multiple segments of cache memory, including but not limited to any number of L1, L2, L3, or L4 caches, render caches, depth caches, sampler caches, and/or shader unit caches. In one embodiment the cache 3214 may be a last level cache that is shared with the application processor 3206.

In one embodiment the graphics processor 3204 includes a graphics microcontroller that implements control and scheduling logic for the graphics processor. The control and scheduling logic can be firmware executed by the graphics microcontroller 3215. The firmware may be loaded at boot by the graphics driver logic 3222. The firmware may also be programmed to an electronically erasable programmable read only memory or loaded from a flash memory device within the graphics microcontroller 3215. The firmware may enable a GPU OS 3216 that includes device management logic 3217, device driver logic 3218, and a scheduler 3219. The GPU OS 3216 may also include a graphics memory manager 3220 that can supplement or replace the graphics memory manager 3221 within the graphics driver logic 3222.

The virtual memory address management for compression data described herein can be implemented, in various embodiments, by the graphics memory manager 3220 of the GPU OS 3216, the graphics memory manager 3221 within the graphics driver logic 3222, or another component of the GPU OS 3216 and/or graphics driver logic 3222.

The graphics processor 3204 also includes a GPGPU engine 3244 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources or performing general purpose computational operations in a heterogeneous processor. The processing resources of the GPGPU engine 3244 can be included within multiple tiles of hardware logic connected to a substrate, as illustrated in FIG. 11B-11D. The GPGPU engine 3244 can include GPU tiles 3245 that include graphics processing and execution resources, caches, samplers, etc. The GPU tiles 3245 may also include local volatile memory or can be coupled with one or more memory tiles, for example, as shown in FIG. 3B-3C.

The GPGPU engine 3244 can also include and one or more special tiles 3246 that include, for example, a non-volatile memory tile 3256, a network processor tile 3257, and/or a general-purpose compute tile 3258. The GPGPU engine 3244 also includes a matrix multiply accelerator 3260. The general-purpose compute tile 3258 may also include logic to accelerate matrix multiplication operations. The non-volatile memory tile 3256 can include non-volatile memory cells and controller logic. The controller logic of the non-volatile memory tile 3256 may be managed by the device management logic 3217 or the device driver logic 3218. The network processor tile 3257 can include network processing resources that are coupled to a physical interface within the input/output (I/O) sources 3210 of the computing device 3200. The network processor tile 3257 may be managed by one or more of device management logic 3217 or the device driver logic 3218. Any of the GPU tiles 3245 or one or more special tiles 3246 may include an active base with multiple stacked chiplets, as described herein.

The matrix multiply accelerator 3260 is a modular scalable sparse matrix multiply accelerator. The matrix multiply accelerator 3260 can includes multiple processing paths, with each processing path including multiple pipeline stages. Each processing path can execute a separate instruction. In various embodiments, the matrix multiply accelerator 3260 can have architectural features of any one or more of the matrix multiply accelerators described herein. For example, in one embodiment, the matrix multiply accelerator 3260 is a four-deep systolic array with a feedback loop that is configurable to operate with a multiple of four number of logical stages (e.g., four, eight, twelve, sixteen, etc.). In one embodiment the matrix multiply accelerator 3260 includes one or more instances of a two-path matrix multiply accelerator with a four stage pipeline or a four-path matrix multiply accelerator with a two stage pipeline. The matrix multiply accelerator 3260 can be configured to operate only on non-zero values of at least one input matrix. Operations on entire columns or submatrices can be bypassed where block sparsity is present. The matrix multiply accelerator 3260 can also include any logic based on any combination of these embodiments, and particularly include logic to enable support for random sparsity, according to embodiments described herein.

As illustrated, in one embodiment, and in addition to the graphics processor 3204, the computing device 3200 may further include any number and type of hardware components and/or software components, including, but not limited to an application processor 3206, memory 3208, and input/output (I/O) sources 3210. The application processor 3206 can interact with a hardware graphics pipeline, as illustrated with reference to FIG. 3A, to share graphics pipeline functionality. Processed data is stored in a buffer in the hardware graphics pipeline and state information is stored in memory 3208. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 3206 can include one or processors, such as processor(s) 102 of FIG. 1 and may be the central processing unit (CPU) that is used at least in part to execute an operating system (OS) 3202 for the computing device 3200. The OS 3202 can serve as an interface between hardware and/or physical resources of the computing device 3200 and one or more users. The OS 3202 can include driver logic for various hardware devices in the computing device 3200. The driver logic can include graphics driver logic 3222, which can include the user mode graphics driver 1026 and/or kernel mode graphics driver 1029 of FIG. 10. The graphics driver logic can include a graphics memory manager 3221 to manage a virtual memory address space for the graphics processor 3204.

It is contemplated that in some embodiments the graphics processor 3204 may exist as part of the application processor 3206 (such as part of a physical CPU package) in which case, at least a portion of the memory 3208 may be shared by the application processor 3206 and graphics processor 3204, although at least a portion of the memory 3208 may be exclusive to the graphics processor 3204, or the graphics processor 3204 may have a separate store of memory. The memory 3208 may comprise a pre-allocated region of a buffer (e.g., framebuffer); however, it should be understood by one of ordinary skill in the art that the embodiments are not so limited, and that any memory accessible to the lower graphics pipeline may be used. The memory 3208 may include various forms of random-access memory (RAM) (e.g., SDRAM, SRAM, etc.) comprising an application that makes use of the graphics processor 3204 to render a desktop or 3D graphics scene. A memory controller hub, such as memory controller 116 of FIG. 1, may access data in the memory 3208 and forward it to graphics processor 3204 for graphics pipeline processing. The memory 3208 may be made available to other components within the computing device 3200. For example, any data (e.g., input graphics data) received from various I/O sources 3210 of the computing device 3200 can be temporarily queued into memory 3208 prior to their being operated upon by one or more processor(s) (e.g., application processor 3206) in the implementation of a software program or application. Similarly, data that a software program determines should be sent from the computing device 3200 to an outside entity through one of the computing system interfaces, or stored into an internal storage element, is often temporarily queued in memory 3208 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 3210 may include one or more I/O devices that are implemented for transferring data to and/or from the computing device 3200 (e.g., a networking adapter); or, for a large-scale non-volatile storage within the computing device 3200 (e.g., SSD/HDD). User input devices, including alphanumeric and other keys, may be used to communicate information and command selections to graphics processor 3204. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 3200 may be employed to observe gestures, record audio and video and to receive and transmit visual and audio commands.

The I/O sources 3210 can include one or more network interfaces. The network interfaces may include associated network processing logic and/or be coupled with the network processor tile 3257. The one or more network interface can provide access to a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), $5^{th}$ Generation (5G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing devices described herein may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), Open Computing Language (OpenCL®), CUDA®, DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present. Similarly, items listed in the form of "at least one of A, B, or C" can mean (A); (B); (C): (A and B); (B and C); or (A, B, and C).

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Embodiments described herein provide a modular parallel processor comprising an active base die including hardware logic, interconnect logic, and a plurality of chiplet slots and a plurality of chiplets vertically stacked on the active base die and coupled with the plurality of chiplet slots of the active base die. The plurality of chiplets is interchangeable during assembly of the modular parallel processor and include a group of hardware logic chiplets having a plurality of different functional units and a group of memory chiplets having a plurality of different memory devices. The hardware logic chiplets and the memory chiplets interconnect via the interconnect logic within the active base die.

A further embodiment provides a method comprising accessing a functional specification for modular parallel processor; determining a set of multiple chiplets for the modular parallel processor according to the functional specification of the modular parallel processor; determining a base chiplet die configuration according to a set of aperture sizes associated with the set of multiple chiplets; and configuring the modular parallel processor for manufacturing using the base chiplet die configuration and the set of multiple chiplets.

Also described herein is a modular parallel processor and associated manufacturing method in which the parallel processor is assembled from multiple chiplets that populate multiple chiplet slots of an active base chiplet die. The multiple chiplets are tested to determine characteristics of the chiplet, such as a number of functional units or a power consumption metric for the chiplet. The multiple chiplet slots can be configured to be populated by one or more chunks of multiple chiplets, where each chunk has a pre-determined collective value. The pre-determined collective value can be a total number of functional execution cores within a chunk or a collective power metric for the chunk.

One embodiment provides a parallel processor comprising an active base chiplet die including hardware logic, interconnect logic, and a plurality of chiplet slots and a plurality of chiplets vertically stacked on the active base chiplet die. The plurality of chiplets couple with the plurality of chiplet slots of the active base chiplet die and are interchangeable during assembly of the parallel processor. The plurality of chiplets include a first group of chiplets and a second group of chiplets, the first group of chiplets and the second group of chiplets each include chiplets having a respectively unequal number of execution cores that total to a pre-determined number of execution cores.

One embodiment provides a method comprising selecting chiplets from multiple bins of chiplets to create multiple groups of chiplets that collectively have a second power metric, the chiplets in the multiple bins of chiplets having been tested to determine a first power metric; populating multiple chiplet slots of a base chiplet die with the selected chiplets to create one or more chunks of multiple chiplets, the one or more chunks of multiple chiplets having a second power metric; and configuring a power delivery system on the base chiplet die, the power delivery system to deliver power to the one or more chunks of multiple chiplets according to the second power metric.

One embodiment provides a parallel processing system comprising a first active base chiplet die including first hardware logic and a first plurality of chiplet slots, the first plurality of chiplet slots populated with a first plurality of chiplets having a respectively unequal number of execution cores that total to a pre-determined number of execution cores and a second active base chiplet die coupled with the first active base chiplet die, the second active base chiplet die including second hardware logic and a second plurality of chiplet slots. The second plurality of chiplet slots is populated with a second plurality of chiplets having respectively unequal power metrics and a collective power metric equal to a first pre-determined value.

The specification and drawings are to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A non-transitory machine-readable medium storing instructions thereon, the instructions to cause one or more processors to perform operations comprising:
    loading a functional specification for a modular parallel processor from a machine-readable storage medium, the functional specification including two or more of a functionality target, a power target, and a performance target;
    determining a set of multiple chiplets for the modular parallel processor according to the functional specification of the modular parallel processor and a database of available chiplets that includes an inventory of tested and binned chiplets;
    determining a base chiplet die configuration according to a set of aperture sizes associated with the set of multiple chiplets and aperture sizes respectively associated with chiplet slots of base dies of a plurality of base chiplet dies, wherein the plurality of base chiplet dies include multiple configurations of chiplet slots associated with different aperture sizes and the chiplet slots are respectively configured to couple with a chiplet having a corresponding aperture size; and configuring the modular parallel processor for manufacturing using the base chiplet die configuration and the set of multiple chiplets, including generating an electronic manufacturing manifest that includes identifiers for one or more base chiplet dies of the base chiplet die configuration and chiplets of the set of multiple chiplets.

2. The non-transitory machine-readable medium as in claim 1, wherein the plurality of base chiplet die configurations includes a first base chiplet die configuration having a plurality of chiplet slots of uniform aperture sizes and a second based chiplet configuration having a plurality of chiplet slots of non-uniform aperture sizes.

3. The non-transitory machine-readable medium as in claim 2, wherein determining the set of multiple chiplets for the modular parallel processor according to the functional specification includes selecting chiplets that conform with the functionality target, power target, and/or performance target of the functional specification.

4. The non-transitory machine-readable medium as in claim 1, wherein the functional specification includes a number and type of functional units and an associated power or performance target and the database of available chiplets includes a number and type of functional units and a power or performance bin associated respectively with the available chiplets.

5. The non-transitory machine-readable medium as in claim 4, wherein to determine the set of multiple chiplets includes selecting chiplets that conform with the number and type of functional units and the associated power or performance target.

6. The non-transitory machine-readable medium as in claim 4, wherein selecting chiplets that conform with the number and type of functional units includes selecting chiplets that include one or more of a matrix accelerator and an integer logic unit or a floating point unit.

7. The non-transitory machine-readable medium as in claim 1, wherein determining the base chiplet die configuration includes selecting a set of one or more base chiplet dies that provides at least a number of chiplet slots sufficient to accept the set of multiple chiplets determined for the modular parallel processor according to the aperture sizes associated with the set of multiple chiplets.

8. The non-transitory machine-readable medium as in claim 7, wherein determining the base chiplet die configuration includes determining a number of base chiplet dies and an interconnect configuration for the base chiplet dies.

9. The non-transitory machine-readable medium as in claim 8, wherein the electronic manufacturing manifest includes identifiers for at least one chiplet associated respectively with two or more layers of the modular parallel processor.

10. The non-transitory machine-readable medium as in claim 9, further comprising manufacturing the modular parallel processor, wherein manufacturing the modular parallel processor includes mounting the set of multiple chiplets to chiplet slots of the base chiplet dies.

11. A data processing system comprising:
a memory device configured to store instructions; and
one or more processors coupled with the memory device and configured to execute the instructions, wherein the instructions cause the one or more processors to perform operations to:
load a functional specification for a modular parallel processor from a machine-readable storage medium, the functional specification including two or more of a functionality target, a power target, and a performance target;
determine a set of multiple chiplets for the modular parallel processor according to the functional specification of the modular parallel processor and a database of available chiplets that includes an inventory of tested and binned chiplets;
determine a base chiplet die configuration according to a set of aperture sizes associated with the set of multiple chiplets and aperture sizes respectively associated with chiplet slots of base dies of a plurality of base chiplet dies, wherein the plurality of base chiplet dies include multiple configurations of chiplet slots associated with different aperture sizes and the chiplet slots are respectively configured to couple with a chiplet having a corresponding aperture size; and
configure the modular parallel processor for manufacturing using the base chiplet die configuration and the set of multiple chiplets, including to generate an electronic manufacturing manifest that includes identifiers for one or more base chiplet dies of the base chiplet die configuration and chiplets of the set of multiple chiplets.

12. The data processing system as in claim 11, wherein the plurality of base chiplet die configurations includes a first base chiplet die configuration having a plurality of chiplet slots of uniform aperture sizes and a second based chiplet configuration having a plurality of chiplet slots of non-uniform aperture sizes.

13. The data processing system as in claim 12, wherein to determine the set of multiple chiplets for the modular parallel processor according to the functional specification includes to select chiplets that conform with the functionality target, power target, and/or performance target of the functional specification.

14. The data processing system as in claim 11, wherein the functional specification includes a number and type of functional units and an associated power or performance target and the database of available chiplets includes a number and type of functional units and a power or performance bin associated respectively with the available chiplets.

15. The data processing system as in claim 14, wherein to determine the set of multiple chiplets includes selecting chiplets that conform with the number and type of functional units and the associated power or performance target.

16. The data processing system as in claim 14, wherein to select chiplets that conform with the number and type of functional units includes to select chiplets that include one or more of a matrix accelerator and an integer logic unit or a floating point unit.

17. The data processing system as in claim 11, wherein to determine the base chiplet die configuration includes to select a set of one or more base chiplet dies that provides at least a number of chiplet slots sufficient to accept the set of multiple chiplets determined for the modular parallel processor according to the aperture sizes associated with the set of multiple chiplets.

18. The data processing system as in claim 17, wherein to determine the base chiplet die configuration includes to determine a number of base chiplet dies and an interconnect configuration for the base chiplet dies.

19. The data processing system as in claim 18, wherein the electronic manufacturing manifest includes identifiers for at least one chiplet associated respectively with two or more layers of the modular parallel processor.

20. The data processing system as in claim 19, wherein the operations additionally include to manufacture the modular parallel processor, including to mount the set of multiple chiplets to chiplet slots of the base chiplet dies.

* * * * *